(12) United States Patent
Morris et al.

(10) Patent No.: US 11,401,059 B2
(45) Date of Patent: Aug. 2, 2022

(54) SYSTEM AND METHOD FOR FRAMED LID

(71) Applicant: The Hillshire Brands Company, Chicago, IL (US)

(72) Inventors: Steven Morris, Bentonville, AR (US); Jeffrey Czarny, Chicago, IL (US); Steven Clarke, Melbourn (GB); Mark Jones, Melbourn (GB); Nick Harding, Melbourn (GB)

(73) Assignee: THE HILLSHIRE BRANDS COMPANY, Chicago, IL (US)

( * ) Notice: Subject to any disclaimer, the term of this patent is extended or adjusted under 35 U.S.C. 154(b) by 39 days.

(21) Appl. No.: 16/706,155

(22) Filed: Dec. 6, 2019

(65) Prior Publication Data
US 2020/0115076 A1  Apr. 16, 2020

Related U.S. Application Data

(63) Continuation-in-part of application No. 16/385,953, filed on Apr. 16, 2019, now Pat. No. 10,501,216, which is a continuation of application No. 15/344,975, filed on Nov. 7, 2016, now Pat. No. 10,266,286.

(51) Int. Cl.
*B65B 7/28* (2006.01)
*B65B 5/04* (2006.01)
*B65D 43/02* (2006.01)
*B65D 77/20* (2006.01)
*B65D 81/26* (2006.01)

(52) U.S. Cl.
CPC .............. *B65B 7/28* (2013.01); *B65B 5/04* (2013.01); *B65D 43/0208* (2013.01); *B65D 77/2024* (2013.01); *B65D 81/265* (2013.01); *B65D 81/268* (2013.01); *B65D 2251/0018* (2013.01); *B65D 2251/0093* (2013.01); *B65D 2543/0024* (2013.01); *B65D 2543/00296* (2013.01); *B65D 2543/00314* (2013.01); *B65D 2577/2025* (2013.01); *Y02W 30/80* (2015.05)

(58) Field of Classification Search
CPC ................ B65D 81/265; B65D 81/268; B65D 43/0208; B65D 77/2024; B65D 2251/0018; B65D 2543/00314; B65D 2543/0024; B65D 2251/0093; B65D 2577/2025; B65D 2543/00296; B65B 7/28; B65B 5/04
USPC .............................................. 220/528, 359.1
See application file for complete search history.

(56) References Cited

U.S. PATENT DOCUMENTS

| 3,394,861 A | 7/1968 | Truax |
| 3,946,871 A | 3/1976 | Sturm |
| 2006/0032858 A1 | 2/2006 | Lee |

(Continued)

*Primary Examiner* — Don M Anderson
*Assistant Examiner* — Madison L Poos
(74) *Attorney, Agent, or Firm* — Duane Morris LLP

(57) ABSTRACT

A package for retaining a food item includes a tray with a base connected to at least one sidewall. The sidewall extends away from the base to a rim to define an inner chamber. The tray is made of a fluid impermeable material to retain fluids in the inner chamber. The package also includes a shelf made of the fluid impermeable material that is removably supported in the inner chamber such that the shelf is spaced apart from the base of the tray to permit an absorbent pad to be positioned therebetween. The shelf is configured to support the food item in the inner chamber separated from the absorbent pad.

19 Claims, 41 Drawing Sheets

(56) References Cited

U.S. PATENT DOCUMENTS

| | | |
|---|---|---|
| 2007/0039838 A1* | 2/2007 | Bagley .................... B65D 1/34 |
| | | 206/204 |
| 2007/0164028 A1 | 7/2007 | Marini |
| 2008/0093257 A1 | 4/2008 | Kim |
| 2008/0160143 A1 | 7/2008 | Edwards et al. |
| 2015/0102035 A1 | 4/2015 | Tuan |
| 2015/0166232 A1 | 6/2015 | Lee |
| 2015/0297036 A1 | 10/2015 | Van Puijenbroek et al. |
| 2016/0207670 A1 | 7/2016 | Chou |
| 2017/0166367 A1 | 6/2017 | Minnette |
| 2018/0127176 A1* | 5/2018 | Resh ........................ B65B 7/28 |
| 2018/0273232 A1* | 9/2018 | Wallace ............... B65D 81/265 |

\* cited by examiner

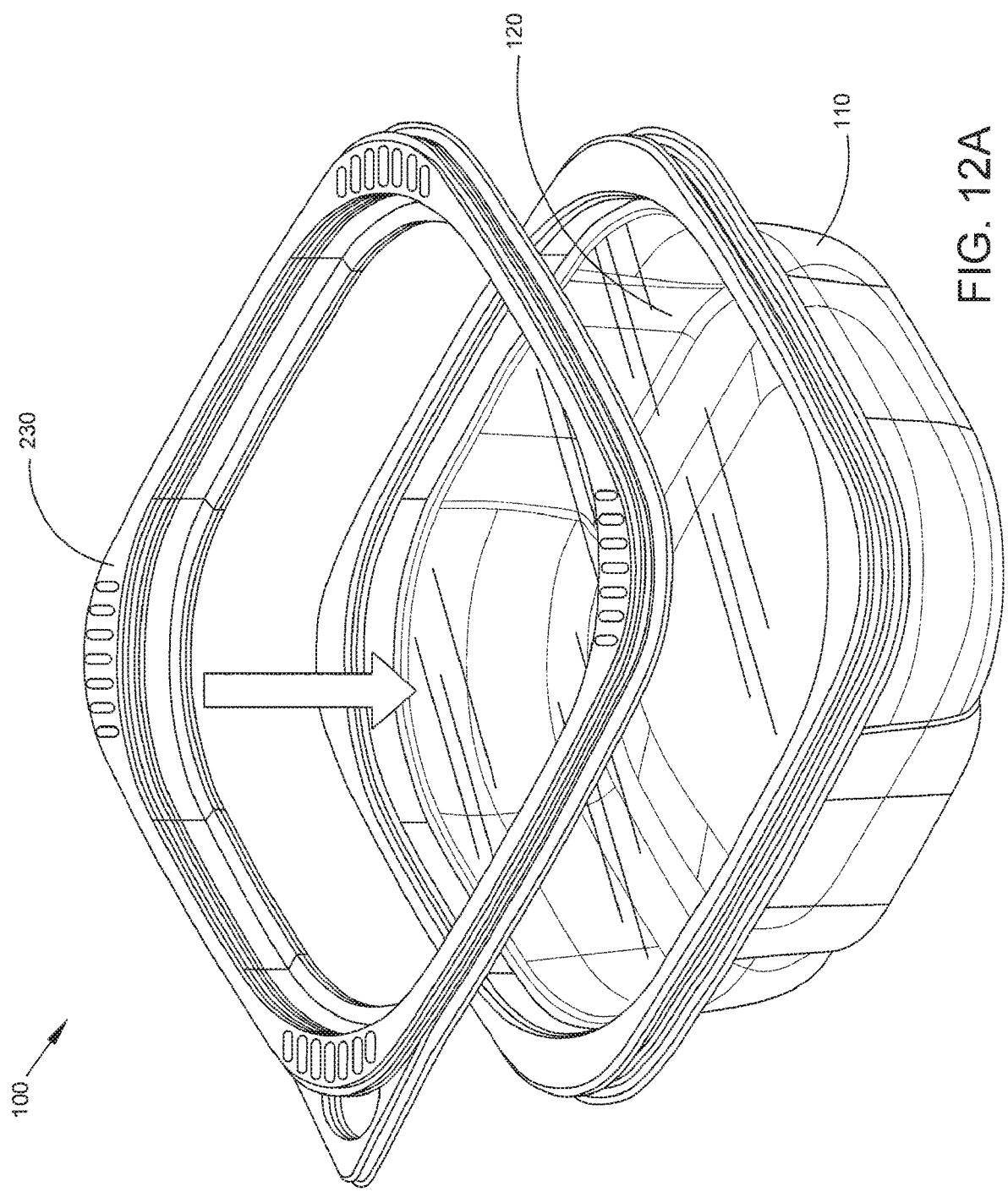

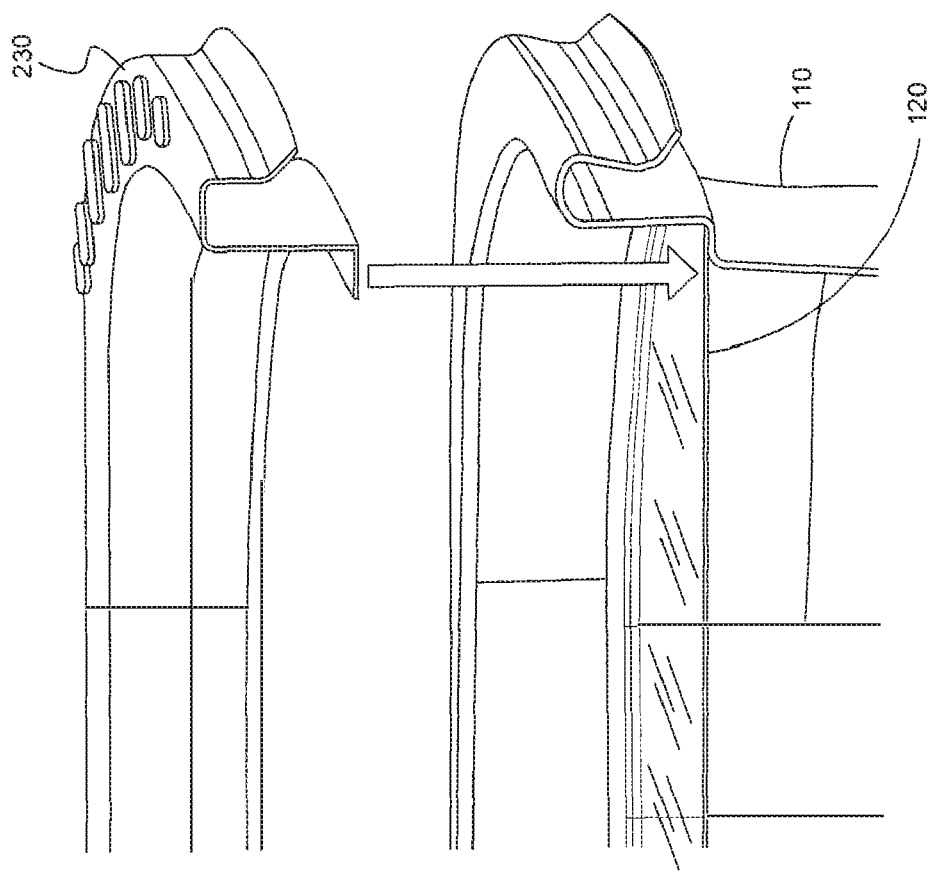

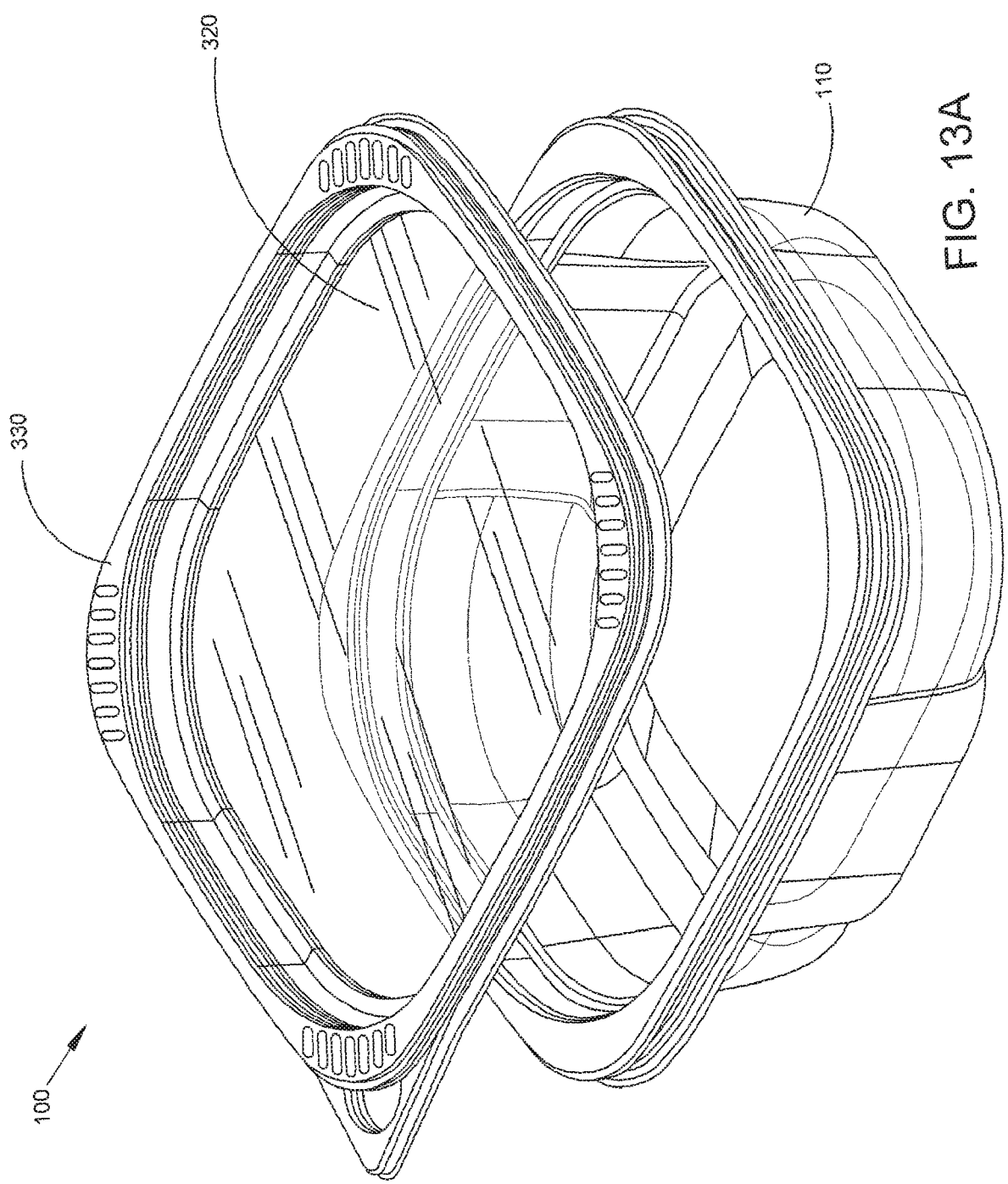

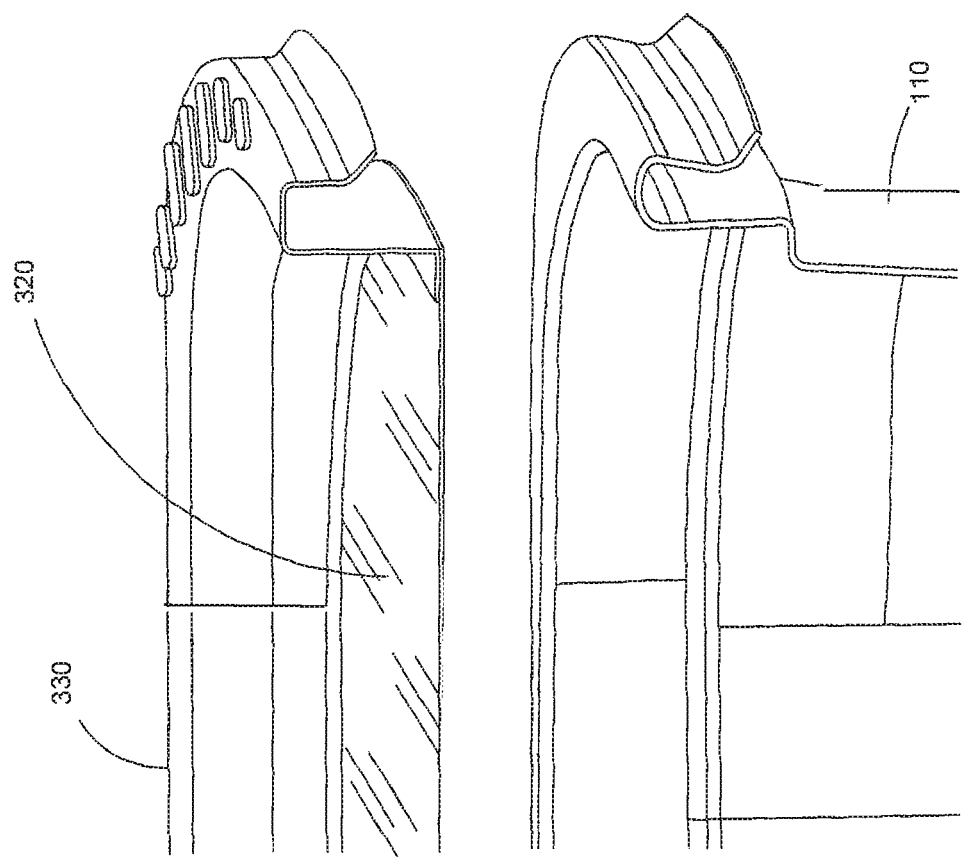

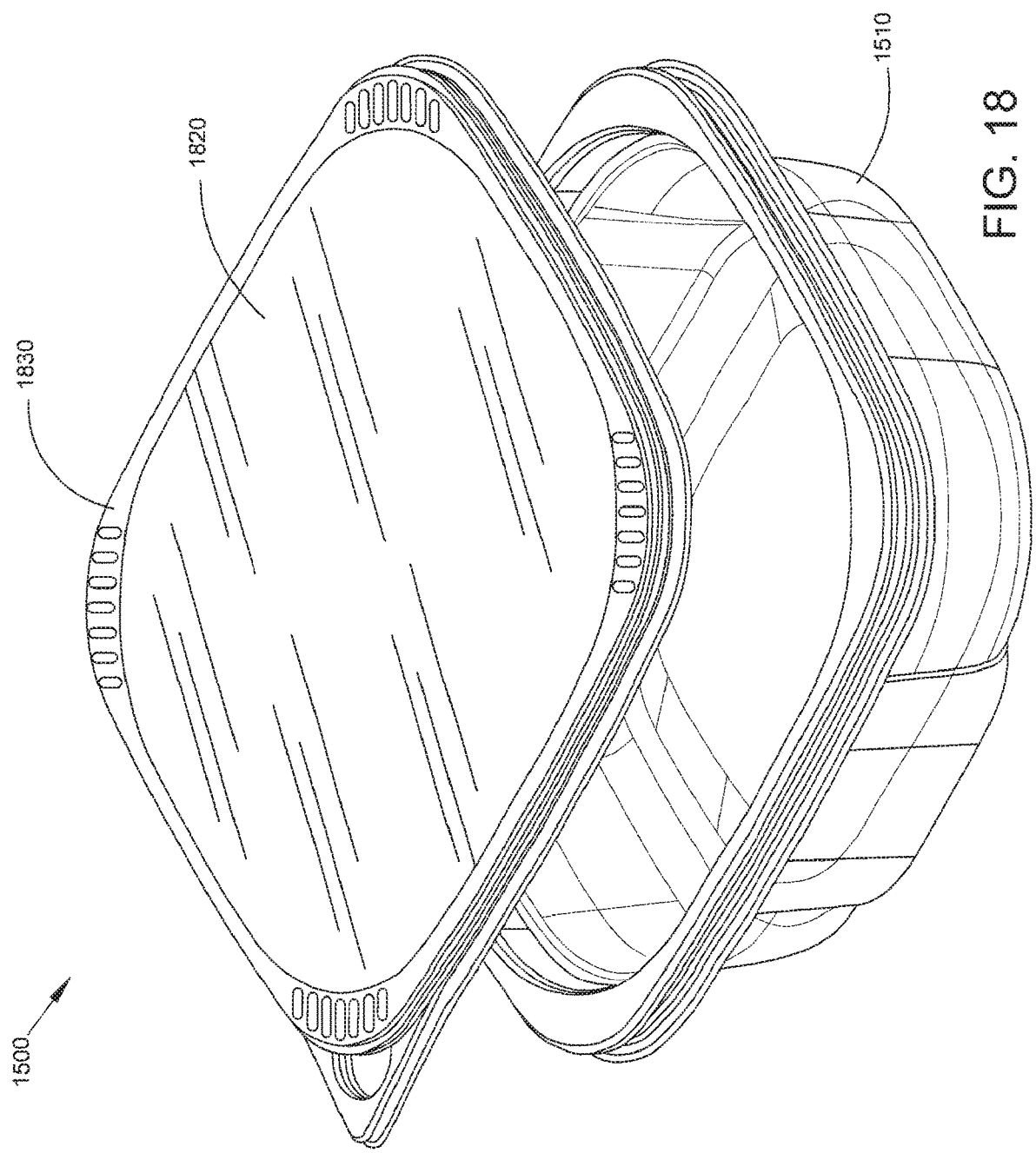

SYSTEM AND METHOD FOR FRAMED LID

RELATED APPLICATIONS

This application is a continuation-in-part of and claims priority to U.S. application Ser. No. 16/385,953 filed on 16 Apr. 2019, titled "System and Method for Framed Lid that is a continuation of U.S. application Ser. No. 15/344,975 filed on 7 Nov. 2016, titled "System and Method for Framed Lid", the entireties of which are hereby incorporated herein by reference.

BACKGROUND

Product packages comprising a tray/tub with a film seal and/or a lid are known in the art. Some products require that they be kept sealed from the environment until opened by a consumer. However, current product packages with film seals are cumbersome for the consumer to use, are inefficient in design, and are limited in functionality.

Certain products require that the atmosphere in which they are stored be different than the standard environmental atmosphere and thus the product package must maintain the integrity of the modified atmosphere within the package. As a non-limiting example, some food packages require that the food product be held in a modified atmosphere. Other product packages may have different modified atmospheric requirements, such as an inert gas, nitrogen, etc. Each of these product packages must maintain their respective modified atmospheres for a reasonable period of time so that the product is sold to the consumer in the state intended by the seller.

In the case of food product packages, some tray-with-lid packages have difficulty maintaining a modified atmosphere within the package and therefore the food product is required to be sealed in a pouch which is placed within the tray. While the lid on such a package may be used more than once by the consumer, the product must still be placed in a sealed pouch prior to purchase which requires extra manufacturing steps, additional processing time, further materials, and consequently higher cost. Additionally, the consumer must perform two separate steps to open the package: a first step to remove the lid from the tray, and a second step to remove the product from the pouch.

Other food product packages which have a film sealed to the top of the tray are able to maintain the modified atmosphere inside the package until opened by the consumer. However, these tray-film-lid packages also suffer from similar drawbacks. For example, the consumer must still perform two separate steps to open the package: a first step to remove the lid, and a second step to remove the film.

Still other food packages may only have a tray—with film construction. While these packages only require one step to remove the film, these types of packages are not resealable or reusable by the consumer without resorting to the use of a different sealing material, e.g., a cling-type film, aluminum foil, etc.

Accordingly, there is a need for product packages which are easier to manufacture, easier for the consumer to open, require fewer resources to produce, and are resealable and/or reusable by the consumer.

BRIEF DESCRIPTION OF THE DRAWINGS

FIGS. 10-14 are various depictions of the exemplary product package of FIG. 1 illustrating details of the interaction of various parts during assembly and/or use of the product package according to an embodiment of the present subject matter.

FIGS. 15-19 are various depictions of another exemplary product package illustrating details of the interaction of various parts during assembly and/or use of the product package according to an embodiment of the present subject matter.

DETAILED DESCRIPTION

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods for a product package, it is to be understood that the discussion is not intended to limit the scope of the present subject matter in any way and that the principles presented are equally applicable to other systems and/or methods for a product package.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for a novel product package are described.

Figure 1:
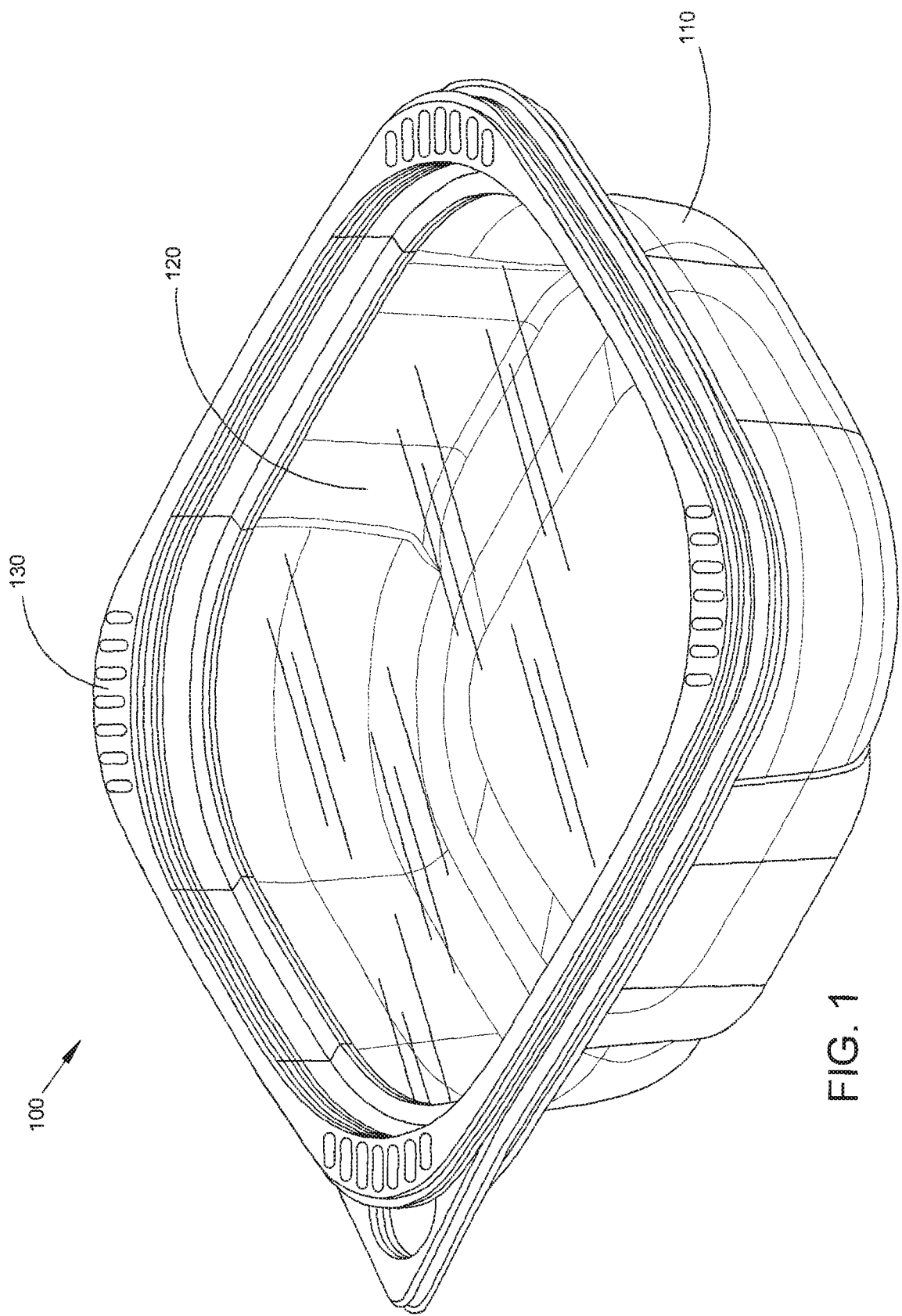
FIG. 1 is an isometric view of an exemplary product package showing a tray, a film or sealing film, and a lid according to an embodiment of the present subject matter.

With attention drawn to FIG. 1, an isometric view of an exemplary product package 100 is depicted showing a tray/tub 110 (generally referred to herein as a "tray"), a film or sealing film 120, and a lid 130 according to an embodiment of the present subject matter. In an embodiment, the tray 110 may be made of a rigid or semi-rigid plastic and may be translucent. The sealing film 120 is typically flexible and transparent, but may be translucent, and acts to hermetically seal the interior of the product package from an external environment. The lid 130 may be made of a rigid or semi-rigid plastic and may be translucent. In the embodiment shown in FIG. 1, the lid 130 may be formed in a ring-like or frame structure with the sealing film 120 spanning and/or enclosing the center hole in the lid. Thus, the lid/film structure shown in FIG. 1 and throughout the other figures may be a hybrid rigid/flexible construction with superior viewing and sealing properties. For embodiments where the sealing film 120 is transparent, a product placed in the product package 100 may be placed with a "good" side up to be viewed by a consumer through the sealing film 120. This is a more convenient product orientation for the consumer than prior art packages which do not have transparent tops and therefore require the "good" side of the product to face downward for necessitating the consumer to pick up the package and view the product through the bottom of the package.

Further, the product package 100 is sealable, reusable, and leak-proof thus providing additional benefits to the consumer. In some embodiments, the product package 100 is also resealable in an airtight and/or watertight manner Because the sealing film 120 seals an interior space of the product package 100 from an external environment, the product carried within the interior space (e.g., a food product) need not be sealed within an inner pouch before being placed in the interior space. The elimination of the inner pouch allows for better product definition and visibility and better presentation of the product to the consumer.

Another benefit attributable to the novel design of the product package 100 is the reduction of materials required to make the package. Since, in particular embodiments, the lid 130 is a ring-like or frame structure, the material required to manufacture this type of lid is less than the material required to manufacture a whole lid (i.e., without the hole in the middle). This reduction in material may further lead to improvements in case packing, stacking, pallet, and transportation efficiencies. The reduction in material may also afford increased run rates on the production line allowing for more finished goods to be produced. Additional benefits due to the elimination of the inner pouch include: the overall package may be smaller (e.g., have a smaller height) while holding the same quantity of product; the package may be the same size as before but with an increase in the product contained therein; and/or a smaller package size leads to a reduction in the amount of materials needed, reduced packing and stacking heights, and the ability to carry more packages on a pallet.

As will be discussed in more detail below, an important benefit is the ease of accessibility of the product by the consumer since the consumer can access the product in one step rather than taking multiple steps as current packages require.

Figure 2:
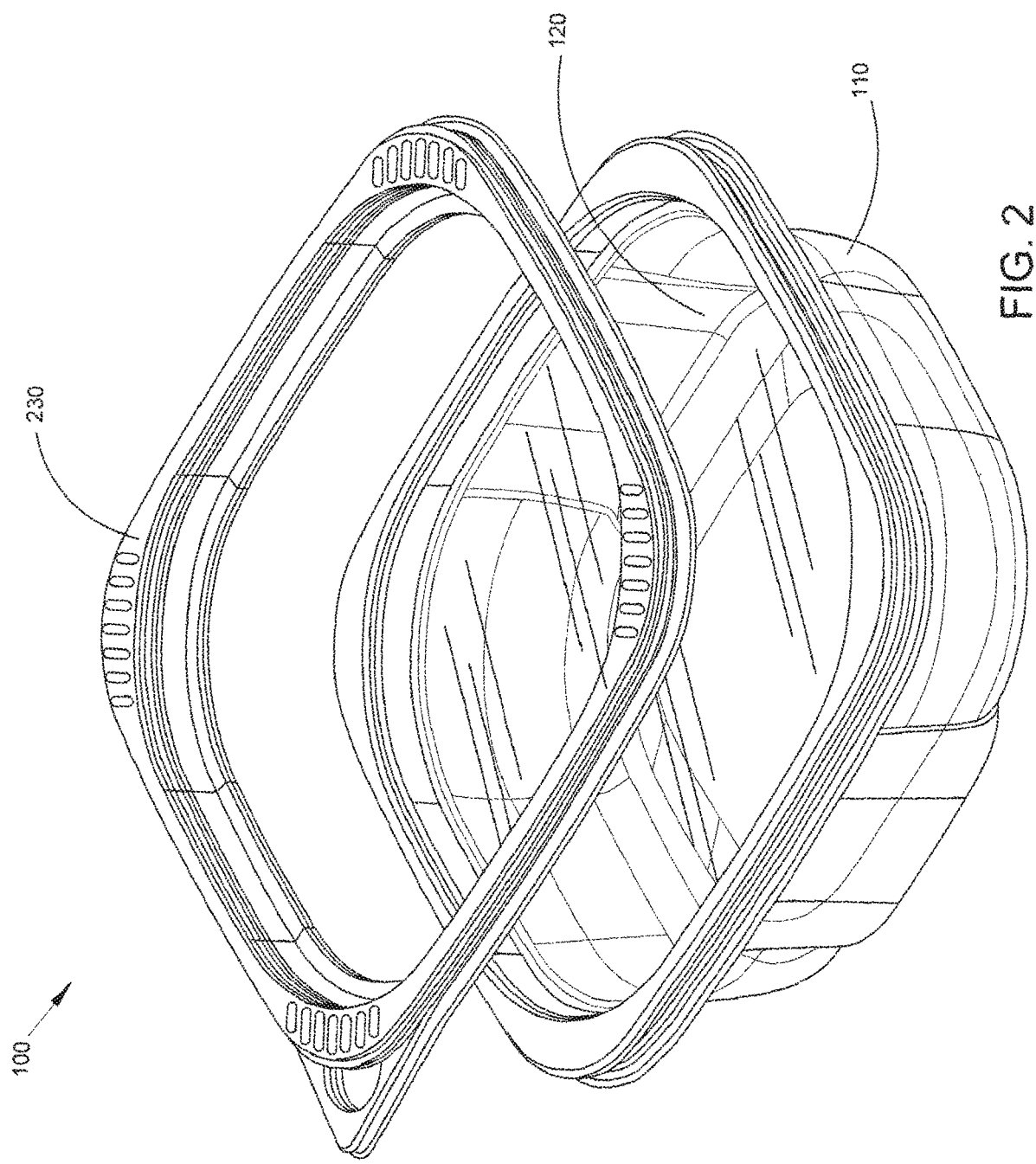
FIG. 2 is a partially-exploded isometric view of the exemplary product package of FIG. 1 during assembly with the sealing film releasably attached to the tray before the lid is engaged with the tray according to an embodiment of the present subject matter.

Now turning to FIG. 2, a partially-exploded isometric view is presented of the exemplary product package 100 of FIG. 1 during assembly with the sealing film 120 releasably attached to the tray 110 before the lid 230 is engaged with the tray according to an embodiment of the present subject matter.

In an embodiment for assembling the product package 100 including a product (not shown for clarity), the product is placed in an interior space of the product package 100 (e.g., the product is placed in the tray 110). The tray 100 is then gas flushed and the sealing film 120 (which, in an embodiment, may be a laminated film) is releasably sealed directly to the tray 110. The sealing film may be sealed to the tray in a predetermined fashion, such as, for example, the film contacting the rim of the tray (e.g., the rim of the sidewall(s) of the tray) or the film contacting a ledge formed in the sidewall(s) of the tray, as will be described in further detail below. In an embodiment, the portion of the film contacting the rim of the tray will comprise a material that will allow for an "easy peel away" function, i.e., be releasably sealed to the rim (or ledge) of the tray. Once the sealing film 120 is attached to the tray 110, the lid 230 will then be applied to the tray/film assembly. The portion of the sealing film 120 that is in contact with the lid 230 will comprise a material that will allow for a relatively permanent bond between the sealing film 120 and the lid 230 thereby creating a functional leak-proof, re-sealable, re-useable product package.

As stated above, an additional benefit of the novel product package is the elimination of an inner pouch for holding a product in a modified atmosphere. Also, the hybrid rigid/flexible lid/film covering creates an enhanced leak proof, re-sealable, and reusable finished package. Furthermore, the novel product package allows for printing to appear on the film, such as a design or text, and be product specific with a variety of lid colors, and allows for a colored rim and a clear window in the lid formed by the film to showcase the product for increased product definition and visibility. Current prior art packages are typically limited to one color and require a cardstock or label to be attached to the lid or elsewhere on the package to show graphics.

Figure 3:
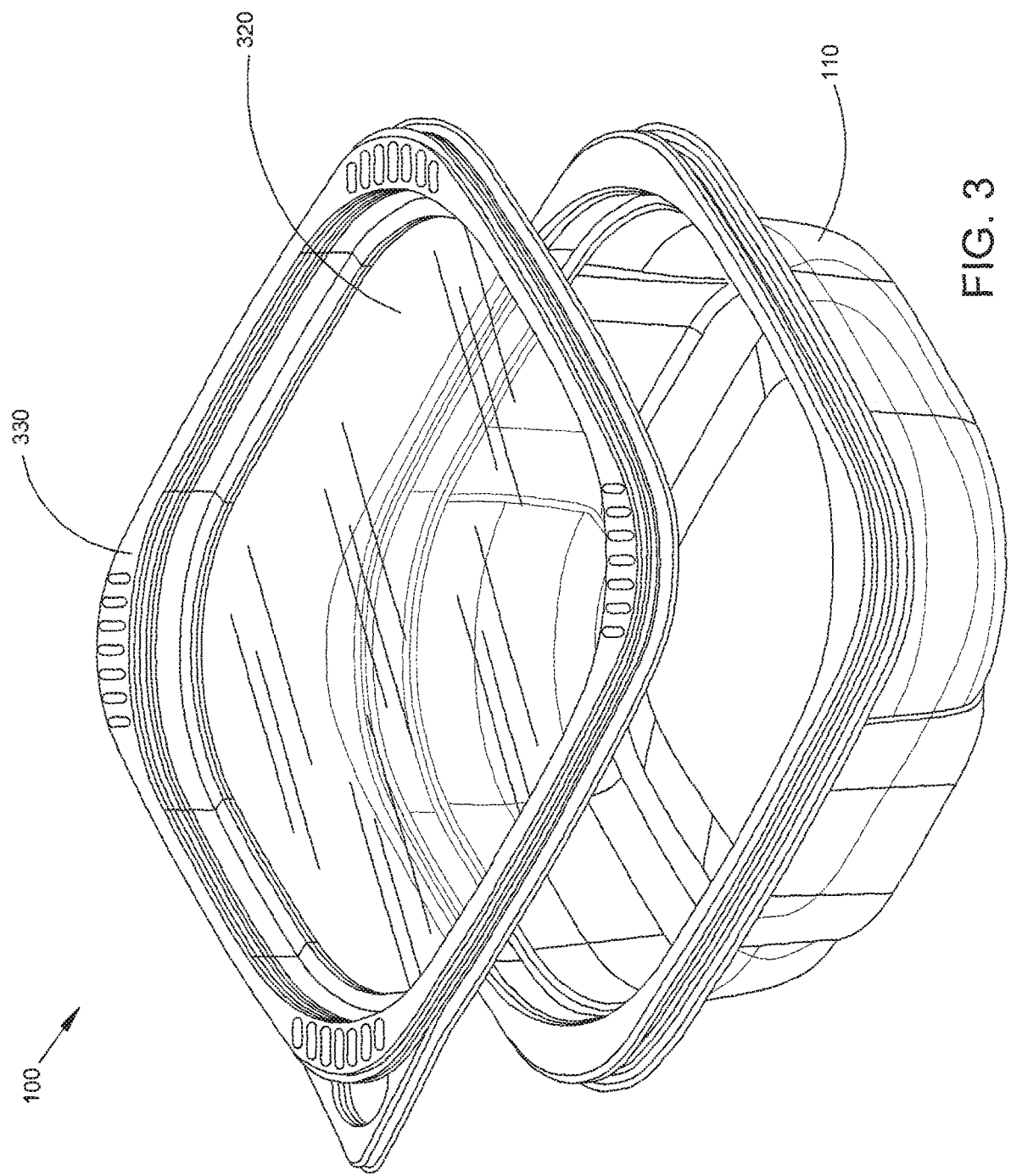
FIG. 3 is a partially-exploded isometric view of the exemplary product package of FIG. 1 during use by a consumer showing the lid and adhering sealing film being removed from the tray according to an embodiment of the present subject matter.

FIG. 3 illustrates a partially-exploded isometric view of the exemplary product package 100 of FIG. 1 during use by a consumer showing the lid 330 and the adhering sealing film 320 being removed from the tray 110, according to an embodiment of the present subject matter. As illustrated in FIG. 3, a consumer may access a product in the product package 100 by simply removing the lid/film assembly in one step. As discussed above, the sealing film, as shown in FIG. 2, is initially releasably sealed to the tray 110 thereby hermetically sealing the interior of the package from an external environment (and allowing for a modified environment to exist within the package). The sealing film is also more permanently attached to the lid 230 after the lid is engaged to the tray 110 during manufacturing. As shown in FIG. 3, when the lid/rim is removed from the finished package by the consumer, the sealing film 320 will release from the tray 110 and stay permanently attached to the lid 330. Prior art packages require more than one step for a consumer to access the product whereas a unique feature of the novel product package 100 is a "one-step" opening aspect where the consumer can open the package and access the product in just one step thereby increasing the utility of the product for the consumer.

Figure 4:
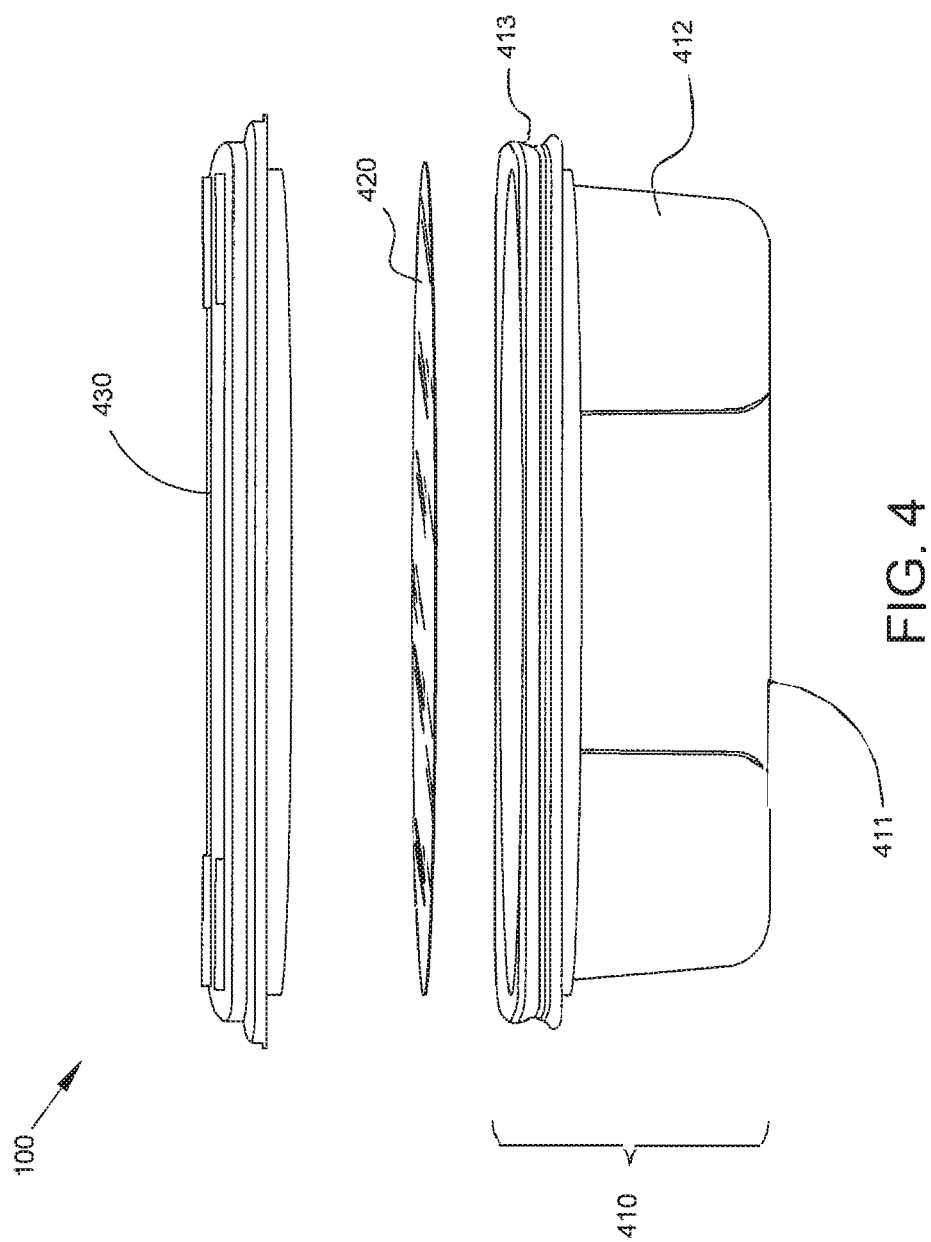
FIG. 4 is an exploded elevation view of an exemplary product showing the tray, the sealing film, and the lid according to an embodiment of the present subject matter.

Considering FIG. 4, an exploded elevation view is presented of an embodiment of an exemplary product package 400 showing the various components of the product package: a tray 410, a sealing film 420, and a lid 430. The tray 410 may comprise a base portion 411 and at least one sidewall 412 having a rim 413. While the product package 400 is depicted as being generally rectangular, any geometric shape is contemplated consistent with the teachings presented herein.

Figure 5:
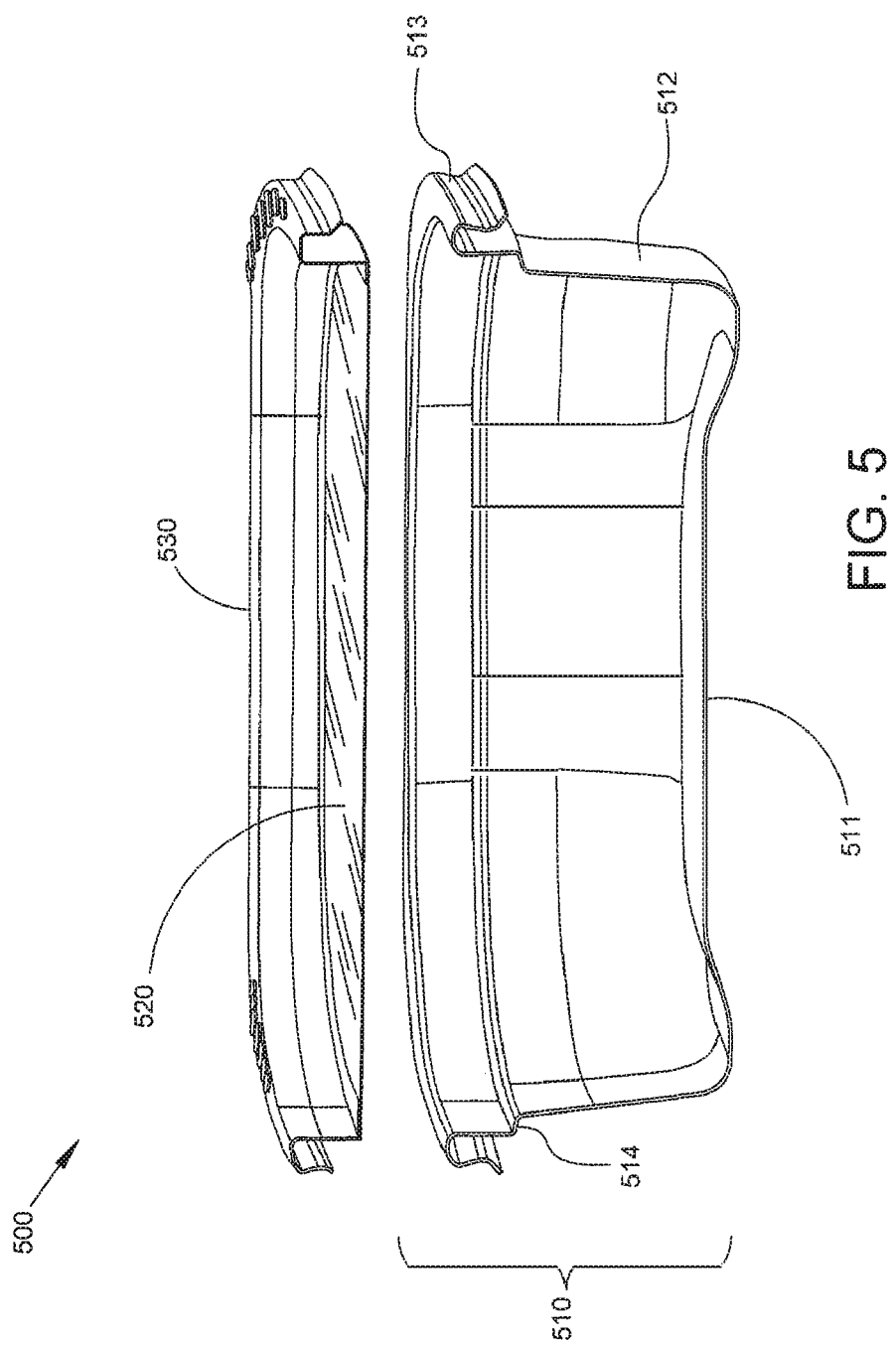
FIG. 5 is a cross-sectional view of an exemplary product package showing the sealing film adhering to the lid during use of the product package by a consumer and a ledge on a sidewall of the product package, according to an embodiment of the present subject matter.

Now considering FIG. 5, a cross-sectional view of an exemplary product package 500 showing the sealing film 520 adhering to the lid 530 during use of the product package by a consumer, according to an embodiment of the present subject matter. The tray 510 comprises a base portion 511 and at least one sidewall 512 having a rim 513. Also shown in this embodiment is a ledge 514 formed on a sidewall 512 between the base 511 and the sidewall rim 513. The sealing film 520 may be releasably attached to the ledge 514 to seal the inner space of the product package 500 from an external environment. Alternate embodiments allow for the sealing film 520 to attach to a sidewall 512 without the presence of a ledge, such as, for example, to the rim 513 which is discussed further below with respect to FIG. 8.

Figure 6:
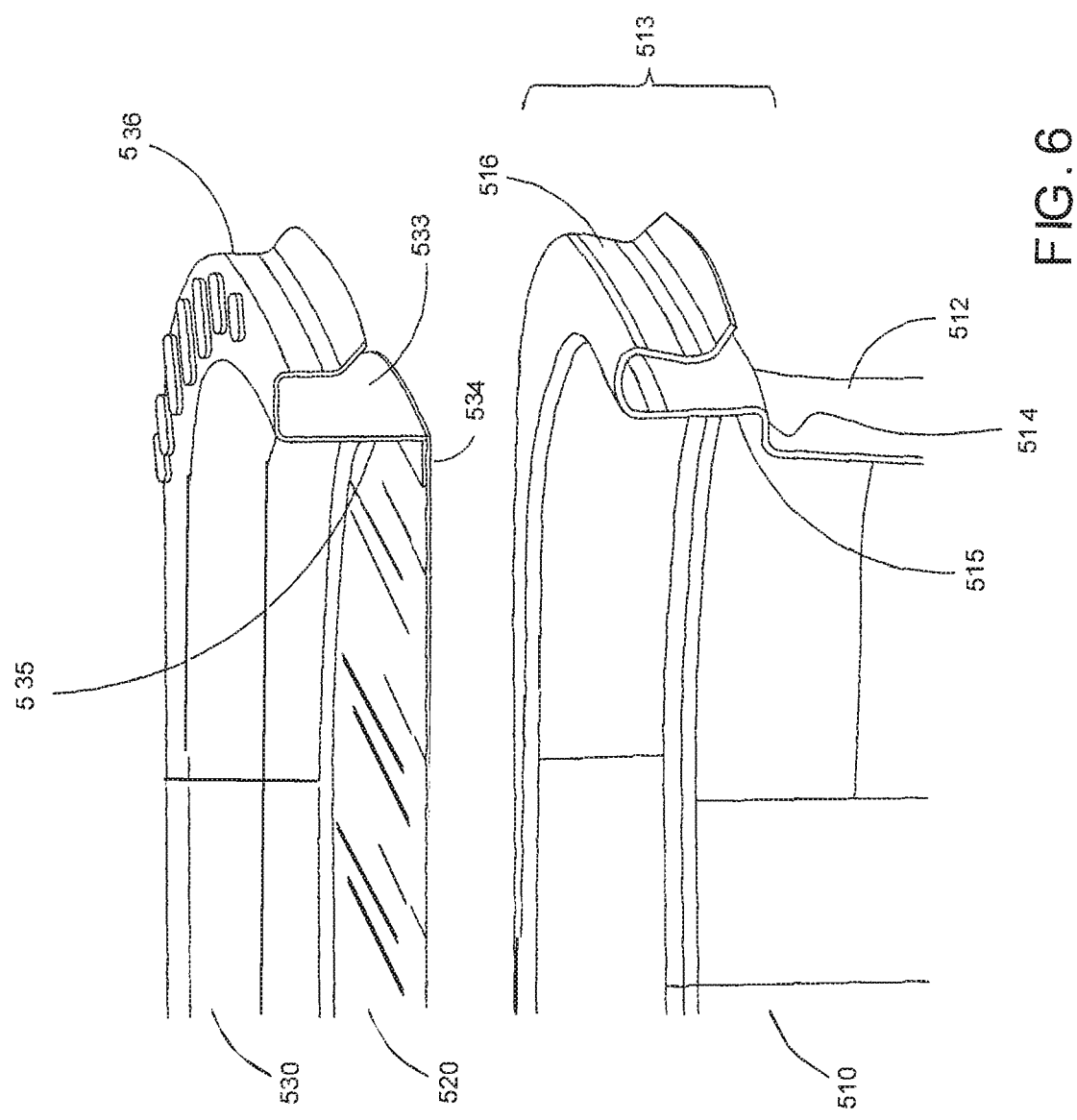
FIG. 6 is an exploded isometric view of the exemplary product package of FIG. 5 illustrating detail of the lid, sealing film, sidewall, sidewall rim, and ledge, according to an embodiment of the present subject matter.

FIG. 6 illustrates an exploded isometric view of the exemplary product package 500 of FIG. 5 illustrating detail of the lid 530, the sealing film 520, sidewall 512, sidewall rim 513, and the ledge 514, according to an embodiment of the present subject matter. As can be seen in this embodiment, the sidewall rim 513 is formed in an inverted U-shape having an inner rim wall 515 and an outer rim wall 516. The lid 530 includes a channel 533, also formed in an inverted U-shape, for receiving the sidewall rim 513 when the lid is positioned on the tray 510. In this embodiment, the lid 530 is formed as a ring and/or frame as shown in FIGS. 1-3, and the channel 533 is formed by an inner lid wall 535 and an outer lid wall 536. The inner lid wall 536 includes a flange 534 to which the sealing film 520 may be fixedly attached. The flange 534 is dimensioned to mate with the ledge 514 with the sealing film 520 disposed therebetween. The ring/shaped lid 530 circumscribes an opening that is spanned by the sealing film 520. In an embodiment, the lid 530 engages the sidewall rim 513 by an interference fit between the inner lid wall 535 and the inner rim wall 515. In another embodiment, the lid 530 engages the sidewall rim 513 by an interference fit between the outer lid wall 536 and the outer rim wall 516. In a further embodiment, the lid 530 engages the sidewall rim 513 by an interference fit between the inner lid wall 535 and the inner rim wall 515 and by an interference fit between the outer lid wall 536 and the out rim wall 516.

Figure 7:
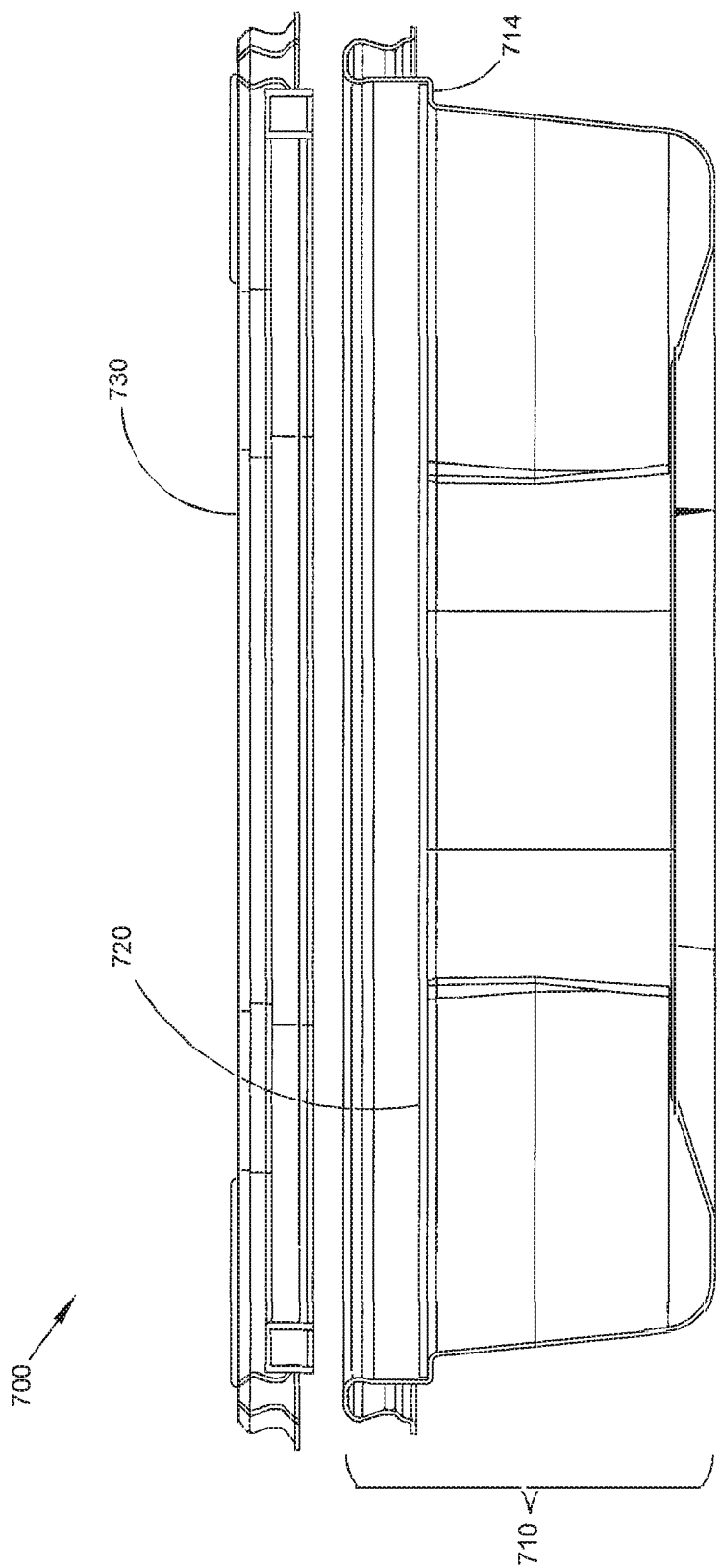
FIG. 7 is a cross-sectional view of an exemplary product package during assembly with the sealing film releasably attached to the tray before the lid is engaged with the tray according to an embodiment of the present subject matter.

FIG. 7 depicts a cross-sectional view of an exemplary product package 700 during assembly with the sealing film 720 releasably attached to a ledge 714 in a sidewall of the tray 710 before the lid 730 is engaged with the tray, according to an embodiment of the present subject matter. As discussed above, the lid 730 will be positioned on the tray 710 and fixedly attached to the sealing film 720. A consumer may then access the interior space of the product package 700 by disengaging the lid 730 from the tray 710 thereby removing the sealing film 720 from the ledge 714.

Figure 8:
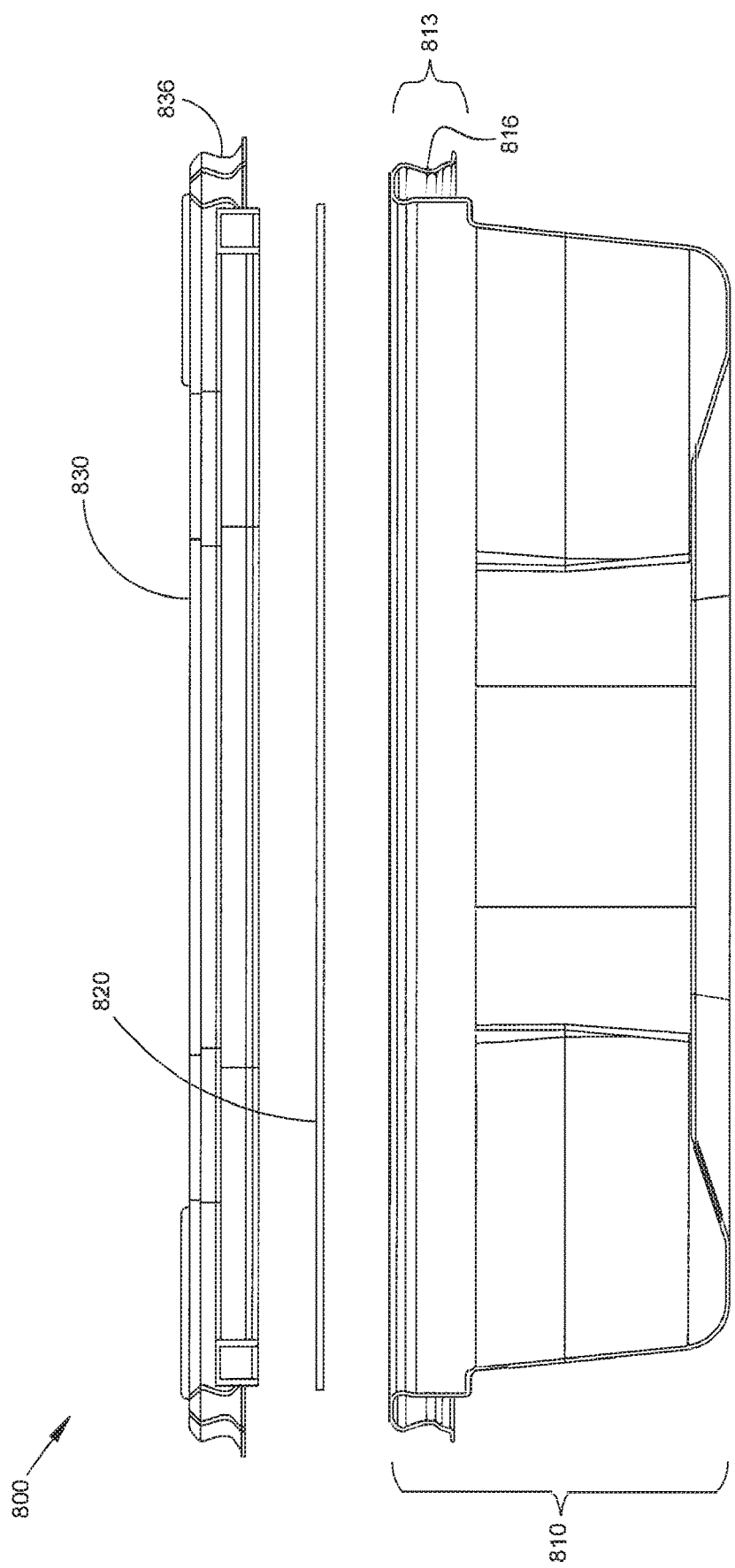
FIG. 8 is a cross-sectional view of an exemplary product package during assembly showing a tray, a sealing film, and a lid according to another embodiment of the present subject matter.

With attention now drawn to FIG. 8 a cross-sectional view of an exemplary product package 800 during assembly showing a tray 810, a sealing film 820, and a lid 830, according to another embodiment of the present subject matter. In this embodiment, the sealing film 820 is releasably attached to the rim 813 of a sidewall of the tray 810. The lid 830 is positioned on the tray 810 and fixedly attached to the sealing film 820. The lid 830 may be ring-shaped, as discussed above, or may be a whole lid. In this embodiment, the lid 830 engages the rim 813 by an interference fit between an outer lid wall 836 and an outer rim wall 816.

Figure 9:
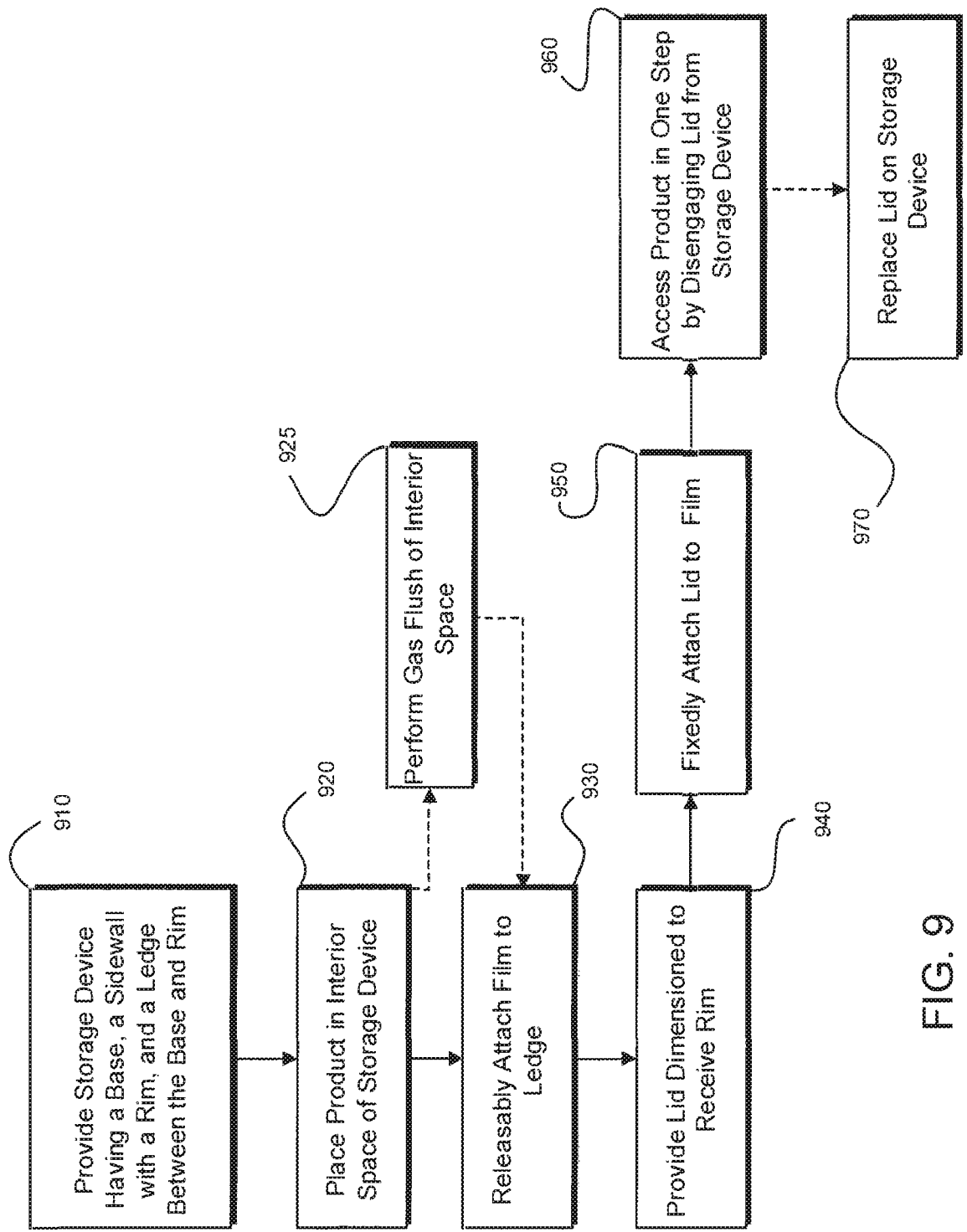
FIG. 9 is a flow chart of steps for a method for accessing a product contained within a product package as described herein, according to an embodiment of the present subject matter.

FIG. 9 is a flow chart of steps for a method for accessing a product contained within a product package as described herein, according to an embodiment of the present subject matter. At block 910, a storage device is provided where the storage device comprises a base connected to at least one sidewall which extends away from the base terminating at a rim and comprises a ledge formed between the base and the rim. At block 920, a product is placed in an interior space of the storage device. At block 930, a film is releasably attached to the ledge to seal the interior space of the tray from an external environment. At block 940 a lid is provided where the lid is dimensioned to receive the rim when the lid is positioned on the storage device. At block 950, the lid is fixedly attached to the film. At block 960, the product is accessed in one step by disengaging the lid from the storage device thereby removing the film from the ledge.

In another embodiment, at block 925 a gas flush of the interior space is performed after the product is placed in the interior space. In a further embodiment, at block 970, the lid is replaced on the storage device.

FIGS. 10-14 are various depictions of the exemplary product package of FIG. 1 illustrating details of the interaction of various parts during assembly and/or use of the product package according to an embodiment of the present subject matter. For the sake of simplicity, no product is shown in the package or discussed during the various stages of assembly and/or use of the package although those of skill in the art will readily understand that product would be placed in the product package at the appropriate time during assembly and in an appropriate manner.

Figure 10:
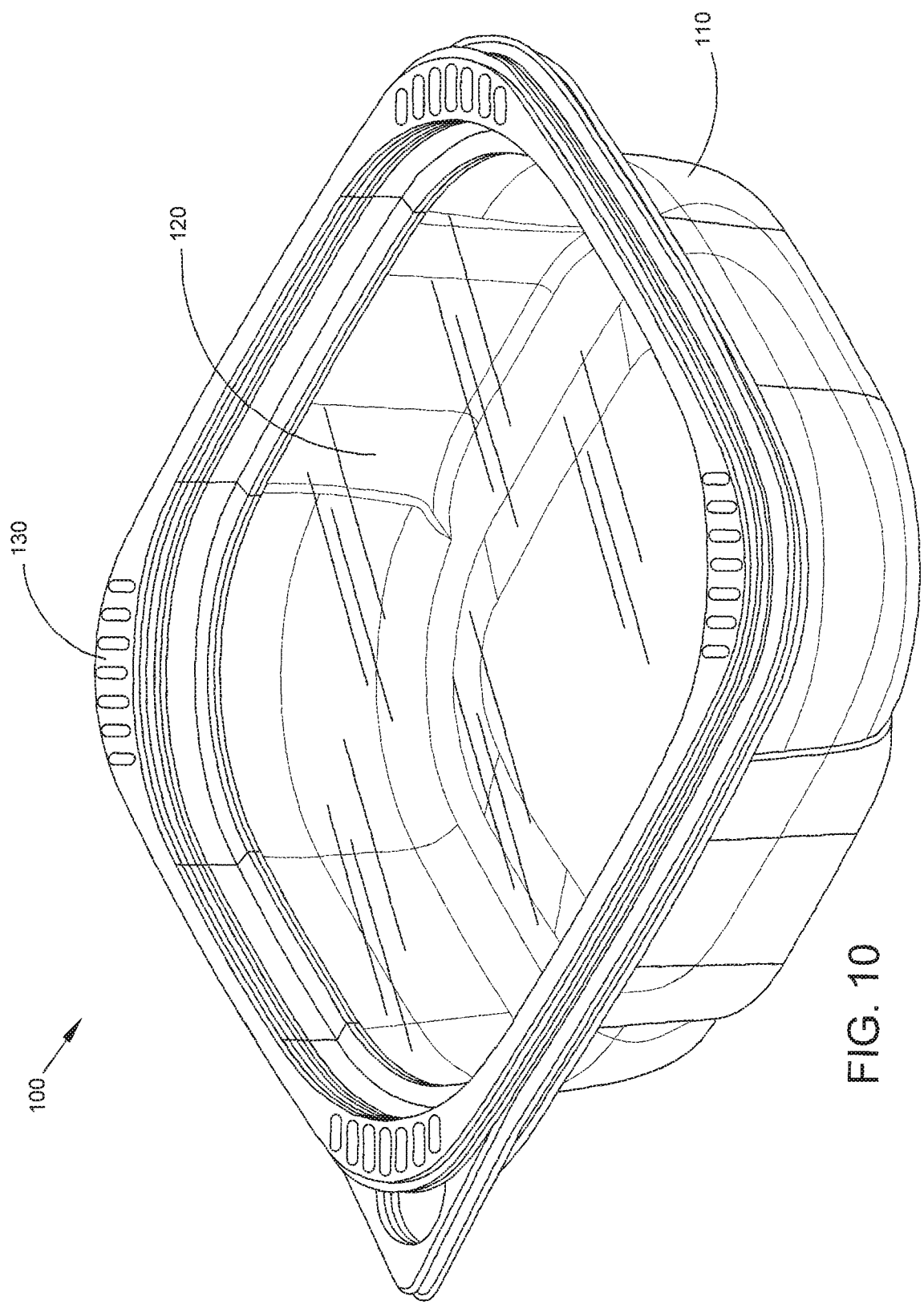

FIG. 10 is an isometric view, similar to FIG. 1, of an exemplary product package 100 where depicted is a tray/tub 110, a film or sealing film 120, and a lid 130 where, as described above, the sealing film 120 is releasably attached to a ledge on a sidewall of the tray 110 and fixedly attached to a flange of the lid. This is a typical configuration for the product package, according to an embodiment of the present subject matter, as it might appear on a store shelf.

Figure 11:
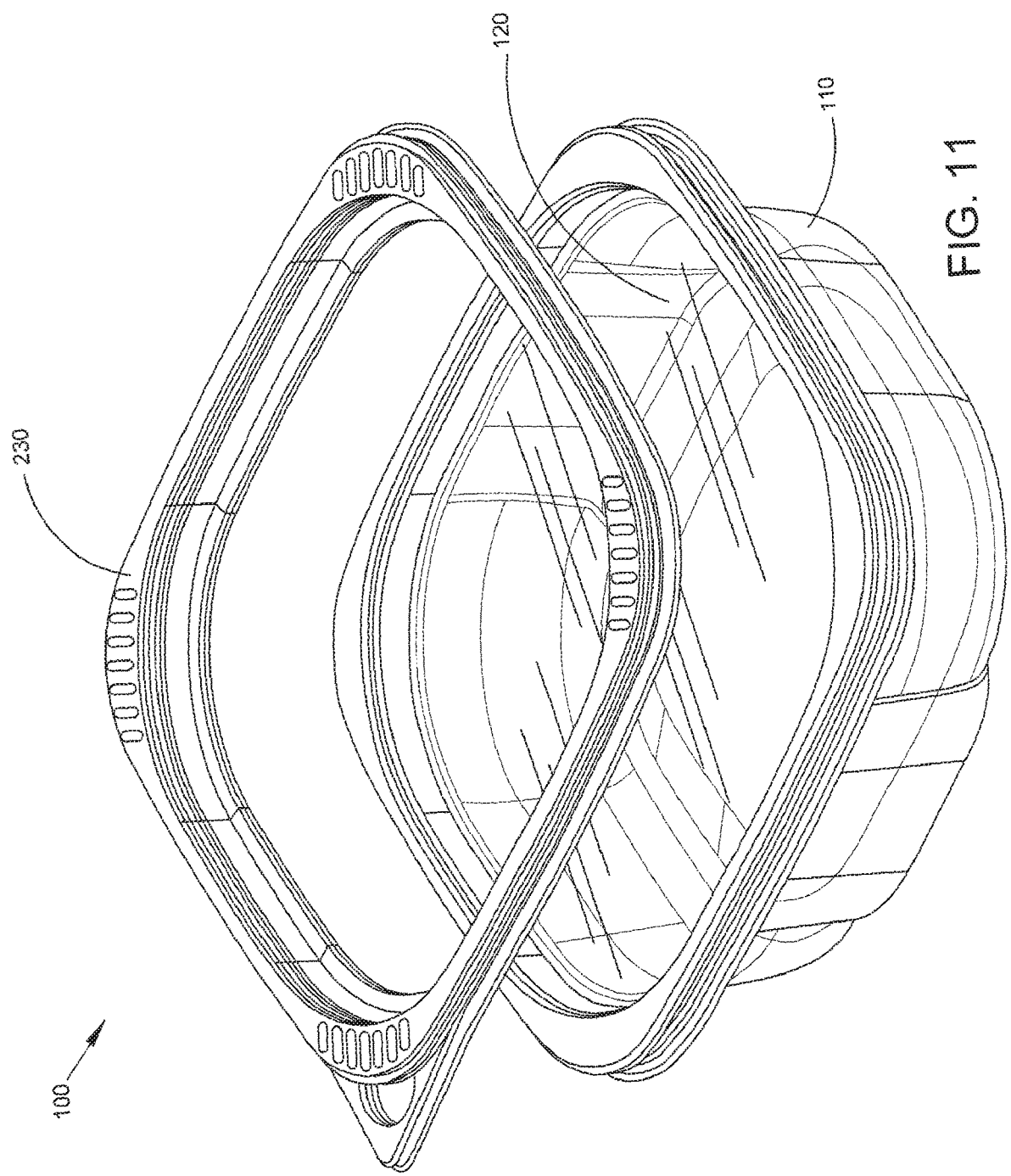

FIG. 11 illustrates an isometric partially-exploded view of the exemplary product package 100 during assembly. At this point of the assembly, the sealing film 120 has been releasably attached to a ledge on a sidewall of the tray 110 and the lid 230 has not yet been put in place.

FIG. 12A depicts an isometric partially-exploded view of the product package 100 with the sealing film 120 releasably attached to the tray 110 as discussed above, and the lid 230 is then placed on the tray 110 as indicated by the arrow. The lid 230 will be prepared in a manner that when placed on the tray 110 the sealing film 120 will become fixedly attached to the lid. FIG. 12B is a partial cross-sectional close-up view of the product package 100 shown in FIG. 12A. Again, the arrow in FIG. 12B indicates the lid 230 being placed on the tray 110 as described above.

FIG. 13A illustrates an isometric partially-exploded view of the product package 100 when a consumer opens the package. The consumer removes the lid 330 from the tray 110 and since the sealing film 320 has been fixedly attached to the lid and releasably attached to the tray, the sealing film is lifted away from the tray along with the lid, thus allowing the consumer access to the product within the package. FIG. 13B is a partial cross-sectional close-up view of the product package 100 shown in FIG. 13A.

Figure 14:
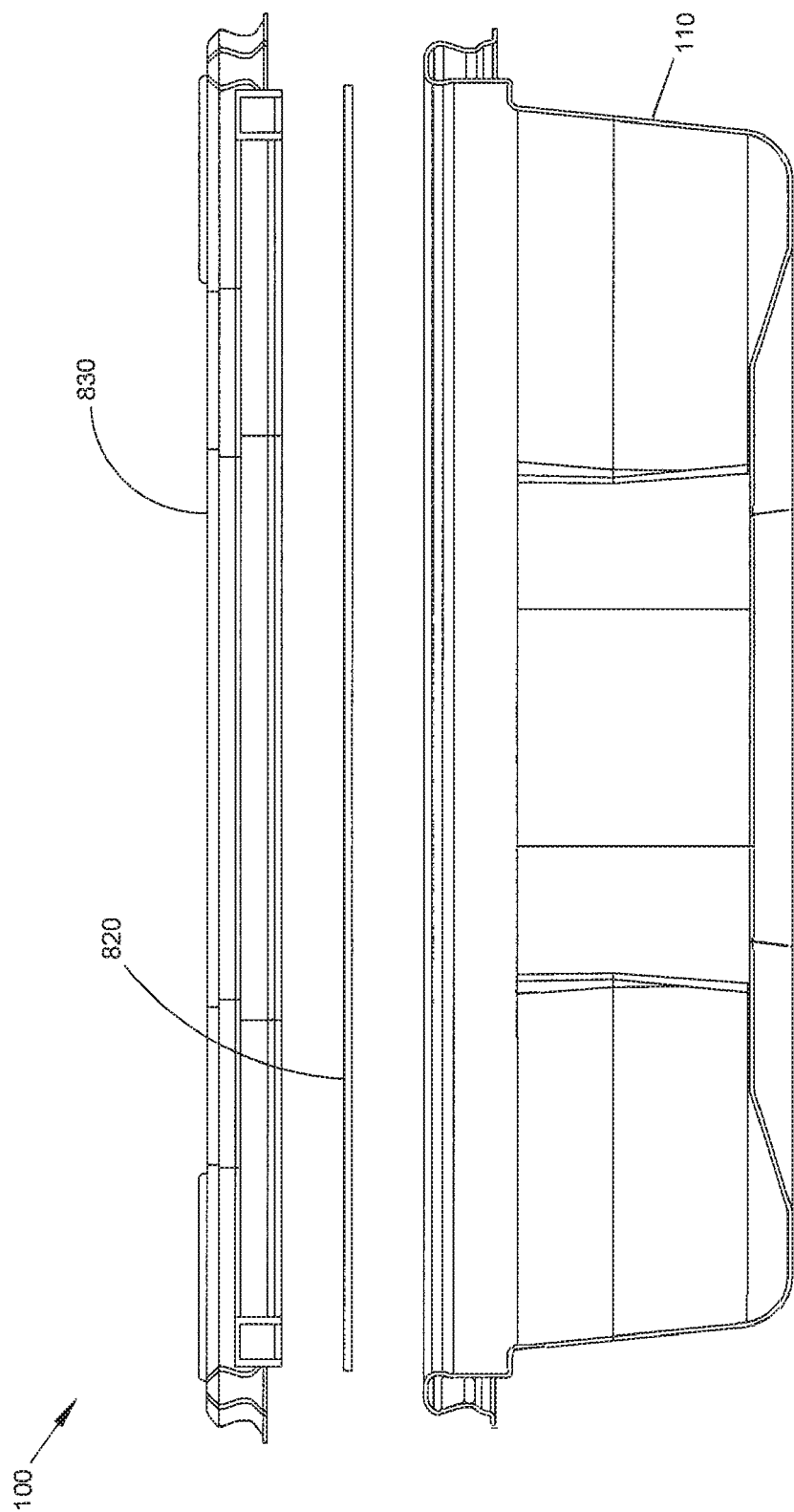

FIG. 14 is a cross-sectional exploded view of the product package 100 showing the tray 110, the lid 830, and the sealing film 820. FIG. 14 indicates that the sealing film 820 is/will be fixedly attached/sealed to the lid 830 and is/will be releasably attached/sealed to the tray 110, as described in detail above.

FIGS. 15-19 are various depictions of another exemplary product package illustrating details of the interaction of various parts during assembly and/or use of the product package according to an embodiment of the present subject matter. For the sake of simplicity, no product is shown in the package or discussed during the various stages of assembly and/or use of the package although those of skill in the art will readily understand that product would be placed in the product package at the appropriate time during assembly and in an appropriate manner.

Figure 15:
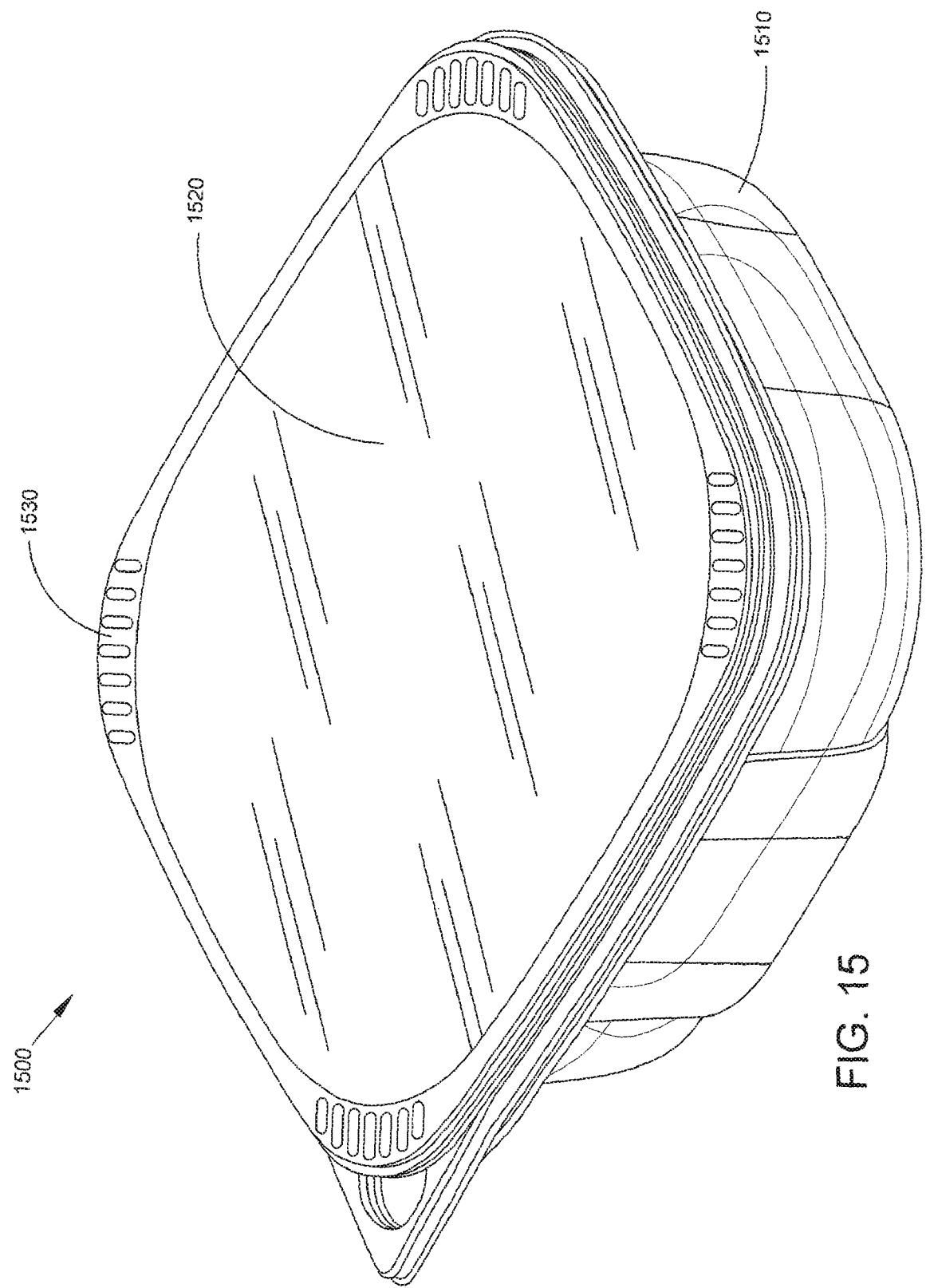

FIG. 15 is an isometric view of another exemplary product package 1500 where depicted is a tray/tub 1510, a film or sealing film 1520, and a lid 1530. As described above with respect to FIG. 8, the sealing film 1520 is releasably attached, for example, to a top ledge on a sidewall of the tray 1510 or to the top of the rim of the sidewall of the tray 1510 (the following discussion will refer to the rim of the tray for simplicity and should not be construed as limiting the scope of the disclosure in any way), and the sealing film 1520 is fixedly attached to an underside portion of the lid 1530, an embodiment of which will be shown in further detail below. This is also a typical configuration for the product package 1500, according to an embodiment of the present subject matter, as it might appear on a store shelf.

Figure 16:
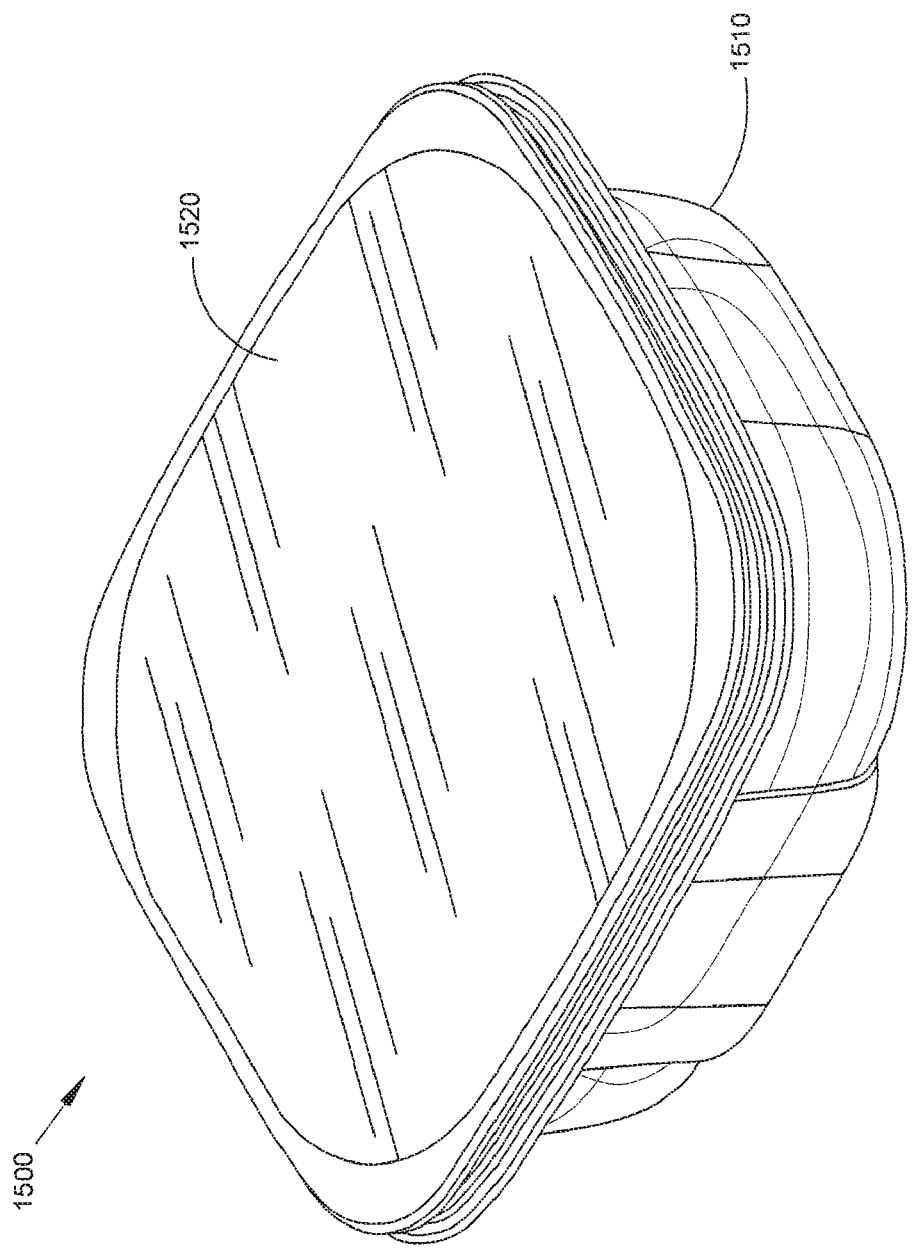

FIG. 16 depicts an isometric view of the exemplary product package 1500 during assembly. At this point of the assembly, the sealing film 1520 has been releasably attached to the rim of the tray 1510 and a lid has not yet been placed thereon.

Figure 17A:
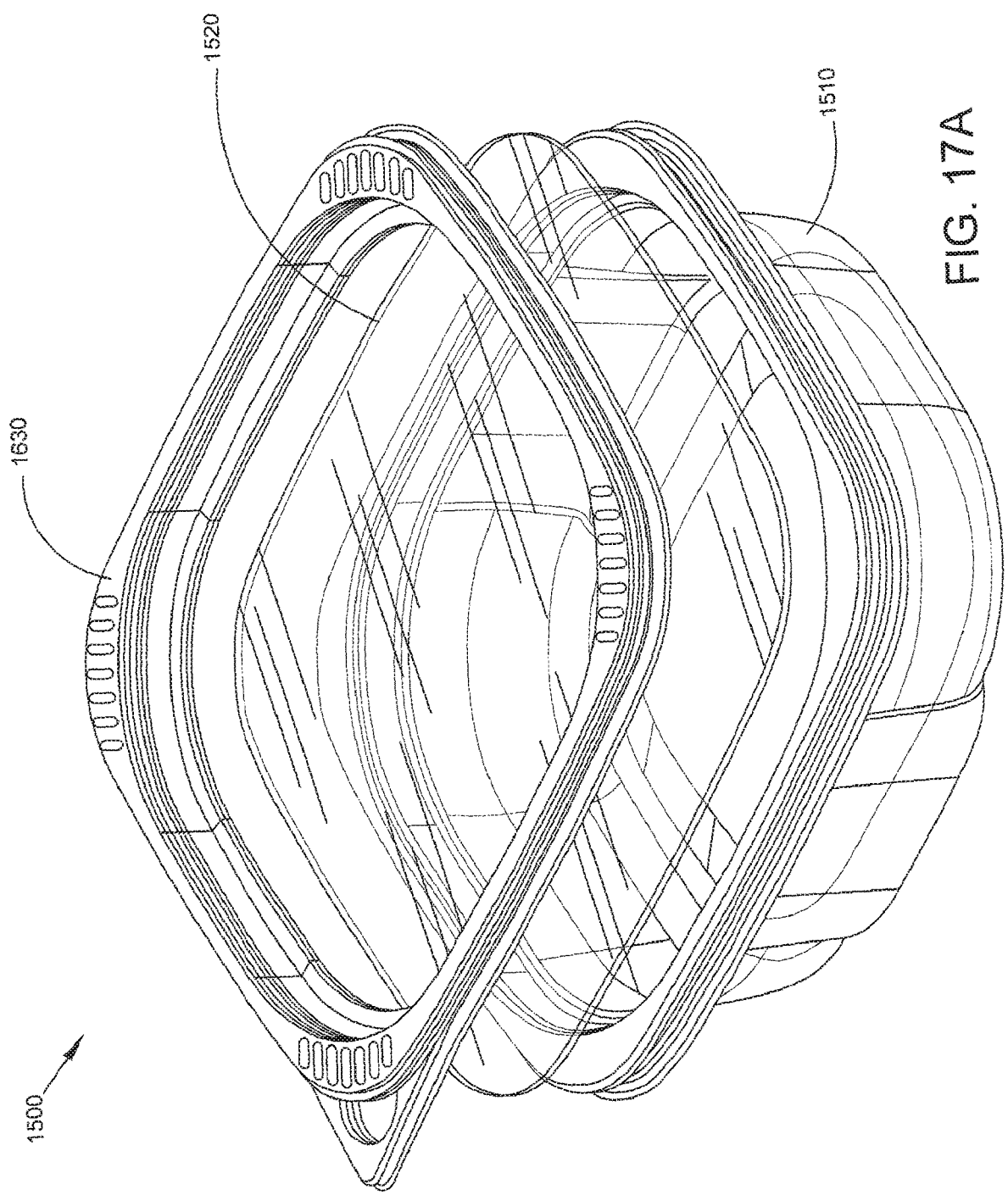
Figure 17B:
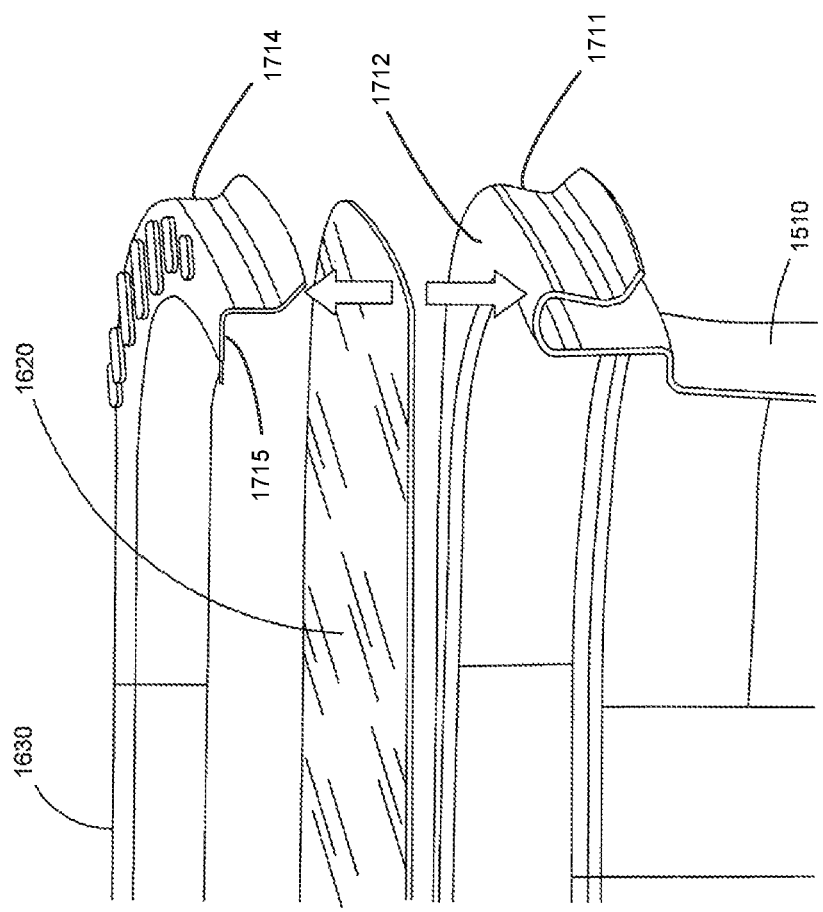

FIG. 17A depicts an isometric exploded view of the product package 1500 with the sealing film 1520 dimensioned so as to fit on the rim of the tray 1510, and the lid 1630 positioned above and configured to attach to the tray 1510 with the sealing film 1520 disposed therebetween. As discussed above, the sealing film 1520 will be releasably attached to the tray 1510 and then the lid 1630 will be then placed thereon, where the lid 1630 will have been prepared in a manner that the sealing film 1520 will become fixedly attached to the lid 1630. FIG. 17B is a partial cross-sectional close-up view of the product package 1500 shown in FIG. 17A. The downwardly-pointing arrow indicates the sealing film 1520 releasably attached to the rim of the tray 1520 and the upwardly-pointing arrow indicates the sealing film 1520 fixedly attached to the lid 1630.

FIG. 18 illustrates an isometric partially-exploded view of the product package 1500 when a consumer opens the package. The consumer removes the lid 1830 from the tray 1510 and since the sealing film 1820 has been fixedly attached to the lid and releasably attached to the tray, the sealing film is lifted away from the tray along with the lid, thus allowing the consumer access to the product within the package 1500.

Figure 19:
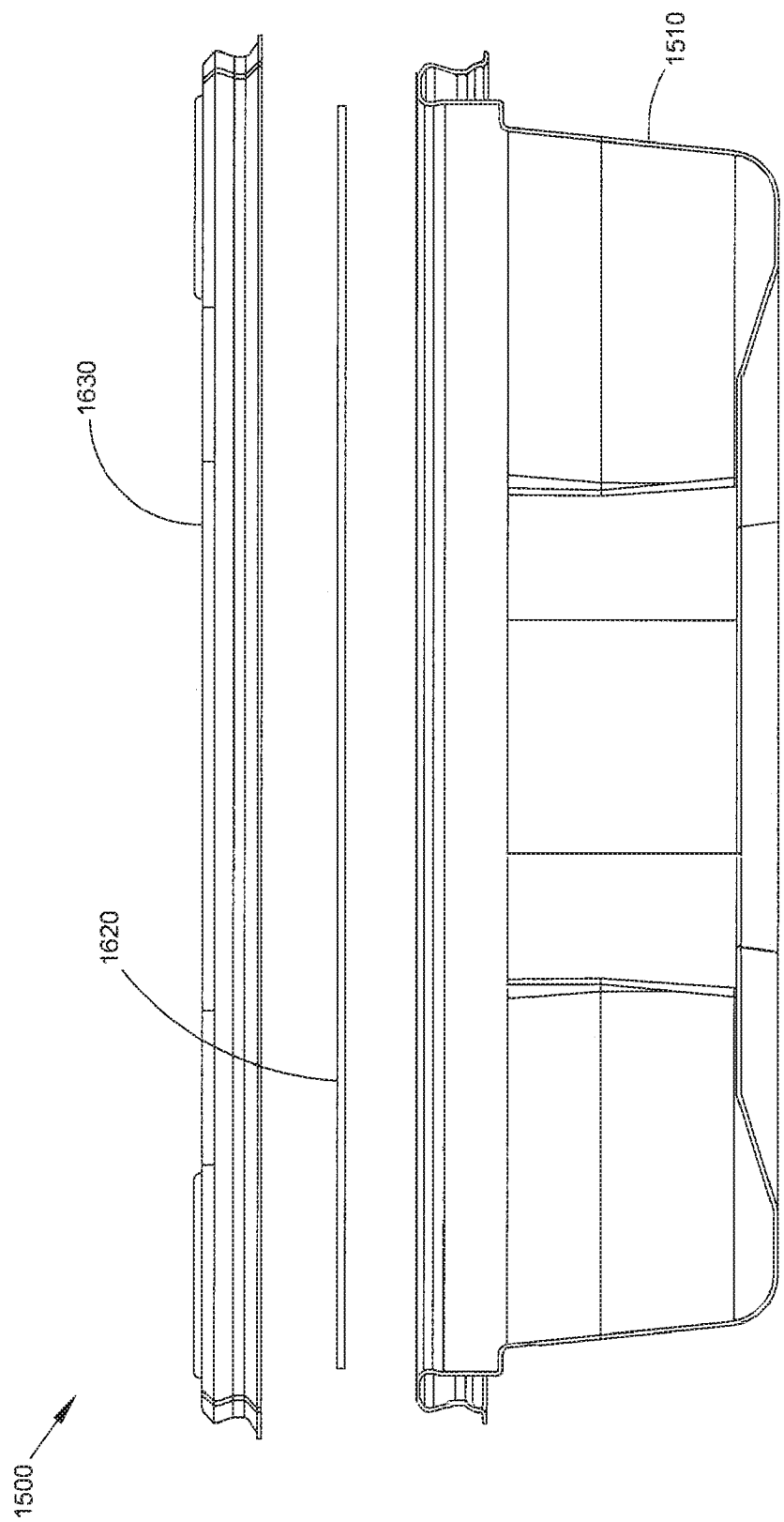

FIG. 19 is a cross-sectional exploded view of the product package 1500 showing the tray 1510, the lid 1630, and the sealing film 1620. FIG. 19 indicates that the sealing film 1620 is/will be fixedly attached/sealed to the lid 1630 and is/will be releasably attached/sealed to the tray 1510, as described in detail above.

An embodiment includes an apparatus, comprising a tray having a base connected to at least one sidewall which extends away from the base terminating at a rim and comprising a ledge formed between the base and the rim; a film releasably attached to the ledge to seal an interior space of the tray from an external environment; and a lid dimensioned to receive the rim when the lid is positioned on the tray, where the lid is fixedly attached to the film, and where the lid is configured to allow a user to access the interior space by disengaging the lid from the tray thereby removing the film from the ledge.

In another embodiment, the lid comprises a channel for receiving the rim when the lid is positioned on the tray. In yet another embodiment, the lid comprises a frame having a channel formed by an outer lid wall and an inner lid wall, where the inner lid wall comprises a flange for attaching to the film, and the frame may circumscribe an opening in the lid with the film spanning the opening.

In still another embodiment, the rim is formed in an inverted U-shape comprising an inner rim wall and an outer rim wall, and the lid comprises a channel formed by an inner lid wall and an outer lid wall for receiving the rim when the lid is positioned on the tray, and where the lid engages the rim by an interference fit between the inner lid wall and the inner rim wall. Other embodiments include a flange attached to the inner lid wall, where the flange is fixedly attached to the film. Further, the flange may mate with the ledge with the film disposed between the flange and the ledge.

In yet still another embodiment, the base is connected to four sidewalls that are arranged to approximate a rectangle.

In a further embodiment, the film comprises a design.

Yet a further embodiment includes an apparatus, comprising a tray having a base connected to at least one sidewall which extends away from the base terminating at a rim, a film releasably attached to the sidewall to seal an interior space of the tray from an external environment, and a lid dimensioned to receive the rim when the lid is positioned on the tray, where the lid is fixedly attached to the film, and where the lid is configured to allow a user to access the interior space by disengaging the lid from the tray thereby removing the film from the sidewall.

A still further embodiment includes a method for accessing a product contained within a storage device, where the method includes the steps of providing a storage device comprising a base connected to at least one sidewall which extends away from the base terminating at a rim and comprising a ledge formed between the base and the rim, placing a product in an interior space of the storage device, releasably attaching a film to the ledge to seal the interior space of the tray from an external environment, providing a lid dimensioned to receive the rim when the lid is positioned on the storage device, fixedly attaching the lid to the film, and accessing the product in one step by disengaging the lid from the storage device thereby removing the film from the ledge.

In yet still a further embodiment, the method includes the step of performing a gas flush of the interior space after the product is placed in the interior space. In an even further embodiment, the method further includes the step of replacing the lid on the storage device.

Figure 20:
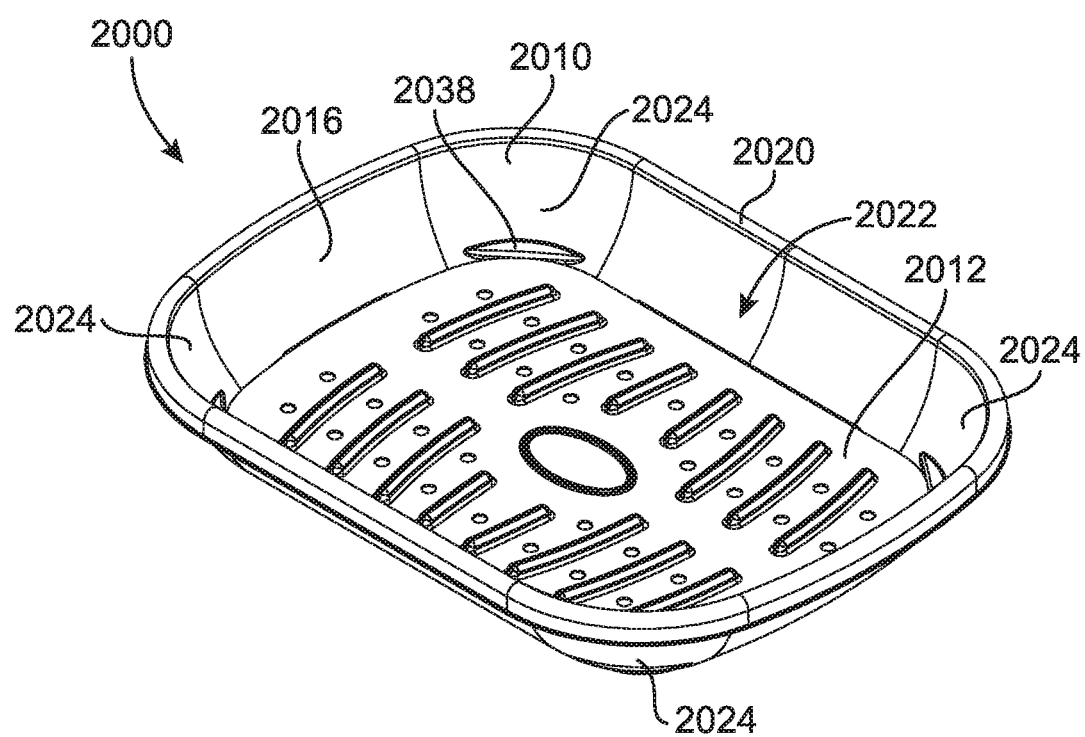
FIG. 20 is an isometric view of another exemplary product package including a shelf in accordance with another aspect of the present disclosure.
Figure 21:
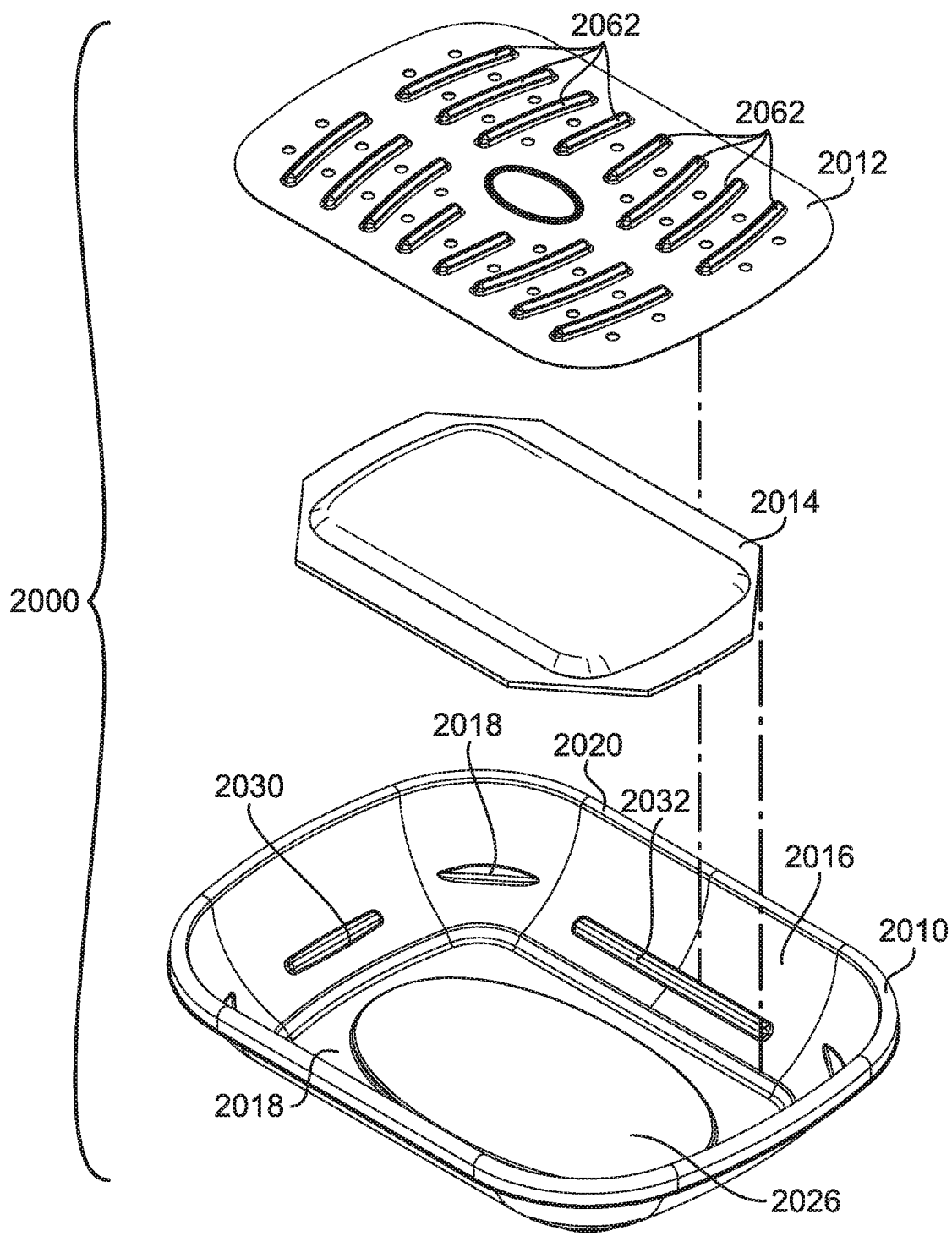
FIG. 21 is an exploded view of the product package of FIG. 20.

Turning now to FIGS. 20-32, another exemplary product package 2000 is shown. In this example, the product package 2000 can include a tray 2010, a shelf 2012 and an absorbent pad 2014. The package 2000 can be molded to include a base 2018 and a sidewall 2016. The sidewall 2016 can project upwards from the base 2018 as shown to define a receptacle or inner chamber 2022. The absorbent pad 2014 can be received into the inner chamber 2022. The shelf 2012 can be positioned over the absorbent pad 2014. In the assembled configuration (FIG. 20), food items such as meats can be placed on the shelf 2012 in the inner chamber 2022. A covering film or other cover, as will be described in further detail below, can be placed over the inner chamber 2022 and/or around the package 2000. In such a configuration, the package 2000 can be used to hold, transport, protect or otherwise retain food items in a convenient, durable, useful and aesthetically pleasing container.

Figure 22:
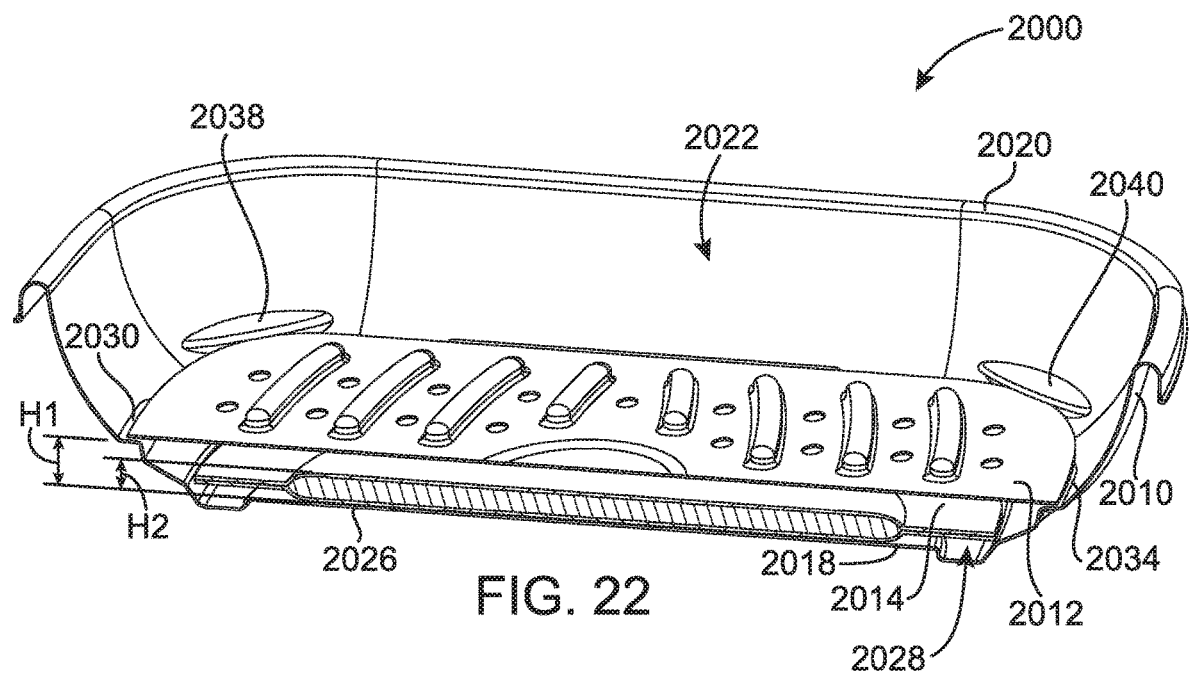
FIG. 22 is a longitudinal cross-sectional view of the product package of FIG. 20.

As shown in FIG. 22, for example, the absorbent pad 2014 can be positioned between the shelf 2012 and the base 2018. The shelf 2012 can be supported in the inner chamber 2022 such that the shelf 2012 is spaced apart from the base 2018. In this position, the space between the shelf 2012 and the base 2018 forms a well into which run-off, juices or other fluids from a food item can flow away from the food item and be absorbed by the absorbent pad 2014 and/or be positioned away from the food item.

In one example use, the package 2000 can be used to hold a meat product such as uncooked chicken. Uncooked chicken can be wet and can expel juices or other drippings after packaging. Consumers often do not like the appearance of uncooked chicken when it is resting in a pool of the juices or other expelled fluids. Additionally, consumers may prefer to handle uncooked chicken that is relatively more dry than uncooked chicken that has been sitting in a pool of its own juices or other expelled fluids. The package 2000 can address these consumer preferences by supporting the uncooked chicken on the shelf 2012 away from the base 2018. The package 2000 can include a space between the shelf 2012 and the base 2018 that can hold the juices and fluids that can drain from the uncooked chicken. The absorbent pad 2014 can be positioned under the shelf 2012 to absorb the juices or other fluids that may drain toward the base 2018.

In some processing methods, food items such as uncooked chicken can be processed in a wet process in which the chicken can be submerged in a water and/or phosphate solution. Such wet processing techniques can advantageously maintain the chicken or other food item in the solution to inhibit bacteria or other contaminants from being deposited or accumulating on exposed surfaces. Such wet processing, however, can result in the chicken or other food item being entrained with fluid that can drain or otherwise flow from the chicken or other food item after processing. The packages of the present disclosure allow the fluids to drain from the chicken or other food item and be captured away from the food item(s). The packages of the present disclosure can also be used to package food items processed using other methods (e.g., air-chilled, non-enhanced, or pre-drained/aged processing methods) but are particularly well suited for food items processed using wet processing techniques.

As can be appreciated, the package 2000 can be used for other items or other foods other than the uncooked chicken described above. Other meats (cooked and uncooked) can be positioned in the package 2000. Vegetables, prepared foods, salads, or other items can also be packaged, stored and transported in the package 2000.

As shown in FIGS. 20-25, the tray 2010 can have a rounded rectangular shape such that the tray 2010 has a length that is greater than its width. The tray 2010 and other elements of the package 2000 may be described using the terms "longitudinal" and "transverse" in the present disclosure. The "longitudinal" direction means a direction aligned in or substantially parallel to a direction along the length of the tray 2010 (i.e., the longer side of the tray 2010). The "transverse" direction means a direction substantially perpendicular to the longitudinal direction or a direction aligned in or substantially parallel to a direction along the width of the tray 2010 (i.e., the shorter side of the tray 2010).

While the tray 2010 can be substantially rectangular in shape, the tray 2010 can have a bowl shape in that the corners 2024 can be radiused to show a rounded outer profile. The sidewall 2016 can also be angled inwardly toward a center of the tray 2010. The rounded profile and the inwardly sloping sidewall 2016 can create the bowl shape of the tray 2010. In other examples, the tray 2010 can have other shapes and other outer profiles. In such examples, the tray 2010 can have a cube shape, oval shape, round shape or other shapes as may be desired.

Figure 23:
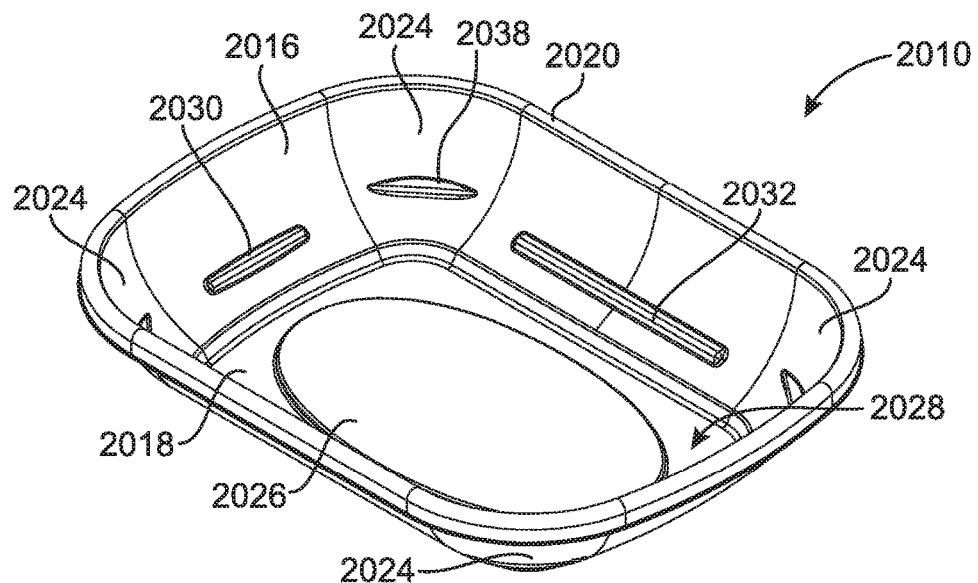
FIG. 23 is an isometric view of an example tray of the product package of FIG. 20.
Figure 24:
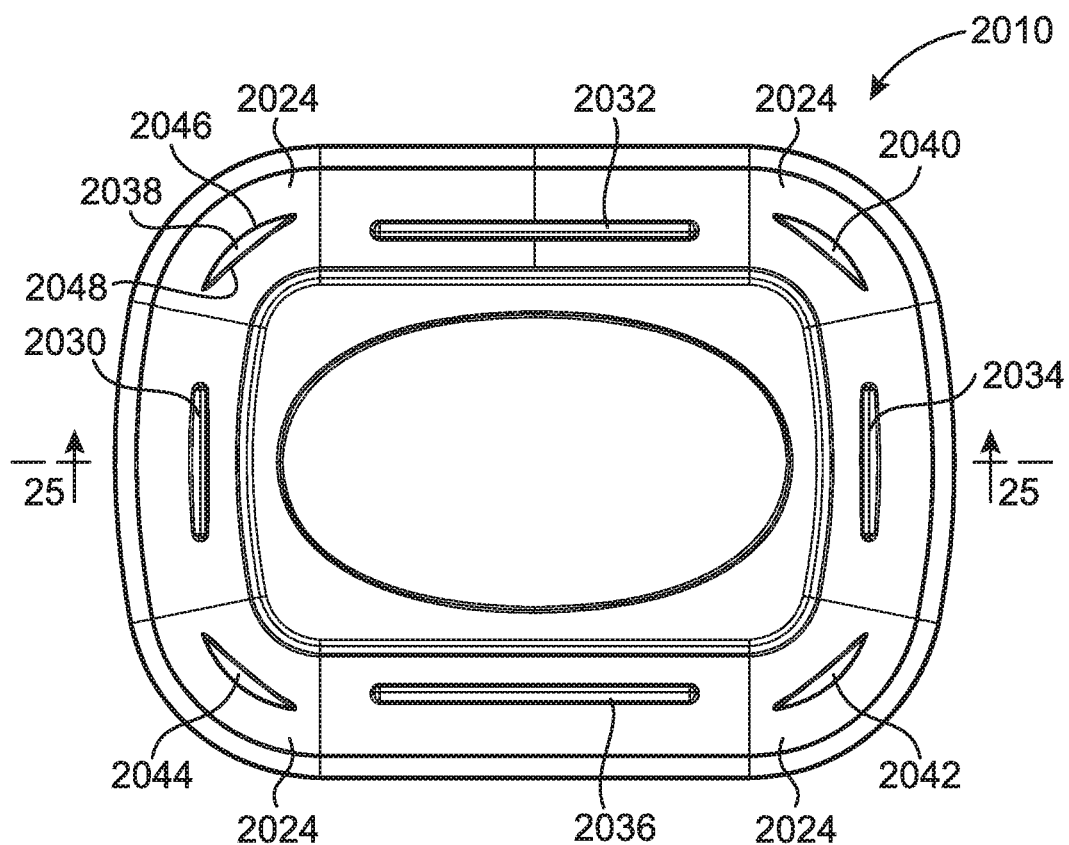
FIG. 24 is a top view of the tray of FIG. 23.
Figure 25:
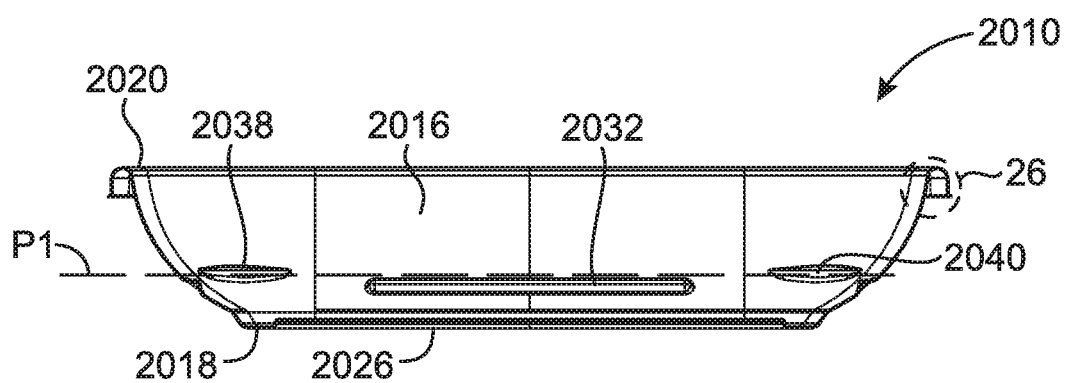
FIG. 25 is a longitudinal cross-sectional view of the tray of FIG. 23.

The base 2018 of the tray 2010 can have a platform 2026. The platform 2026 can be raised above the base 2018 to define a well 2028 (FIG. 23). The absorbent pad 2014 can rest on the platform 2026 when the absorbent pad 2014 is assembled into the tray 2010. As juices or other fluids flow downward toward the base 2018, the fluids can be absorbed by the absorbent pad 2014 and/or excess fluids can fall into the well 2028 under the absorbent pad 2014. In this manner, the fluids can be removed away from the food product that may be contained in the package 2000.

The platform 2026 in the example shown is oval shaped. The platform can have other suitable shapes such as rectangular, square or others as may be desired. The platform 2026 can be used as a surface to apply, print or otherwise display product or branding information to the package 2000. In some examples, a label can be applied to the bottom surface of the platform 2026 that is visible to a consumer. In other examples, the platform 2026 may be configured as one or more raised ribs, projections or other formations that can function as previously described. In still other examples, the base 2018 of the tray 2010 can be substantially planar. In such examples, the base 2018 may not include a platform 2026.

In the example shown (FIG. 24), the tray 2010 may also include one or more features that support the shelf 2012 when the shelf 2012 is assembled into tray 2010. In the example shown, the tray 2010 includes a first support 2030, a second support 2032, a third support 2034 and a fourth support 2036. The second support 2032 and the fourth support 2036 can be oriented on the sidewall 2016 in the longitudinal direction. The first support 2030 and the third support 2034 can be oriented on the sidewall 2016 in the transverse direction.

The supports 2030, 2032, 2034, 2036 can project inwardly away from the sidewall 2016. The supports 2030, 2032, 2034, 2036 can define a support surface or support plane P1 (FIG. 25) on which the shelf 2012 can be positioned during assembly. Because the supports 2030, 2032, 2034, 2036 project inwardly, the shelf 2012 can be restricted from moving toward the base 2018. As will be further described, the support plane P1 can be positioned at any suitable vertical distance from the base 2018 in order to provide a desired position of the shelf and/or to provide spacing for the absorbent pad 2014.

In the example shown, the supports 2030, 2032, 2034, 2036 are discrete projections that are positioned around the sidewall 2016 as previously described. As shown, the second and fourth supports, 2032, 2036 are longer than the first and third supports, 2030, 2034. The second and fourth supports, 2032, 2036 can be approximately twice as long as the first and third supports, 2030, 2034. The supports can have other relative sizes as well and also can be configured as a single continuous support that is positioned around the side wall 2016. In still other examples, the support plane P1 can be defined by a series of projections, darts or other features that can be used to support the shelf 2012. The tray 2010 may also only include supports positioned longitudinally (e.g., only supports 2032, 2036) or may only include transverse supports (e.g., only supports 2030, 2034).

The tray 2010 can also include one or more features that can retain the shelf 2012 in a desired position once it is seated in the tray 2010. In the example shown, the tray 2010 includes a first retention grip 2038, a second retention grip 2040, a third retention grip 2042 and a fourth retention grip 2044. The retention grips 2038, 2040, 2042, 2044 can each be positioned at a corner 2024 of the tray 2010. The retention grips 2038, 2040, 2042, 2044 can be positioned at a vertical location above the base 2018 and vertically above the support plane P1 such that the shelf 2012 can be positioned between the supports 2030, 2032, 2034, 2036 and the retention grips 2038, 2040, 2042, 2044. In this manner, the shelf 2012 can be retained in position on or at the support plane P1.

Each of the retention grips 2038, 2040, 2042, 2044 can be similar to one another with one of each of the retention grips positioned at a corner 2024 of the tray 2010. For the sake of brevity, the first retention grip 2038 is described further below. It should be understood, however, that each of the other retention grips, namely, the second retention grip 2040, the third retention grip 2042 and the fourth retention grip 2044 can be similarly configured.

As shown, the first retention grip 2038 can project inwardly from the side wall 2016. The first retention grip 2038 can include an outer edge 2046 that follows the profile of the sidewall 2016 at the corner 2024. The outer edge 2046 can have an arcuate shape that is shaped similarly to the rounded bowl shape of the tray 2010. The first retention grip 2038 can also include an inner edge 2048. The inner edge 2048, in this example, has a linear profile that can essentially be a chord of the arc of the outer edge 2046. The inner edge 2048 is positioned inward of the sidewall 2016 and is closer to a center of the tray 2010. In this configuration, the first retention grip can overlap a portion of the shelf 2012 to retain the shelf in position in the tray 2012.

Figure 29:
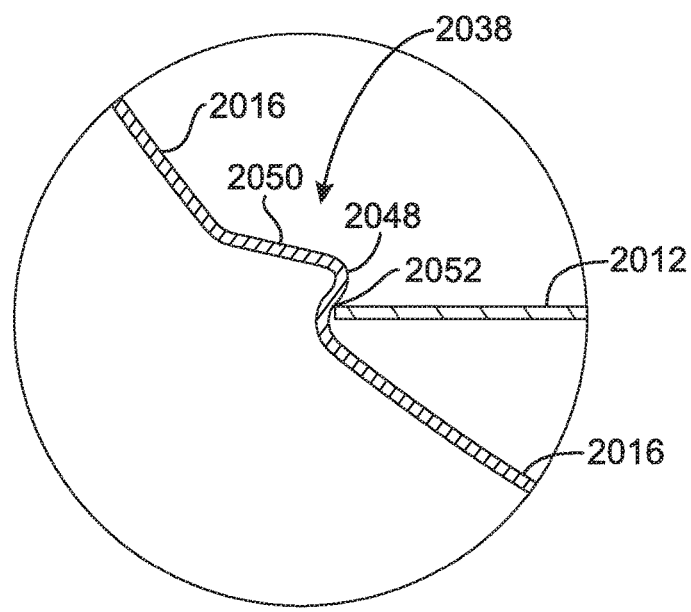
FIG. 29 is a cross-sectional view of the tray and shelf at an exemplary retention grip.

Referring now to FIG. 29, a cross section of the first retention grip 2038 at the corner 2024 is shown. The first retention grip 2038 can also include a top surface 2050 and a gripping surface 2052. The top surface 2050 can be angled downwardly toward the base 2018 and include a smooth radius at the inner edge 2048. The gripping surface 2052 can be located on a lower portion of the first retention grip 2038 and can be rounded and/or angled downwardly toward the sidewall 2016. The smooth surfaces of the first retention grip 2038 allow the gripping surface to contact the shelf 2012 to retain it in position but also allow fluids to easily flow toward the base 2018. In addition, the smooth surface prevent stress concentrations from occurring in the region of the first retention grip 2038 so that the tray 2010 resists cracking, breaking or other failures.

In other examples, the retention grips 2038, 2040, 2042, 2044 can be configured differently. For example, the retention grips can have different shapes or profiles or be of other sizes from that shown in the figures. In one alternate example, the tray 2010 can only include two retention grips positioned at diagonally opposite corners of the tray 2010. In another alternate example, the retention grips can be configured as one or more projections or darts located at one or more of the corners of the tray 2010. Still further, alternatively configured trays with retention grips positioned at or near the supports is shown, for example, in FIGS. 38-44.

In other examples, the shelf 2012 can be retained to the tray using other methods of attachment. In such other examples, the shelf 2012 can be retained to the tray 2010 while still permitting the tray to be moved, opened or otherwise removed so that a consumer can access the absorbent pad 2014 for removal. In such alternate examples, the shelf 2012 can be movably attached to the tray using a staking process, a living hinge, a male-female mating connector, a releasable adhesive or other suitable feature.

Figure 27:
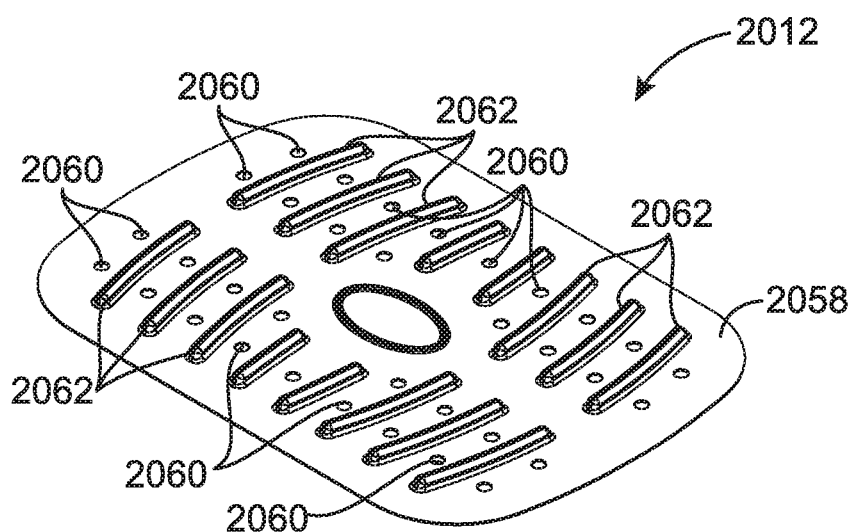
FIG. 27 is an isometric view of an exemplary shelf of the product package of FIG. 20.
Figure 28:
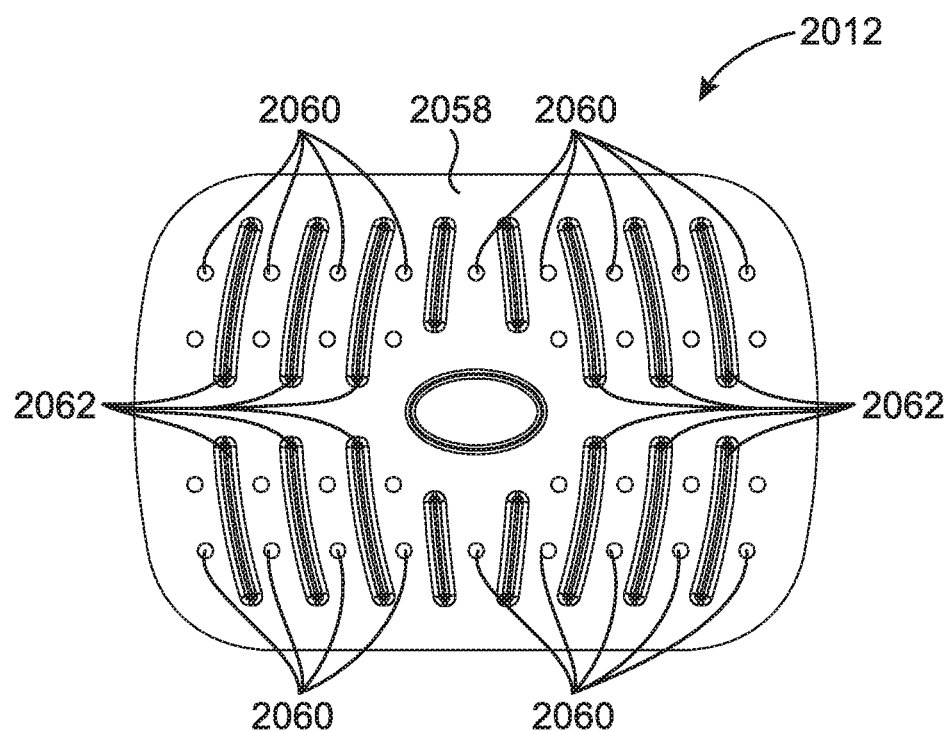
FIG. 28 is a top view of the shelf of FIG. 27.

As shown in FIGS. 27 and 28, the shelf 2012 can have a generally rounded rectangular shape. The shelf 2012 can also include one or more drain holes 2060 that can be dispersed along a support surface 2058 of the shelf 2012. The drain holes 2060 can have any suitable pattern along the shelf 2012 to allow juices or other fluids to flow from an item that is positioned on the shelf toward the base 2018 of the tray 2010.

The configuration of the tray 2010 and the shelf 2012 can also be shaped such that the drain holes 2060 may not be necessary to allow the fluid from a food item to flow toward the base 2018. The smooth shape of the tray 2010 and the angled sidewall 2016 can allow the fluid to flow down the sidewall 2016 toward the base 2018. In addition, the shelf 2012 can be sized such that one or more edges of the shelf 2012 is spaced apart from the adjacent portion of the sidewall 2016 when the shelf 2012 is seated in the tray 2010. The edge of the shelf 2012 and an adjacent portion of the sidewall 2016 can define a gap through which fluid from a food item can flow toward the base 2018. Such gaps, for example, can be located around the entire periphery of the shelf 2012 or around different regions of the shelf 2012, such as the corners, the longitudinal edges and/or the transverse edges. In still other examples, the shelf 2012 can include one or more notches, slits, scallops, channels or other openings along the edges of the shelf 2012 to facilitate the drainage of fluids toward the base 2018.

The shelf 2012 may also include one or more elements along the surface of the support surface 2058 that can limit the food item that is placed in the package 2000 from moving or sliding along the support surface 2058. In the example shown, the shelf 2012 includes a series of ridges 2062 that project upwards from the support surface 2058. The ridges 2062 can have a rounded profile and an arcuate shape as shown. In other examples, the ridges 2062 can have a rectangular profile or other shapes or profiles. The ridges 2062 can also be shaped as dimples, projections or have other designs, or shaped to include a logo or other design element or word.

When an item, such as a piece of uncooked chicken, is placed in the package 2000, the item is supported on the shelf 2012 and is in contact with the ridges 2062. If the package is tipped or angled during shipment or during use by the customer, the ridges 2062 "grip" the item in the package 2000 to prevent the item from sliding along the shelf 2012 and being clumped together in a corner of the package 2000. In addition, the ridges 2062 can stiffen the shelf 2012 and allow the shelf 2012 to support a larger weight than it otherwise would be able to support without the ridges 2062.

Figure 32:
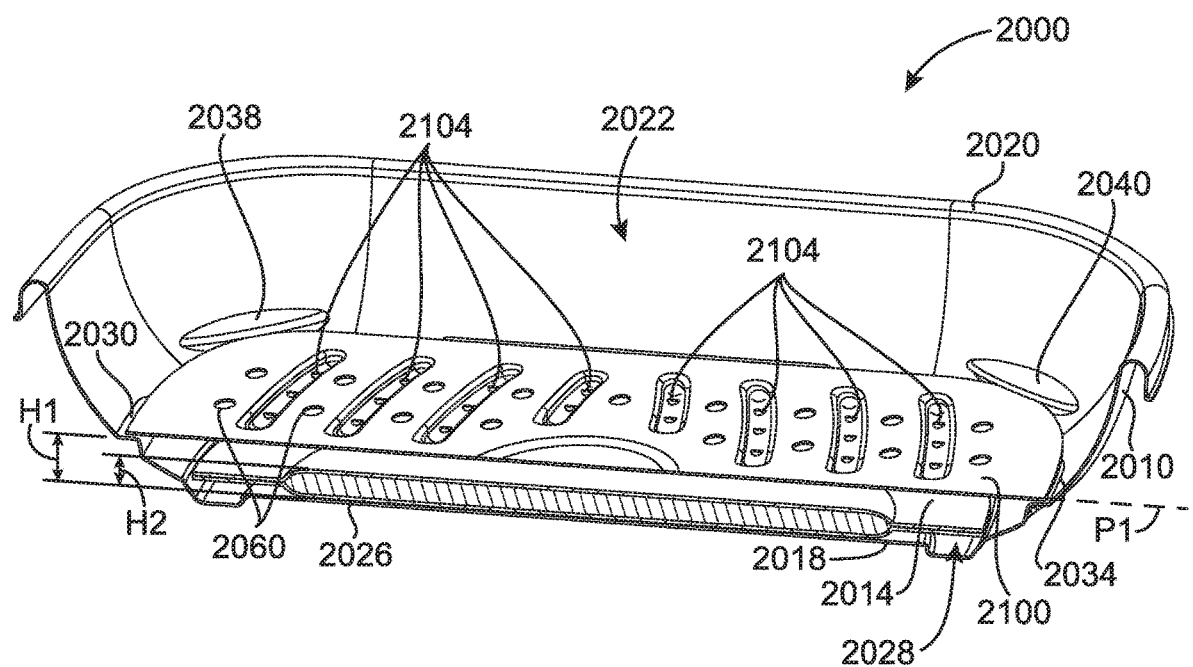
FIG. 32 is a cross-sectional isometric view of another exemplary product package that includes a shelf with ridges projecting toward the base of the tray.

In other examples, such as the example shown in FIG. 32, the package 2000 can include a shelf 2100 that is configured differently from the shelf 2012 previously described. The package 2000 can be substantially similar to the package 2000 previously described and can include the tray 2010 and the absorbent pad 2014. The shelf 2100 can include, for example, ridges 2102 that project downward or toward the base 2018. The general outer profile of the shelf 2100 can be similar to that previously described such that the shelf 2100 can be positioned at a vertical location at or near the support plane P1 and spaced apart from the base 2018. The ridges 2102, in this example, can project from the support plane P1 toward the base 2018 to define a cavity in which the absorbent pad 2014 can be positioned to absorb and retain fluids that may exude from item that is positioned on the shelf 2100.

The shelf 2100 may include one or more drain holes 2060 that can permit fluids to flow toward the base 2018 and toward the absorbent pad 2014. In this example, the ridges 2102 may also include one or more apertures 2104. The apertures 2104 can permit fluid that may otherwise be trapped inside the ridges 2102 to drain toward the base 2018 and toward the absorbent pad 2014. The apertures 2104, in the example shown, can be rounded openings but in other examples, the apertures 2104 can have other shapes or configurations such as rectangular or oval slots. The size of such apertures 2104 can be of a sufficient size to permit the fluids that may flow from a food item (such as a piece of uncooked chicken) to flow through the apertures 2104 and not be retained in the ridges 2102 and/or above the shelf 2100 due to particulates that may become suspended in the fluid or due to the surface tension of the fluid.

Figure 30:
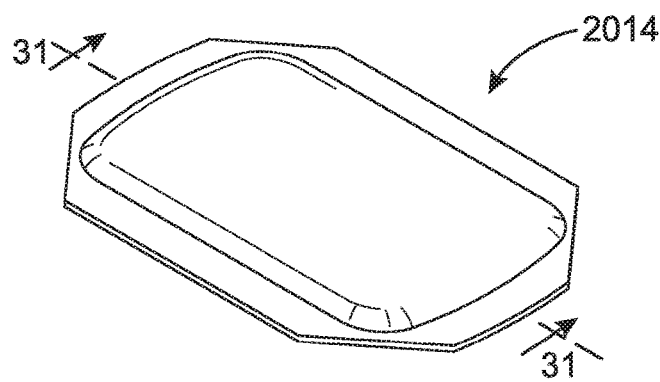
FIG. 30 is an isometric view of an exemplary absorbent pad of the product package of FIG. 20.
Figure 31:
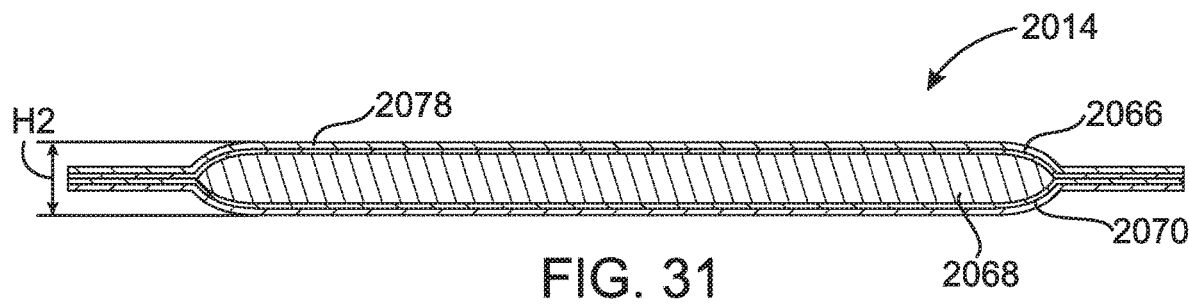
FIG. 31 is a longitudinal cross-sectional view of the absorbent pad of FIG. 30.

As shown in FIGS. 30-31, the absorbent pad 2014 can have a truncated rectangular shape. The absorbent pad 2014 can have a rectangular profile that is then trimmed at each corner to result in the octagonal shape as shown. In other examples, the absorbent pad 2014 can have other shapes such as rectangular, oval or other shapes. In general, the absorbent pad 2014 can have any suitable shape such that it can fit inside the tray 2010 and sit at or near the base 2018.

The absorbent pad 2014 can have one or more layers of material commonly used in the food packing industry. In the example shown, the absorbent pad 2014 can include an outer layer 2078, a middle layer 2066 and an inner layer 2070. The outer layer 2078 can be a water-resistant layer of material such as a polyethylene film or other suitable material. The middle layer 2066 can be made of a non-woven fabric that is formed from a water impermeable material such as a polymer film, polyethylene fiber, a polypropylene fiber, a polyester fiber, or the like. The inner layer 2068 can be made of an absorbent medium or superabsorbent medium such as pulp, cellulosic material or the like. The absorbent or superabsorbent medium can have the property of being able to absorb and retain a significant amount of the fluid material.

Referring back to FIG. 22, the absorbent pad 2018 can be positioned in the tray 2010 between the base 2018 and the shelf 2012. As such, a thickness of the absorbent pad 2018 can be less than the space between the base 2018 (and/or the platform 2026) and the bottom surface of the shelf 2012. As shown, the height of this space (denoted as H1 in FIG. 22) allows the absorbent pad 2018 to be in a position to collect the juices or other fluid that may flow downward toward the base 2010 from a food item packaged in the package 2000. The height H1 can be configured to allow the absorbent pad 2014 to expand when it collects fluid. The "dry" height of the absorbent pad 2014 (denoted as H2 in FIG. 22) can be compared with the height H1 of the space between the base 2018 and the shelf 2012. In one example, the ratio of the height H1:H2 can be 2:1. In another example, the ratio H1:H2 can be 3:1. In still other examples, the ratio H1:H2 can be 4:1, 5:1, 6:1, 7:1 or 8:1. In another example, the ratio H1:H2 is between 2:1 to 5:1. In yet another example, the ratio H1:H2 is between 3:1 to 8:1. In other examples, the heights H1 and H2 can have other relative sizes.

In absorbent pads such as the example pad 2014 previously described, the outer layers of polymer material can restrict the absorbent middle layer's ability to expand and absorb fluid. Some absorbent materials are able to expand to 10x to 30x their original thicknesses when absorbing fluids. When restricted by polymer outer layers, the inner absorbent layer can be restricted and only increase to 2x or 3x its original thickness. The package 2000 of the present disclosure can be used with absorbent pads different from the absorbent pad 2014 previously described.

It can be desirable to use an absorbent pad with outer polymer layers in traditional packages because the pad can contact the food item that is located in the package. In the package 2000, however, the food item is supported above the absorbent pad 2014 by the shelf 2012. Since the absorbent pad does not contact the food item, one or more of the polymer layers (i.e. the outer layer 2078 or the middle layer 2068) can be removed from the absorbent pad 2014. Such elimination of layers can result in cost saving because of the reduced material and/or reduced processing. Furthermore, the "dry" thickness of the absorbent pad can be reduced in pads without one or more polymer layers because the absorbent material of the middle layer 2068 can be unrestricted from absorbing fluids to its full absorbency capacity. Such reduction in the "dry" thickness of the absorbent pad can also reduce the cost of the pad and/or reduce the cost and/or size of the package 2000.

The packages of the present disclosure can also reduce cost by eliminating the need to affix the absorbent pad 2014 to the tray 2010. In traditional packages, the absorbent pad is often affixed to the tray using a hot melt adhesive or other staking, adhesive, or securing method. Since the absorbent pad 2014 of the package 2000 is contained in the chamber 2022 between the shelf 2012 and the base 2018 of the tray 2010, the absorbent pad 2014 does not need to be affixed to the tray 2010 as would be the case in traditional packages. The packages of the present disclosure can be less costly since the step of affixing the absorbent pad can be eliminated. In addition, the material costs associated with the hot melt adhesive can be eliminated as well. As will be described below, the package 2000 also allows for simple disposal of the adhesive pad 2014 (without touching of the adhesive pad 2014) to allow the tray 2010 and the shelf 2012 to be recycled The configuration of the package 2000 as previously described further allows the absorbent pad 2014 to fully expand to its absorbent capacity. In traditional packaging, the food items can be placed directly on top of the absorbent pad. In these circumstances, the food items can be tightly packed in a manner that does not allow the fluids that may flow from the food items to reach the absorbent pad. Instead, the fluids can pool on top of or between the food items. Testing of traditional packaging has confirmed that as much as 25% to 50% of traditional packages have absorbent pads that remain in a dry or unabsorbed state after packaging.

In addition to sealing fluids from flowing to the absorbent pad, traditional packaging also prevents the absorbent pads from utilizing their absorbent capacities. Since the food items are placed directly on top of absorbent pads in traditional packaging, the weight of the food item(s) can prevent and/or limit the absorbent pad from swelling and utilizing its complete absorbent capacity.

The packages of the present disclosure can address these undesirable aspects of traditional packaging. The packages of the present disclosure separate the food item(s) from the absorbent pad. In the example described above, the food item(s) can be placed on the shelf 2012 that is spaced apart from the base 2018 of the tray 2010 and from the absorbent pad 2014. In this configuration, the weight of the food item(s) is supported by the shelf 2012 and not by the absorbent pad 2014 or the base 2018. This can allow the absorbent pad 2014 to fully utilize its absorbent capacity. In addition, the shaped of the tray 2010, the fit between the shelf 2012 and the tray 2010, and the drain holes in the shelf 2012 allow fluids to drain from the food item(s) toward the base 2018 and toward the absorbent pad 2014.

Figure 33:
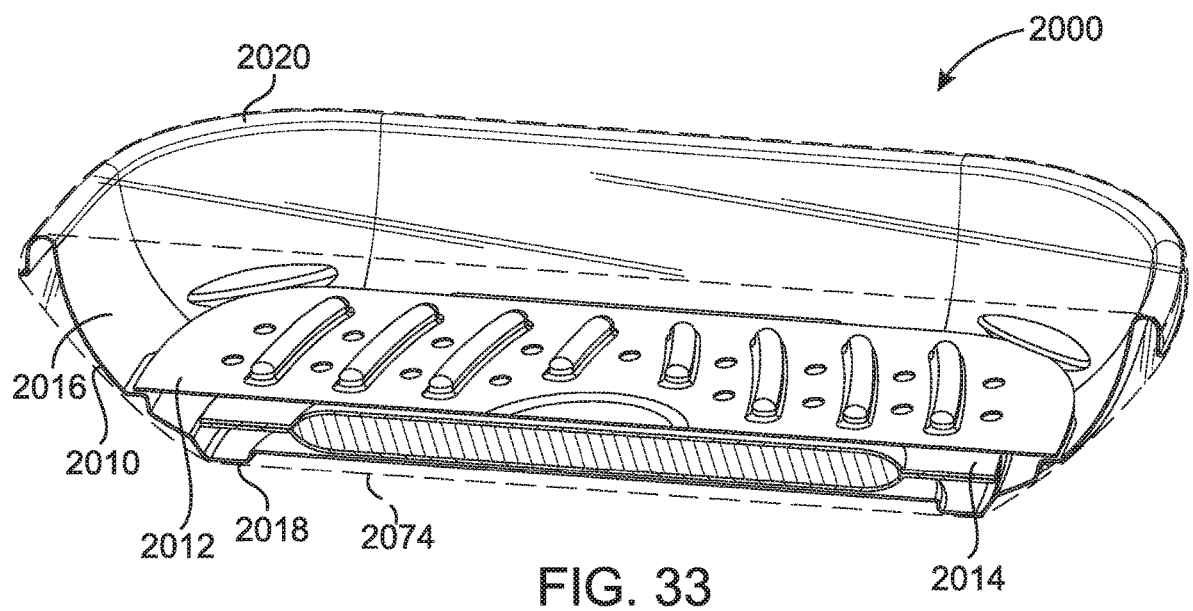
FIG. 33 is a cross-sectional isometric view of the product package of FIG. 20 showing the product packaged wrapped in a covering film.

Turning now to FIG. 33, the package 2000 is shown covered in a film wrap 2074 (shown in dashed lines). The film wrap 2074 can be any suitable wrap for food products such as a polymer film wrap. The package 2000 including the tray 2010, the absorbent pad 2014, the shelf 2012 and a food item (not shown) can be wrapped in the film wrap 2074. After the package 2000 is wrapped, the package 2000 can be stored, transported and displayed for retail sale to a consumer. The film wrap 2074 can be any suitable polymer film wrap and can be a permeable or non-permeable material depending on the type of food item that is placed in the package 2000. The type of film wrap 2074 may also be dependent on whether the food item is packaged in an ambient atmosphere or in a modified atmosphere environment. As can be appreciated, the film wrap can be a barrier or non-barrier material depending on the desired atmosphere of the packaged food item.

Figure 26A:
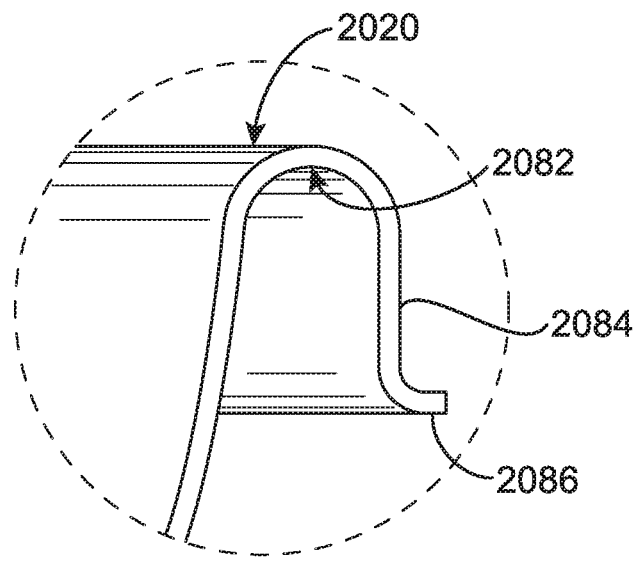
FIGS. 26A and 26B are magnified views of exemplary rims of the tray of FIG. 23.

As shown in FIG. 26A, the tray 2010 can include a rim 2020 around the upper portion of the sidewall 2016. The rim 2020 can include a rim radius 2082, a rim wall 2084 and a rim lip 2086. The sidewall 2016 can curve outward in a rounded shape to define the rim radius 2082. The rim radius 2082 can have any suitable shape but is preferably a smooth rounded shape to permit the film wrap 2074 to contact the rim at the apex of the rim radius 2082 to result in a first seal to prevent the leakage of fluids from the package 2000.

The rim 2020 also includes the rim wall 2084 that can project downward or away from the rim radius 2082 on a side of the sidewall 2016 outside of the inner chamber 2022. The rim lip 2086 can be connected to a lower portion of the rim wall 2084. The rim lip 2086 can project outwards away from the rim wall 2084. In the example shown, the rim lip 2086 is oriented substantially parallel to the base 2018. The film wrap 2074 can contact the rim lip 2086 after the film wrap 2074 wraps over the rim radius 2082 and downward toward the base 2018. The film wrap 2074 can create a second seal to prevent the leakage of fluids from the package 2000.

Figure 26B:
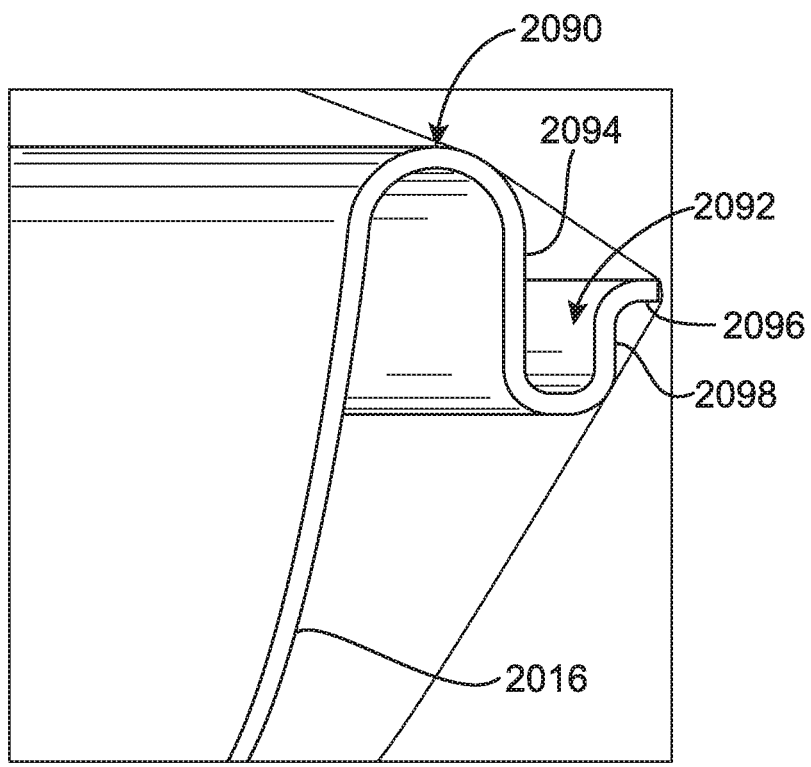

As shown in FIG. 26B, an alternatively configured rim 2090 is shown. In this example, the rim 2090 can have many of the same features previously described with respect to FIG. 26A. In this example, however, the rim 2090 can include a groove 2092 positioned between the rim wall 2094 and the rim lip 2096. The groove 2092 can have a rounded shape defined by the rim wall 2094 and an outer rim wall 2098 as shown. The film wrap 2074 can be sealed into the groove 2092 to provide another seal that can prevent the leakage of fluids from the package 2000.

In other examples, the package 2000 can be inserted into a bag or pouch (not shown). In such examples, the bag or pouch serves to seal the contents of the package 2000 from leaking and from contact with the ambient environment. The bag or pouch can serve a similar function as the film wrap 2074 previously described. The bag or pouch can be shaped to securely fit around the package 2000. In other examples, the bag or pouch can be shrink wrapped around the package 2000 to engage the rim 2020 and to form around the other contours of the package 2000.

Figure 34:
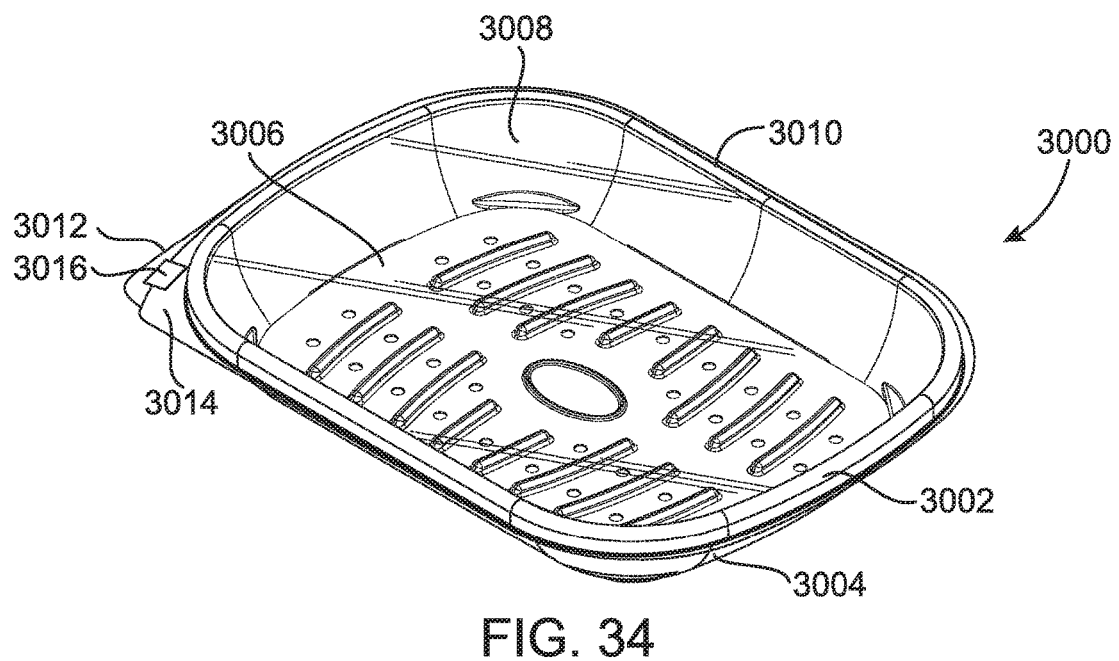
FIG. 34 is an isometric view of another exemplary product package of the present disclosure including a lid, film wrap, tray and removable shelf.
Figure 35:
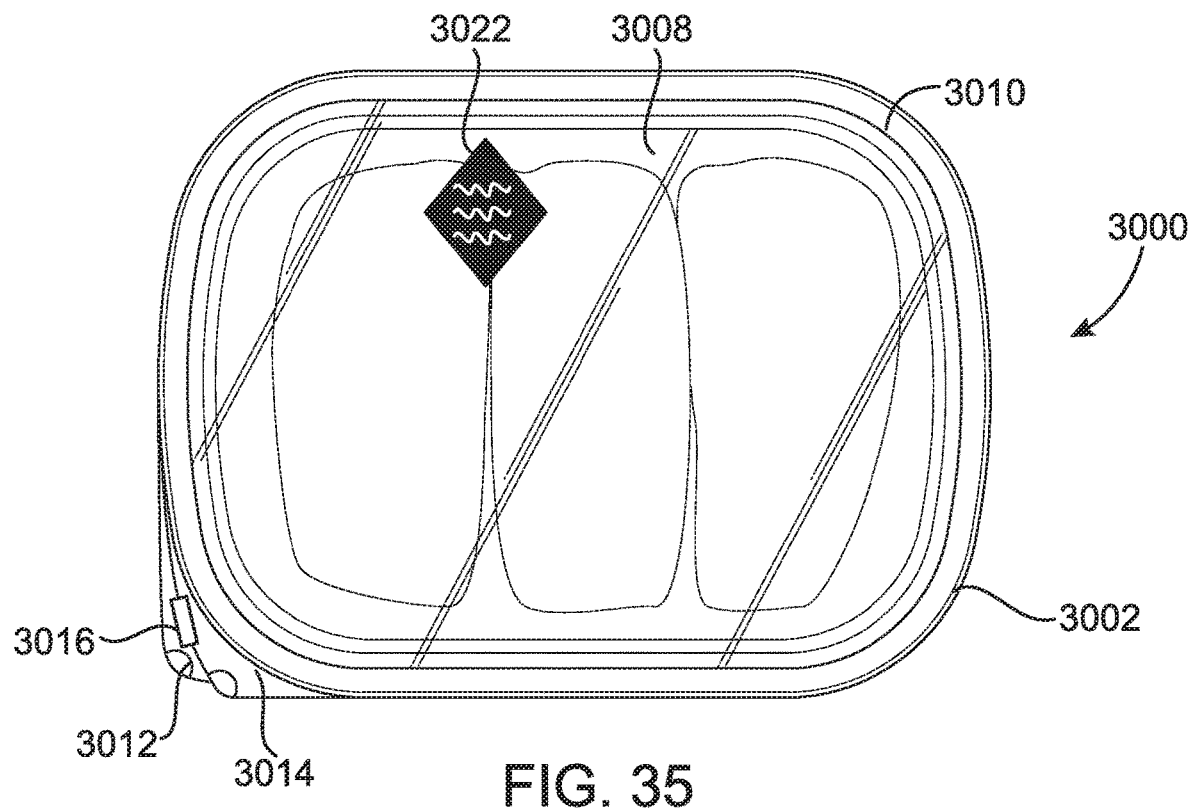
FIG. 35 is a top view of the product package of FIG. 34.

Referring now to FIGS. 34 and 35, a product package 3000 is shown. The product package 3000 can incorporate many of the features and/or elements of the product package 2000. For example, the package 3000 can include the basic structure of the tray 2010, the shelf 2012 and the absorbent pad 2014. Instead of being covered in the film wrap 2074, however, the package 3000 can incorporate the lid and the sealing film as previously described with respect to packages 100, 500, 700, 800 and 1500. As shown, the package 3000 can include a lid 3002, a tray 3004, a shelf 3006, a sealing film 3008 and an absorbent pad (not shown). For the sake of brevity, the various details of the lid, sealing film and the mating structures of the tray are not repeated. It should be appreciated, however, that any of the variations on the lid, sealing film and the tray can be used in conjunction with the package 3000.

As shown in FIG. 34, the sealing film 3008 can be clear or transparent and/or can be substantially free from markings or other graphics. In other examples (FIG. 35), the sealing film 3008 can include graphic 3022 that is printed or registered on the sealing film 3008. The graphic 3022 can have any shape or size and can include any type of graphic elements, branding materials or other product information. In still other examples, the sealing film 3008 can include multiple graphics 3022, labels, branding information or other product information. Such graphics, labels, branding information or other product information can also be positioned on the lid 3002 or be positioned across both the lid 3002 and the sealing film 2008. As can be appreciated, the film wrap 2074 and/or sealing films 120, 320, 420, 520 can also be substantially clear or may include one or more graphics, labels, branding materials or other product information.

As previously described, the sealing film 3008 can be releasably attached and/or sealed to the tray 3004 and fixedly attached and/or sealed to a frame 3010 of the lid 3002. The lid 3002 can create a mechanical seal to the tray 3004 and can also be heat sealed to the tray 3004 or sealed with an adhesive to the tray 3004. In this configuration, a consumer can open the package 3000 by lifting and separating the lid 3002 from the tray 3004. As such action occurs, the sealing film 3008 can release from the tray 3004 in order to access a food item that may be contained in the package 3000. The consumer can then reseal the package 3000 by replacing and lowering the lid 3002 onto the tray 3004. As can be seen, the frame 3010 of the lid 3002 can define and/or circumscribe an opening. The sealing film 3008 can be positioned across the opening to seal the contents of the package 3000 when the lid 3002 is positioned on the tray 3004. The package 3000 can also be configured such that a consumer may reseal the package 3000 by covering the opening of the tray 3004 with a common cling wrap or plastic film often found in consumer's kitchens.

The tray 3004 can include a first release tab 3012 and the lid 3002 can include a second release tab 3014. When the lid 3002 is positioned on the tray 3004, the first release tab 3012 and the second release tab 3014 are located at a common corner of the package 3000. The first release tab 3012 and the second release tab 3014 can be skewed from one another and/or have mismatched shapes such that the outer edges of the first release tab 3012 and the second release tab 3014 are not aligned with one another. In this configuration, a consumer can grasp each of the first release tab 3012 and the second release 3014 to easily separate the lid 3002 (and the sealing film 3008) from the tray 3004.

The package 3000 may also include a tamper evident sticker 3016. The tamper evident sticker 3016 can be any suitable material that can be attached across a portion of the first release tab 3012 and a portion of the second release tab 3014. When a consumer opens the package 3000, the sticker 3016 clearly displays to the consumer that the package 3000 has been opened. When the sticker 3016 is intact or otherwise in its original state, the consumer can have confidence that the package 3000 has not been opened since it was originally packaged and/or sealed. In the example shown, the sticker 3016 is a rectangular piece of adhesive material. In other examples, the sticker 3016 can have other shapes (e.g., circular, square-shaped, star-shaped, polygonal) and can be attached using other fastening methods (e.g., hot melt, shrink-wrapped, etc.).

In other examples, the package 3000 can include other types of tamper-evident or tamper-resistant features. Such tamper-evident or tamper-resistant features can be included on the tray 3004 and/or the lid 3002. Other types of tamper-evident or tamper-resistant features may include a heat sealed joint between the tray 3004 and/or the lid 3002, a perforated tear tab at a joint between the tray 3004 and the lid 3002, and/or a male/female plug fit on the tray 3004 and the lid 3002.

Figure 36:
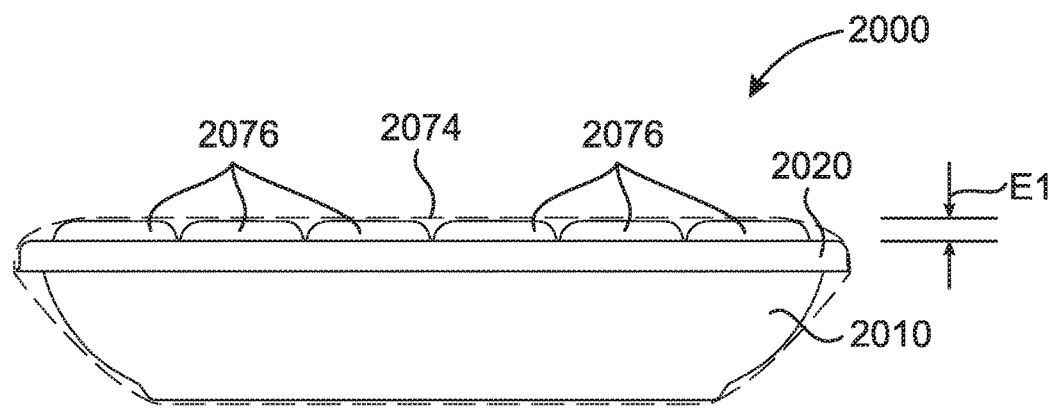
FIG. 36 is a side view of the product package of FIG. 33.

As shown in FIG. 36, the package 2000, in one example, can be sized and configured to permit one or more food items 2076 that may be positioned inside the package 2000 to extend above the rim 2020 of the tray 2010. The film wrap 2074, in the example shown, can be wrapped over the food items 2076 and can contact the rim 2020 such that any fluids that may drain from the food items 2076 flow into the tray 2010. As previously described, the fluids can also be absorbed by the absorbent pad 2014 positioned under the food items 2076 in the tray 2010.

Depending on the size of the food items 2076, the distance that the food items 2076 may extend above the rim 2020 can vary. As shown, the food items 2076 can extend above the rim 2020 by a vertical distance μl. In some examples, the food items 2076 may extend above the rim 2020 by a distance μl that is equal to or greater than 1 inch. In other examples, the food items 2076 may extend above the rim 2020 by a distance μl that is greater than or equal to 2 inches. In still other examples, the food items may extend above the rim 2020 by a distance μl that is greater than or equal to 3 inches. As can be appreciated, food items such as ground meat or de-boned chicken may extend above the rim 2020 by a distance less than a larger food item such as bone-in chicken pieces, a whole chicken or a pork or beef roast, for example.

The ability of the package 2000 to accommodate different size food items and to capture fluids that may drain from such food items is advantageous. This functionality and versatility of the packages of the present disclosure allow food producers and/or packagers to reduce the amount of different size packages that are needed to package the various different food items that they may supply to the marketplace. In addition, the ability of the packages of the present disclosure to allow food items to extend above the rim of the package allows producers/packagers to more densely pack multiple packages together and/or to reduce or minimize "empty" space inside the packages. Such advantages can reduce costs for the producer/packagers. Such savings can also extend to retailers that can more densely pack the packages into coolers or other retail spaces.

Figure 37:
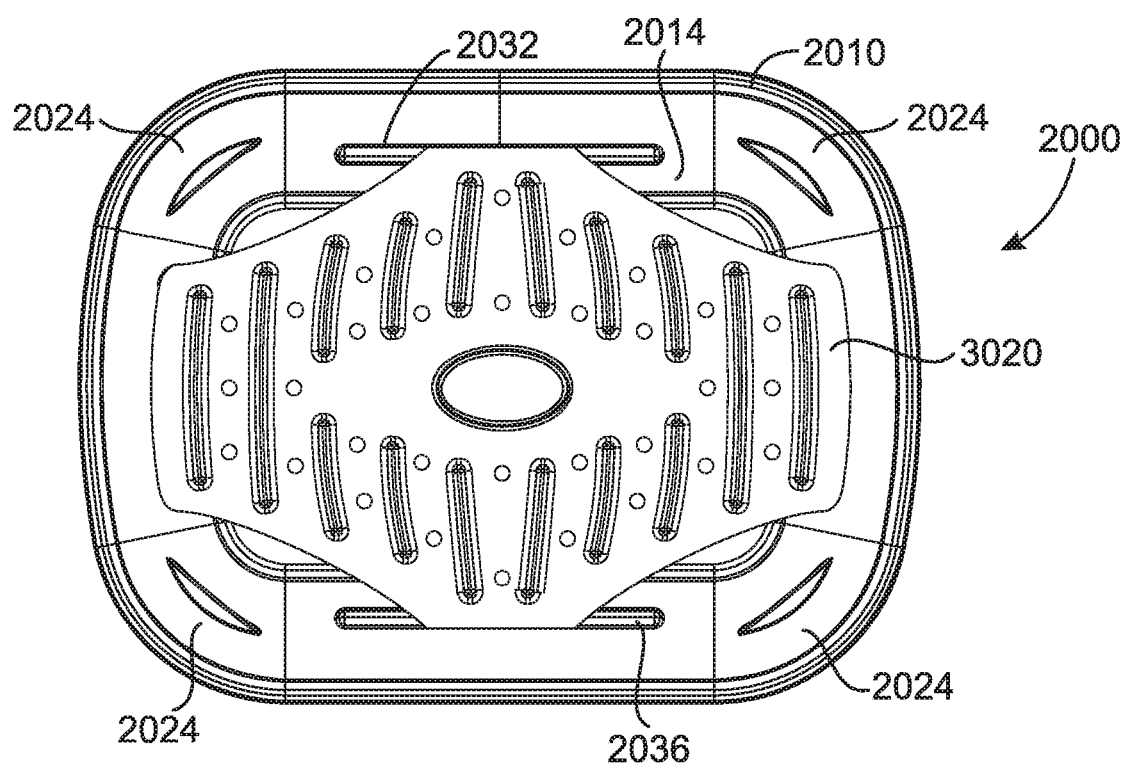
FIG. 37 is a top view of another exemplary product package of the present disclosure showing an alternatively configured shelf that is different from the configuration of the shelf of the product package of FIG. 20.

As shown in FIG. 37, the package 2000 can include a shelf 3020 that has a different outer profile from that previously described and shown. In another example of the package 2000, the shelf 3020 can have a rounded cross-shape as shown. In this example, the corners of the shelf 3020 have a concave rounded profile that are rounded inward toward a center of the shelf 3020. With this configuration, the shelf 3020 can be spaced away from each of the corners 2024 of the tray 2010. The shelf 3020 can be otherwise similarly configured to that of the shelf 2012. While not shown, the shelf 3020 and/or the tray 2010 can include one or more retention grips that can retain the shelf 3020 to the tray 2010. In one example, the retention grips can be positioned along the longitudinal or transverse portions of the sidewall to interact with the portions of the shelf 3020 that may be located adjacent the sidewall.

The shelf 3020 has a shape with less surface area than that of shelf 2012. Subsequently, the shelf 3020 can be made with less material than that of shelf 2012. In one example, the shelf 3020 has a shape and/or surface area that permits the shelf 3020 to be nested with one or more of the components of the package 2000. In one example, the shelf 3020 is shaped to permit the shelf 3020 to be nested with the tray 2010 during the forming process to reduce the amount of waste material.

Figure 38:
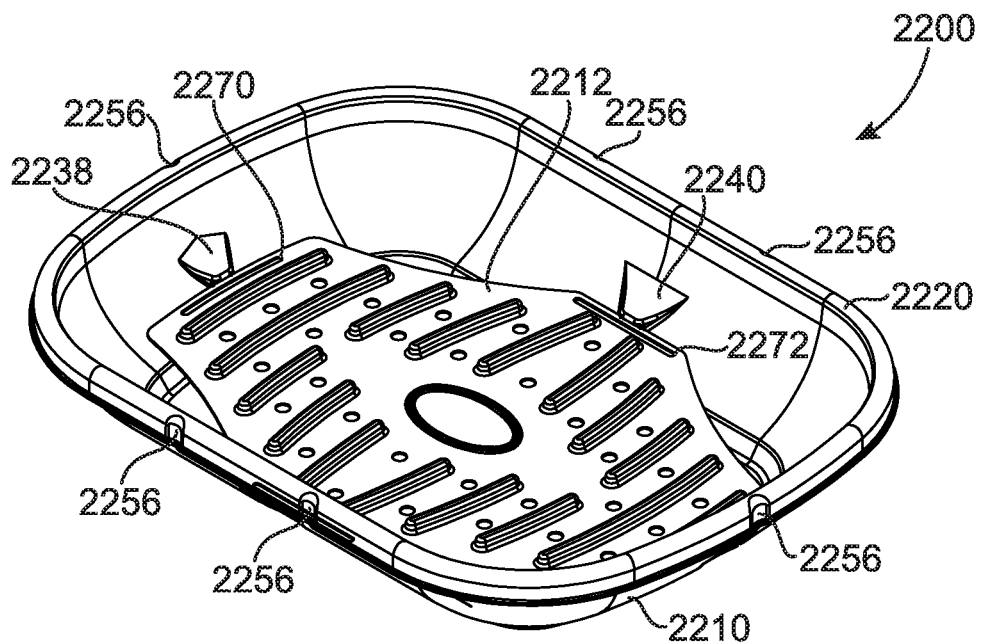
FIG. 38 is an isometric view of another exemplary product package of the present disclosure.
Figure 39:
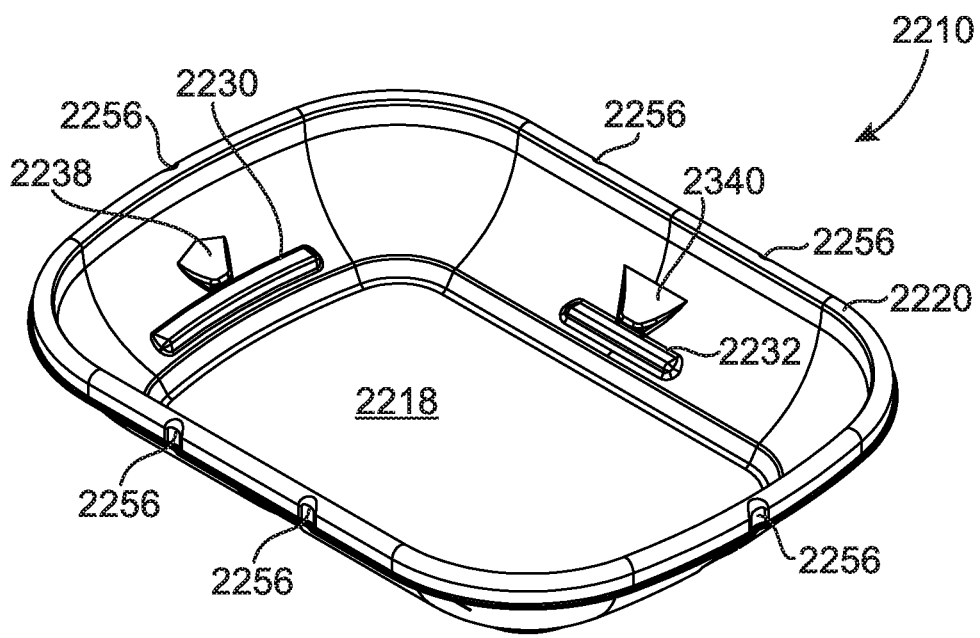
FIG. 39 is an isometric view of an example tray of the product package of FIG. 38.
Figure 40:
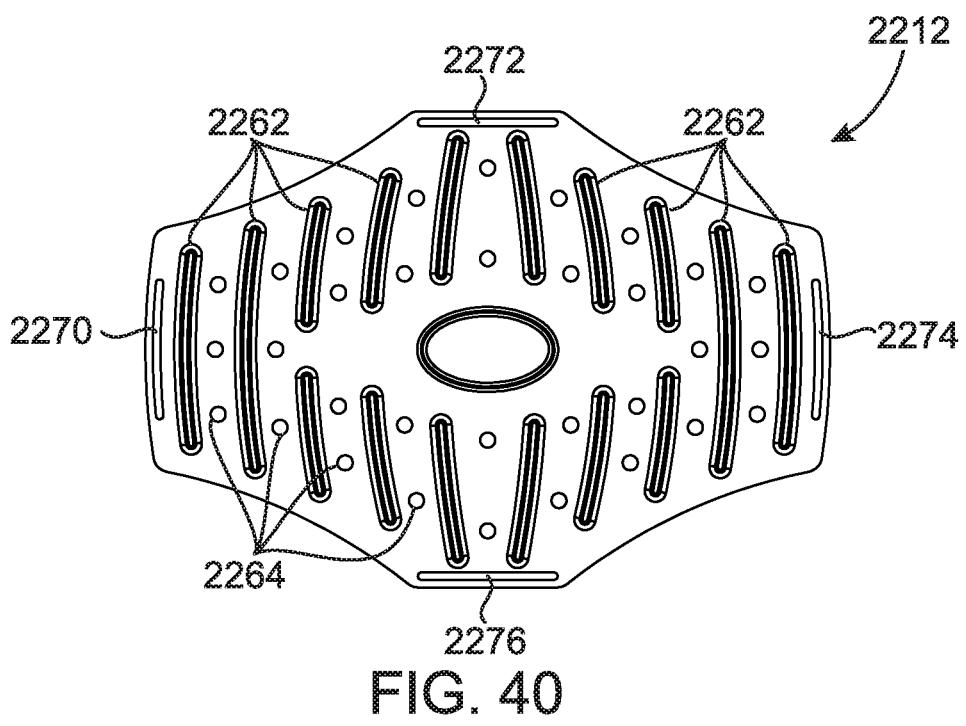
FIG. 40 is a top view of an example shelf of the product package of FIG. 38.
Figure 41:
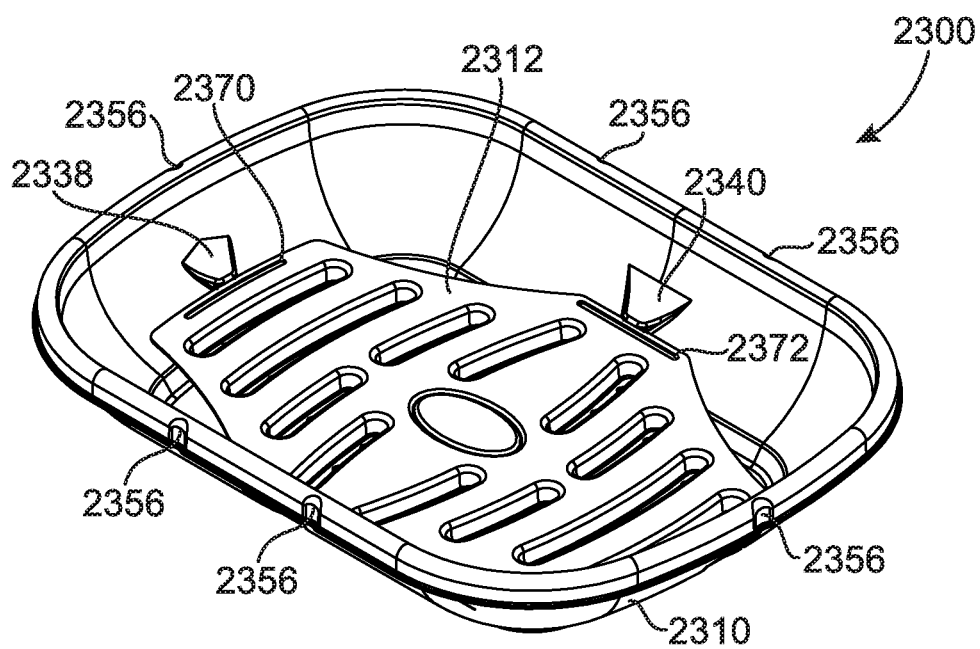
FIG. 41 is an isometric view of another exemplary product package of the present disclosure.
Figure 42:
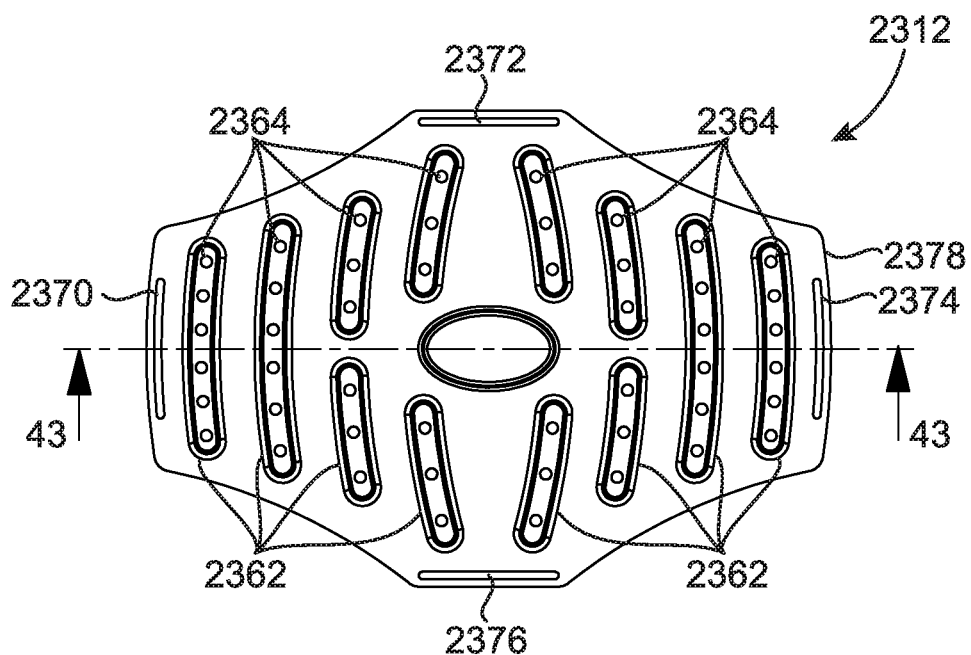
FIG. 42 is a top view of an example shelf of the product package of FIG. 41.

Another example package 2200 is shown in FIGS. 38-40. The package 2200 can have many of the same features and be configured similarly to the other packages in the present disclosure. The package 2200 can be similarly configured, for example, to package 2000 previously described. For the sake of brevity, some of the differences between package 2200 and package 2000 are described below.

Package 2200 can include a tray 2210, a shelf 2212 and an absorbent pad (not shown). The tray 2210 can be similarly configured as previously described with respect to tray 2010. In this example, however, the tray 2210 can include retention grips 2238, 2240 positioned on the sidewall of the tray at or near the supports 2230, 2232. Instead of being positioned at or near the corners of the tray 2210, the retention grips 2238, 2240 can be positioned at or near approximate mid-points of the sides of the tray 2210. While not visible in FIGS. 38 and 39, the tray can have retention grips and supports positioned on opposite sides of the tray 2210 from retention grips 2238, 2240 and supports 2238, 2240. The tray 2210 can include any suitable number of retention grips to retain the shelf 2212 in a position separated from the base 2218 of the tray 2210. In this manner, the shelf 2212 can support food items at a position above the base 2218 of the tray 2210 to allow fluids to flow into the base 2218 and/or toward the absorbent pad. In the example shown, the tray 2210 includes four retention grips 2238, 2240 each positioned on a side of the tray 2210. In other examples, the tray 2210 may include two retention grips. In such examples, the pair of retention grips can be positioned on opposing sides of the tray 2210 to retain the shelf 2212 in position.

The tray 2210 can also include one or more gussets 2256. The gussets 2256 can positioned along the rim 2220 of the tray 210 to prevent or minimize leak points that may be induced into the package after the wrapping process. Such leak points can be created if the rim 2220 of the tray 2210 buckles during or after the wrapping process. When the tray 2210 is wrapped, a force is applied to the film wrap 2074 to smoothly, sealingly and securely wrap the package 2200. When such force is used during the wrapping process, the film wrap 2074 can cause the rim 2220 of the tray 2210 to buckle. If buckling occurs in a manner in which the rim 2220 folds on itself, a sharp point can be created at the point of buckling. This sharp point can pierce, cause abrasion, tear or otherwise compromise the film wrap 2074 and allow fluids to escape at this leak point. Such leak points are undesirable. The gussets 2256 assist in minimizing the likelihood that, should buckling occur, that the rim 2220 will buckle outward and create a sharp point to pierce or otherwise compromise the film wrap 2074. Such pre-designed detents, such as gussets 2256, can act as a shock absorber to redirect deformation of the tray 2210.

In the example shown, the gussets 2256 can have a rounded concave shape that projects inwardly from the rim 2220 a center of the tray 2210. In other examples, the gussets 2256 can have other shapes and can be positioned at other locations on the rim 2220. In the example shown, the tray 2210 includes two gussets along each longitudinal side and one gusset on each transverse side. In other examples, the tray 2210 can include more or less gussets. In still other examples, the tray 2210 can also or alternatively include ribs, darts or other stiffening features to assist in preventing the rim 2220 from buckling.

The shelf 2212 can be similarly shaped as the shelf 3020 previously described. In the example shown, the shelf 2212 can include ridges 2262 that project upwards and away from the base 2218 of the tray 2210. The shelf 2212 can also include a series of drain holes 2264 positioned between the ridges 2262. The drain holes 2264 can allow fluids to flow from the food items that may be positioned on the shelf 2212 to the base 2218 and/or toward the absorbent pad positioned below the shelf 2212. The ridges 2262 can have any suitable shape, profile or layout and can stiffen the shelf 2212 and/or assist in limiting movement of the food items in the package 2200 as previously described.

In another example package 2300 (FIGS. 41-43), a shelf 2312 can be configured to have ridges 2362 that project downwards or toward the base 2318 of the tray 2310. The package 2300 can be similarly configured as the package 2200 previously described. As shown, the package 2300 can include a tray 2310, a shelf 2312 and an absorbent pad (not shown). In such examples, the shelf 2312 may include one or more apertures 2364 positioned in the ridges 2362 to permit fluids to flow toward the base 2318 and/or the absorbent pad. The shelf 2312 may be solid between the ridges 2362 and not include drain holes between the ridges 2362. In other examples, drain holes can be positioned between the ridges 2362. The tray 2310 can also include one or more gussets 2356 along the rim of the tray 2310. The gussets 2356 can be similar to the gussets 2256 previously described.

As further shown in the packages 2200, 2300, the shelf 2212, 2312 can include one or more relief features at a location toward the periphery of the shelf 2212, 2312. In the examples shown, the shelf 2212, 2312 can include a first relief 2270, 2370, a second relief 2272, 2372, a third relief 2274, 2374 and a fourth relief 2276, 2376. The first relief 2270, 2370 can be positioned at or near the first retention grip 2238, 2338. The second relief 2272, 2372 can be positioned at or near the second retention grip 2240, 2340. The third relief 2274, 2374 and the fourth relief 2276, 2376 can be positioned at or near the third retention grip and the fourth retention grip, respectively.

Figure 43:
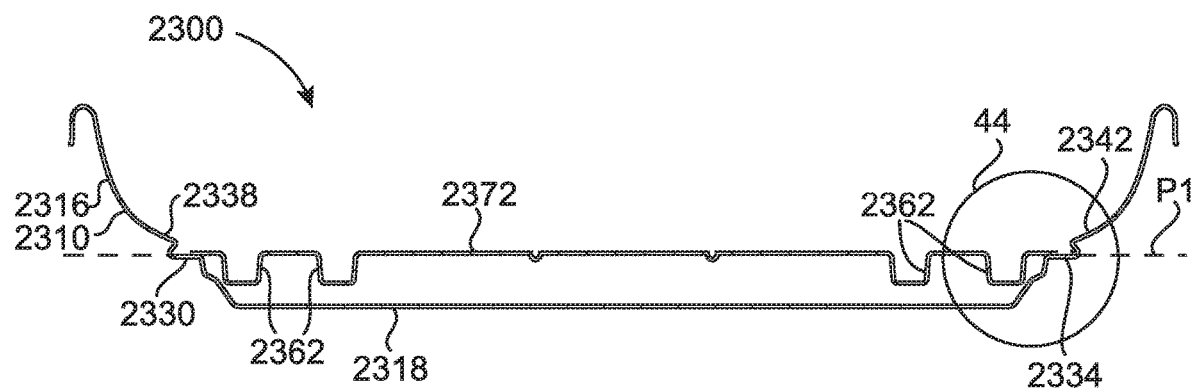
FIG. 43 is a longitudinal cross-sectional view of the product package of FIG. 41.

In this manner, the shelf 2212, 2312 can include a relief at or near each respective retention grip. The relief can allow the shelf 2212, 2312 to deform at or near the retention grip when the shelf 2212, 2312 is installed into the supported position on the supports at the support plane P1 (FIG. 43). When the shelf 2212, 2312 is installed into the supported position, the longitudinal length and/or the transverse width of the shelf 2212, 2312 can be greater than the longitudinal gap and/or the transverse gap between the oppositely positioned retention grips. The reliefs can allow the edges of the shelf 2212, 2312 at the retention grips to deform inwardly toward a center of the tray 2210, 2310 to allow the shelf 2212, 2312 to move past the retention grips. After the edges of the shelf 2212, 2312 have passed the retention grip, the edges of the shelf 2212, 2312 can flex back toward their original positions and be seated under the retention grip to retain the shelf 2212, 2312 in a retained position at the support plane P1.

Figure 44:
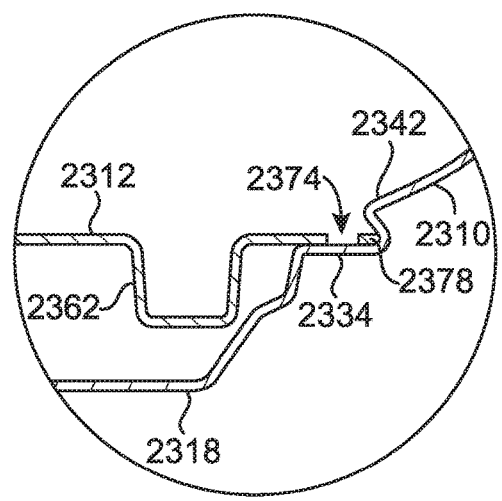
FIG. 44 is a magnified view of the longitudinal cross-sectional view of FIG. 43 at an example retention grip and support.

Turning now to FIGS. 43 and 44, the shelf 2312 is shown in a supported position in the tray 2310. As shown, the retention grip 2342 can be a formation that projects inwardly from the sidewall of the tray 2310 toward a center of the tray 2310. The retention grip 2342 can then slope back outwardly at a position above the support 2334. In this manner, the retention grip 2342 and the support 2334 define a retention groove in which the shelf 2312 can be retained in position. As shown in FIG. 44, the edge 2378 of the shelf 2312 positioned outward of the relief 2374 can contact the tray 2310 between the retention grip 2342 and the support 2334.

The relief 2374 can have an elongated rectangular shape with rounded ends to define an elongated slot. In other examples, the relief 2374 or the other reliefs positioned at the various edges of the shelf 2212, 2312 can have other shapes or other configurations to permit the edges of the shelf 2212, 2312 to flex during installation or removal. In other examples, the reliefs can be slits in the material, slots that define one or more fingers at the edges of the shelf, living hinges, or the like. While the retention grip 2342 and the support 2334 are shown in FIGS. 43 and 44, it should be appreciated that each of the retention grips and supports can be similarly configured on the packages 2200, 2300.

The tray 2010, the shelf 2012 and/or the shelf 3020 (or other trays and shelves as described herein) can be formed using any suitable process. Example processes include thermoforming, vacuum forming, injection molding, blow molding or the like. In one example, the tray 2010, the shelf 2012 and/or the shelf 3020 can be formed from polyethylene terephthalate (PET) using a vacuum forming process. In such a process, a suitable blank of material is placed into a vacuum forming mold that includes the shape of the component to be formed. After the blank of material is heated, the heated blank is pressed into the mold and air is evacuated between the blank and the mold. This action causes the heated blank to come into contact with the mold and the blank to take the shape of the mold. When the formed blank is cooled, the formed component can be removed from the mold. As can be appreciated, a draft angle is often maintained on the part of at least 3 degrees relative to direction substantially perpendicular to a direction of insertion of the blank into the mold. In this manner, the formed component can be easily removed from the mold after cooling.

As shown in FIG. 29, the shape of the retention grip 2038 can generally violate this general guideline. As shown, the formation of the retention grip 2038 and particularly the shape of the gripping surface 2052, the inner edge 2048 and/or the top surface 2050 can cause the tray 2010 to bind within a traditional vacuum forming mold. To remedy this potential problem, the mold used in forming the tray 2010 can include a movable insert that forms one or more features of the retention grip 2038. The mold can also include other movable inserts for the formation of the retention grips 2040, 2042, 2044. The movable inserts can travel in a direction substantially parallel to the direction of insertion/removal of the blank/formed component in the mold. As the movable inserts move away from the mold, the movable inserts and/or the formed component (e.g., the formed tray 2010) can flex in a direction substantially perpendicular to the insertion/removal direction to allow the formed component to "release" from the formation of the movable insert. In such a manner, the vacuum forming process and/or the mold is simplified, is less costly and allows for the formation of the retention grip 2038 (and the other retention grips of the packages 2000, 2200, 2300).

Figure 45:
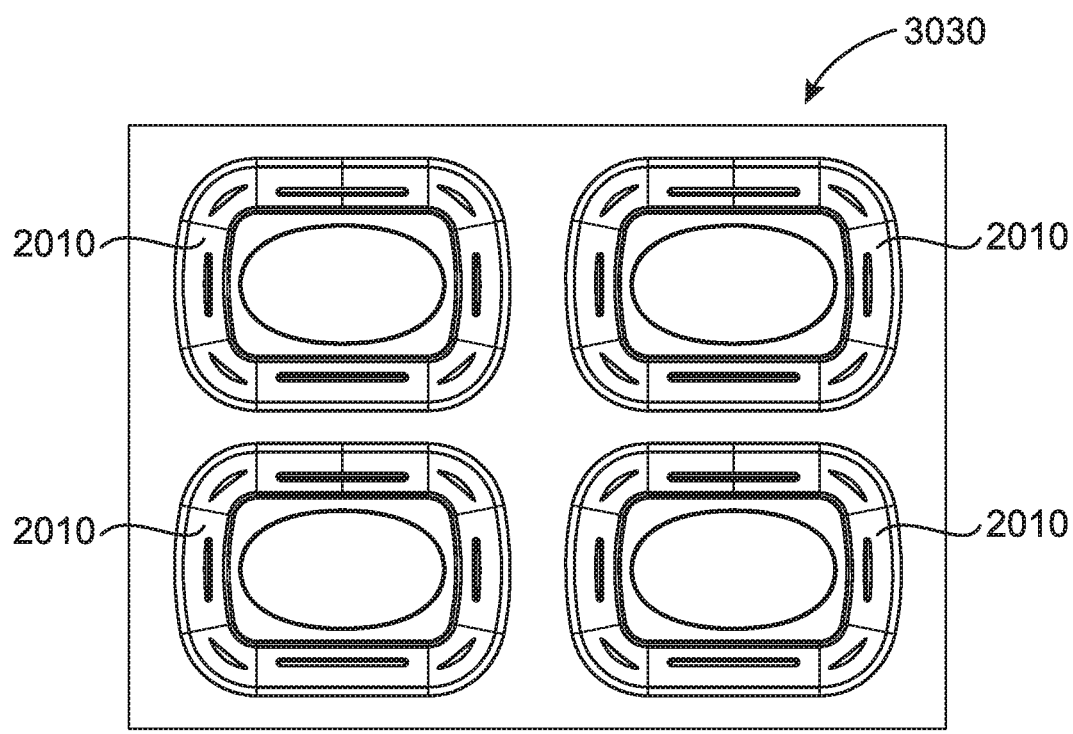
FIG. 45 is a top view of an exemplary tray blank showing the layout of four trays on the blank.
Figure 46:
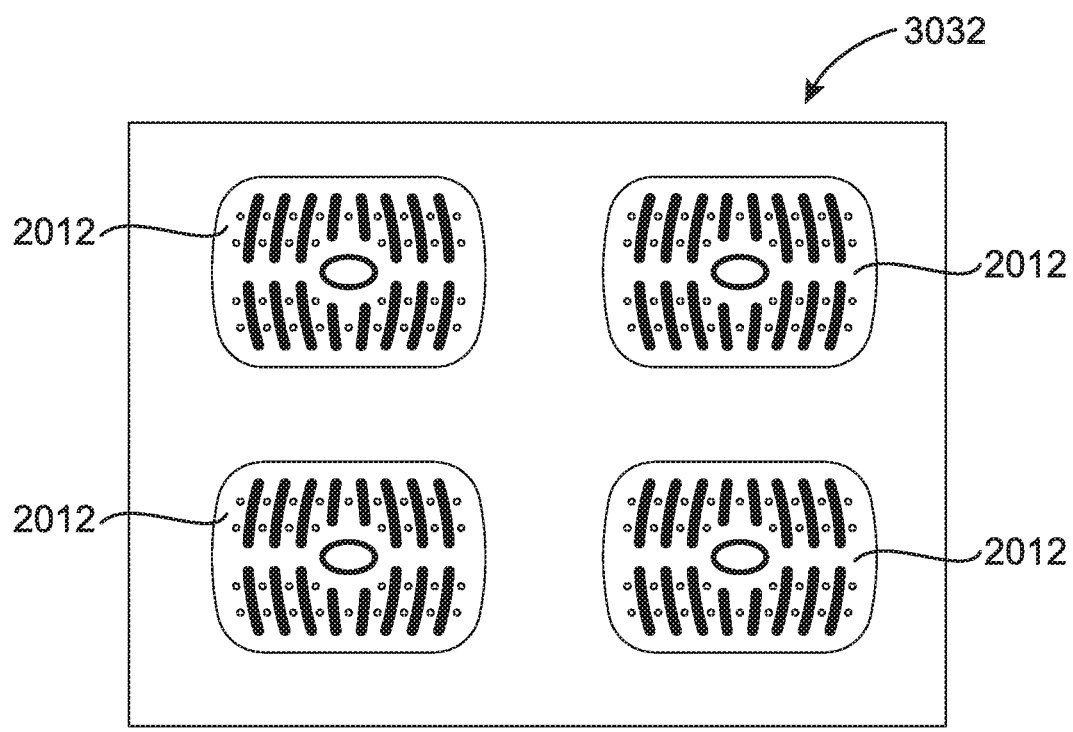
FIG. 46 is a top view of an exemplary shelf blank showing the layout of four shelves on the blank.

As shown in FIG. 45, in one example process, the tray 2010 can be formed from a tray blank 3030. As can be seen, the tray blank 3023 is sized to permit four individual trays 2010 to be formed at the same time. Given the requirements for the forming process such as a required border and a required spacing between adjacent elements, the material in between and around the trays 2010 is waste material that is unused and discarded after the forming process. Similarly, the shelf 2012, in one example process, if formed from a shelf blank 3032 (FIG. 46). As shown, four individual shelves 2012 can be formed at the same time. The material in between and around the shelves 2012 is waste material that is unused and discarded after the forming process.

Figure 47:
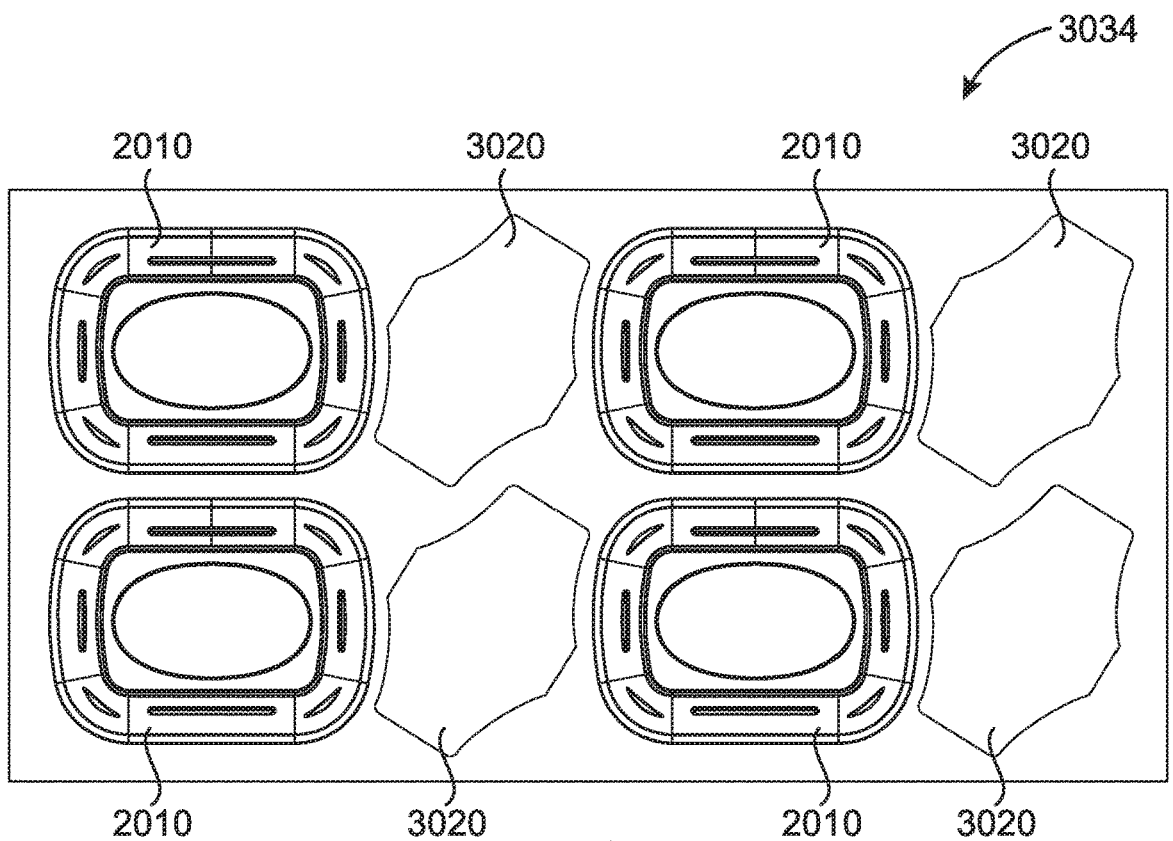
FIG. 47 is a top view of an exemplary combined blank showing four trays and four shelves nested together on the blank.

In another example process as shown in FIG. 47, the shelf 3020 can have the alternate shape as described above. Since the shelf 3020 has a smaller footprint than shelf 2012, the shelf 3020 can be nested between trays 2010 in the forming process. In this example, four shelves 3020 can be nested with four trays 2010 in a combined blank 3034. The material between and around the trays 2010 and the shelves 3020 in the combined blank 3034 is waste material that is unused and discarded after the forming process. The total waste material that results from the combined blank 3034 is less than the total waste material that results from the combination of the waste material from the tray blank 3030 and from the shelf blank 3032. As a result, the use of the shelf 3020 can result in a cost savings from the reduction of material. In one example, the material reduction can be approximately 8%. In another example, the material reduction can be greater than or equal to 8%. In yet another example, the material reduction can be at least 5%.

In one example forming process, a combined blank 3034 can be cut having a predetermined size. Such predetermined size can be a size that can accommodate at least four trays 2010 and four shelves 3020. The combined blank 3034 can then be inserted into a forming mold, such as a mold in a vacuum forming process, and formed into four trays 2010. The skeletal waste from the tray forming process can then be inserted into a second forming mold, such as a mold in a vacuum forming process, and formed into four shelves 3020. The rounded corners of the shelves 3020 can have profiles that align with and/or have similar shapes as the outer profile of the trays 2010 such that the shelves 3020 can be nested adjacent to the trays 2010 in the combined blank 3034 to reduce the waste material from the process in the manner previously described. In other examples, other process can be used such as using a single mold that includes four trays 2010 and four shelves 3020 in the single mold.

Figure 48:
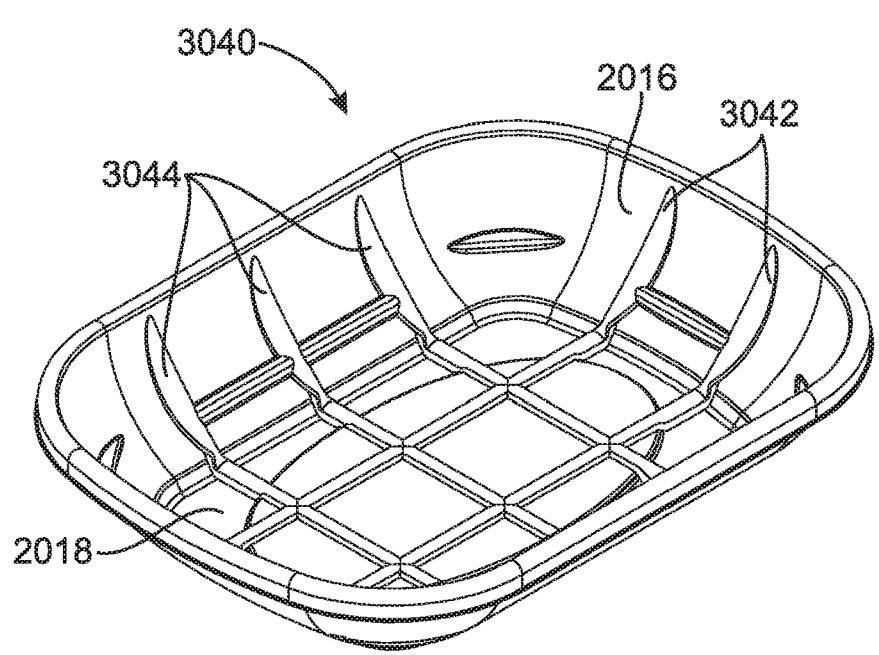
FIG. 48 is an isometric view of another exemplary tray of the present disclosure that includes longitudinal and transverse ribs.

Turning now to FIG. 48, another example tray 3040 is shown. In this example the tray 3040 includes many of the same features and shape as tray 2010 and such common features are not repeated for the sake of brevity. The tray 3040 can include one or more additional features that can stiffen and/or resist the risk of the tray 3040 being deformed during the packaging process. When the tray is wrapped with the film wrap 2074 (not shown in FIG. 48, but see FIG. 33 for example), the film wrap 2074 can be secured tightly around the tray to prevent the leakage of fluids out of the tray. The tightly secured film wrap 2074 can exert forces on the outer perimeter of the tray and cause the tray to deform, crease or buckle. It is undesirable to have such deformation in a finished wrapped package because the deformation is visually unappealing and the deformation can cause points of leakage or lead to holes, tears or other failures in the film wrap 2074.

As shown, the tray 3040 can include one or more longitudinal ribs 3042 and/or one or more transverse ribs 3044. The longitudinal ribs 3042 can extend from the sidewall 2016 on one side of the tray 3040 across the base 2018 and to the sidewall 2016 on the opposite side of the tray 3040. Similarly, the transverse ribs 3044 can extend from the sidewall 2016 on one transverse side of the tray 3040 across the base 2018 and to the sidewall 2016 on the opposite transverse side of the tray 3040. The longitudinal ribs 3042 and the transverse ribs 3044 can project into the inner chamber of the tray 3040 and have a rounded profile. In other examples, the tray 3040 can more or less longitudinal or transverse ribs than that shown in the example. In addition, the longitudinal or transverse ribs can also be of different lengths to add the desired stiffness to the tray 3040.

Other example trays are shown in FIGS. 49-53. These example trays can have profiles and shapes that are similar to the tray 2010 previously described. For the sake of brevity, only those features that may differ from the tray 2010 are described in further detail below.

Figure 49:
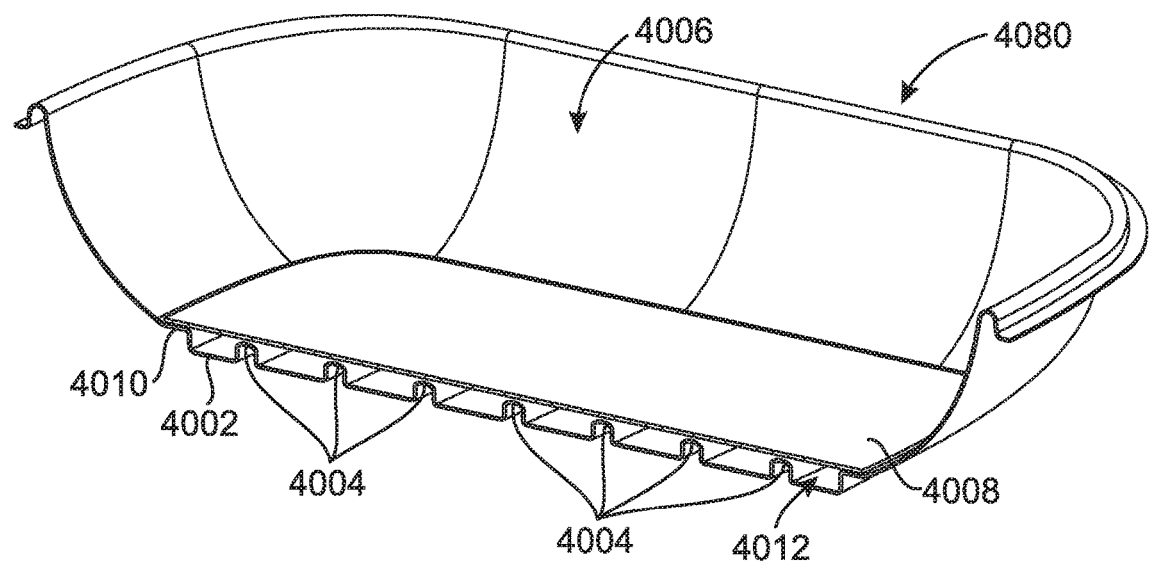
FIG. 49 is a cross-sectional isometric view of another exemplary tray of the present disclosure that includes a flexible sheet in place of a shelf.

As shown in FIG. 49, the example tray 4080 can include a base 4002 with one or more support braces 4004. The support braces 4004 can be formed integrally into the base 4002 and project upward into the inner chamber 4006. The tray 4080 can also include a flexible sheet 4008 that is positioned on and/or adhered to a perimeter 4010 of the base 4002. The flexible sheet 4008 can be a polymer film that stretches over the base 4002. An absorbent pad (not shown) can be positioned in a well 4012 between the base 4002 and the sheet 4008. The flexible sheet 4008 can include perforations, holes, slots or other openings through which juices and/or other fluids can flow from the inner chamber 4006 and into the well 4012. Once in the well 4012, the absorbent pad can absorb the fluids.

In this example, the sheet 4008 can function similarly to the shelf 2012 previously described but can be co-molded and or printed as part of an integrally formed tray 4080. Since the sheet 4008 can be a thin layer of material, it may not be able to support the weight of a food item that is positioned on the sheet 4008. For this reason, the base 4002 includes the support braces 4004 previously described. The braces 4004 can support a food item on the sheet 4008 and maintain a spacing in the well 4012 for the absorbent pad.

As shown, the braces 4004 are oriented transversely across the base 4002. In other examples, the braces 4004 can have other shapes or orientations.

Figure 50:
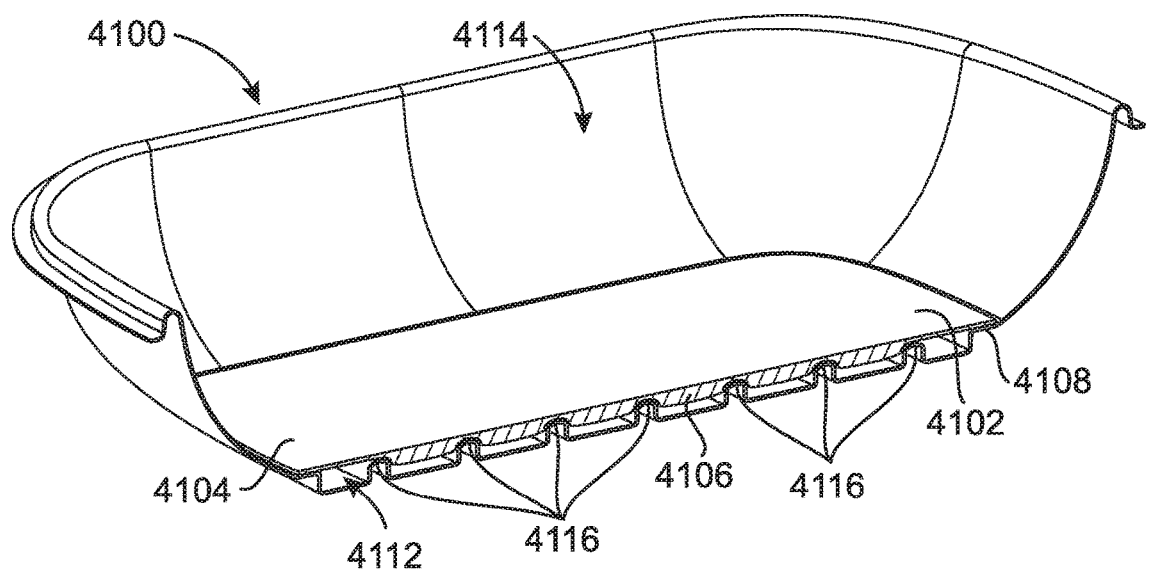
FIG. 50 is a cross-sectional isometric view of another exemplary tray of the present disclosure that includes an absorbent portion integrated into a flexible sheet.

As shown in FIG. 50, an example tray 4100 can include a flexible sheet 4102. The flexible sheet 4102 can include a film portion 4104 and an absorbent portion 4106. The flexible sheet 4102 can integrate the sheet 4008 and the absorbent pad (previously described with respect to tray 4000) into a unitary component. The film portion 4104 can be a thin polymer film that is positioned and/or bonded to a perimeter 4108 of the tray 4100. The absorbent portion 4106 is positioned on a lower surface of the film portion 4104 such that it can be located between the film portion 4104 and the base 4110 in the well 4112. The film portion 4104 can include perforations, holes, slots or other openings that allow juices or fluids to flow from the inner chamber 4114 of the tray 4100 onto the absorbent portion 4106. In this manner, the juices or fluids can be collected in a position remote from the food item that may be stored in the tray 4100. The tray 4100 can include the support braces 4116 as previously described.

Figure 51:
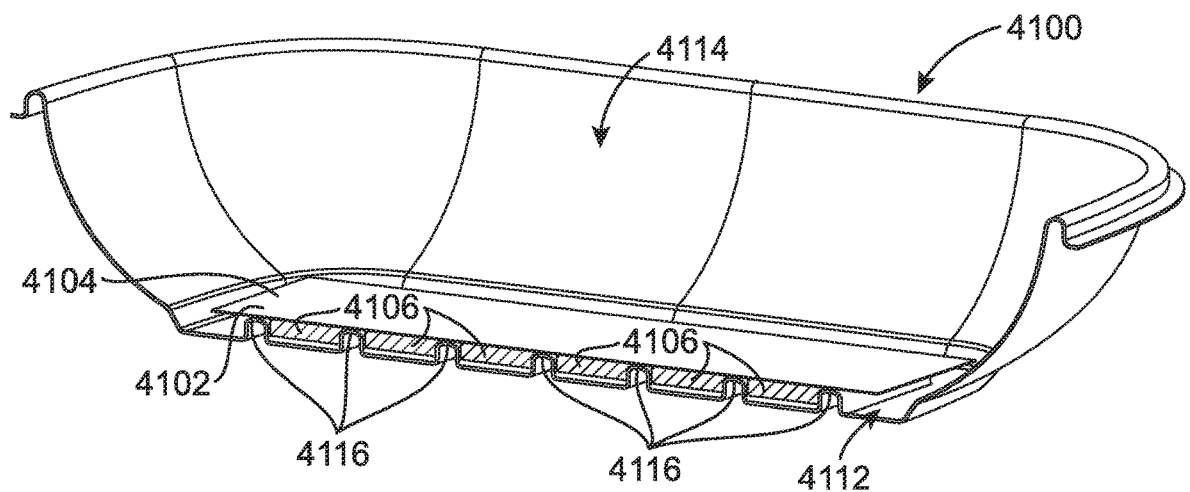
FIG. 51 is a cross-sectional isometric view of another exemplary tray of the present disclosure that includes an absorbent portion with a complimentary profile to that of the support braces in the base of the tray.

Another variation of the tray 4100 is shown in FIG. 51. In this example, the flexible sheet 4102 has a different shape from that previously described. In this example, the absorbent portion 4106 of the flexible sheet 4102 has a shape that is a complimentary shape as that of the braces 4116. As can be seen, rather than having a continuous thickness in the longitudinal direction as shown in FIG. 50, the absorbent portion 4106 in this example fits between each of the support braces 4116. In this example, the absorbent portion 4106 can be positioned in the well 4112 such that the force exerted by the food item that may be placed in the inner chamber 4114 of the tray 4100 does not compress the absorbent portion 4106 of the flexible sheet 4102. The absorbent portion 4106 can include transversely oriented strips of absorbent material in a pattern consistent with the support braces 4116. In examples in which the support braces 4116 have a different pattern and/or orientation, the absorbent portion 4106 can also have such different patterns and/or orientations.

Figure 52:
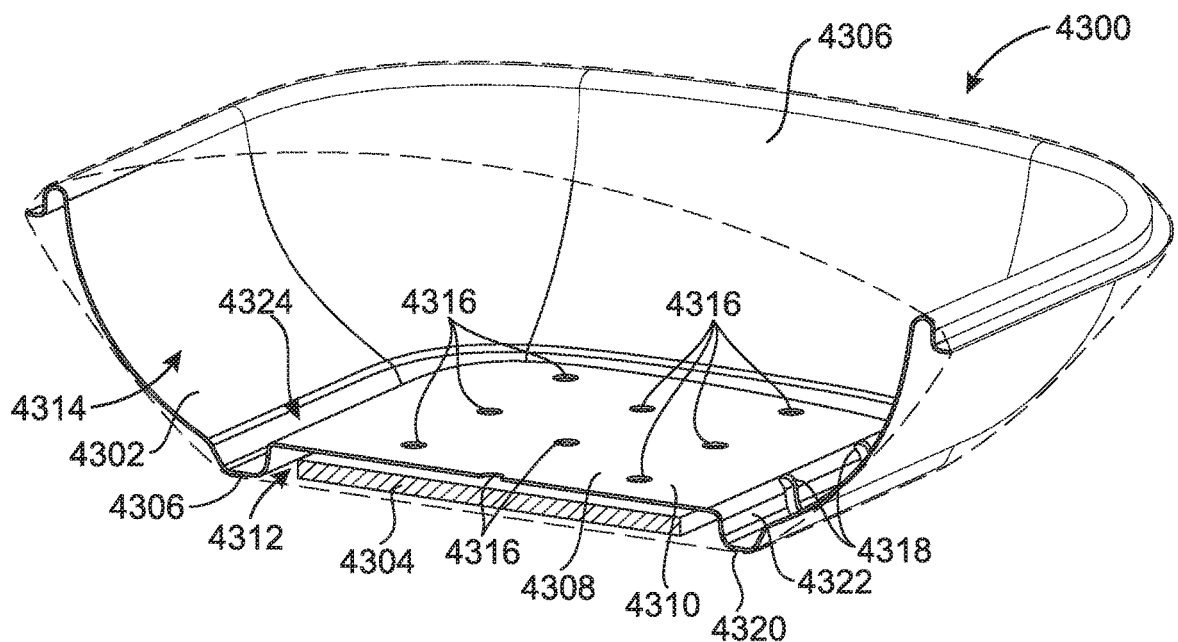
FIG. 52 is a cross-sectional isometric view of another exemplary package of the present disclosure that includes a platform formed into the base of the tray.

Referring now to FIG. 52, another example package 4300 is shown. The example package 4300 can include a tray 4302, an absorbent pad 4304 and a film wrap 4306. As can be seen, the tray 4302 can be similarly shaped to the trays previously described. The tray 4302, in this example however, can include a platform 4310 that is formed into the base 4306. The platform 4310 can include a support surface 4308 on which a food item can be positioned. The platform 4310 can be vertically offset from a lower surface 4320 of the base 4306. In this manner, the platform 4304 defines a recess 4312 into which the absorbent pad 4304 can be located. The film wrap 4306 can be wrapped around the tray 4302. The film wrap 4306 can cover and/or enclose an inner chamber 4314 of the tray 4302 as well as cover and/or enclose the recess 4312. Thus, the film wrap 4306 can retain the contents of the inner chamber 4314 in a desired location as well as retain the absorbent pad 4304 and any fluids that may flow into the recess 4312 in a desired location.

As further shown, the support surface 4308 may include one or more drain holes 4316. The drain holes 4316 can permit juices and/or other fluids to flow through the platform 4310 and toward the absorbent pad 4304. The drain holes 4316 can be positioned in any suitable pattern to enable such drainage or flow of fluids. The tray 4302 can also include one or more side channels 4318. The side channels 4318 can be positioned on a riser wall 4322 that connects between the base 4320 and the support surface 4308. Since the support surface 4308 of the platform 4310 has a smaller horizontal footprint than the base 4320, the tray 4302 defines a groove 4324 around support surface 4308. Juices and/or fluids collect in and/or flow into the groove 4324. The side channels 4318 permit the juices and/or fluids to flow from the groove 4324 toward the absorbent pad 4304. As shown, the side channels 4318 can be vertically oriented slots positioned around the support surface 4308. In other examples, other perforations, drain openings or channels with different orientations and shapes can also be used.

Figure 53:
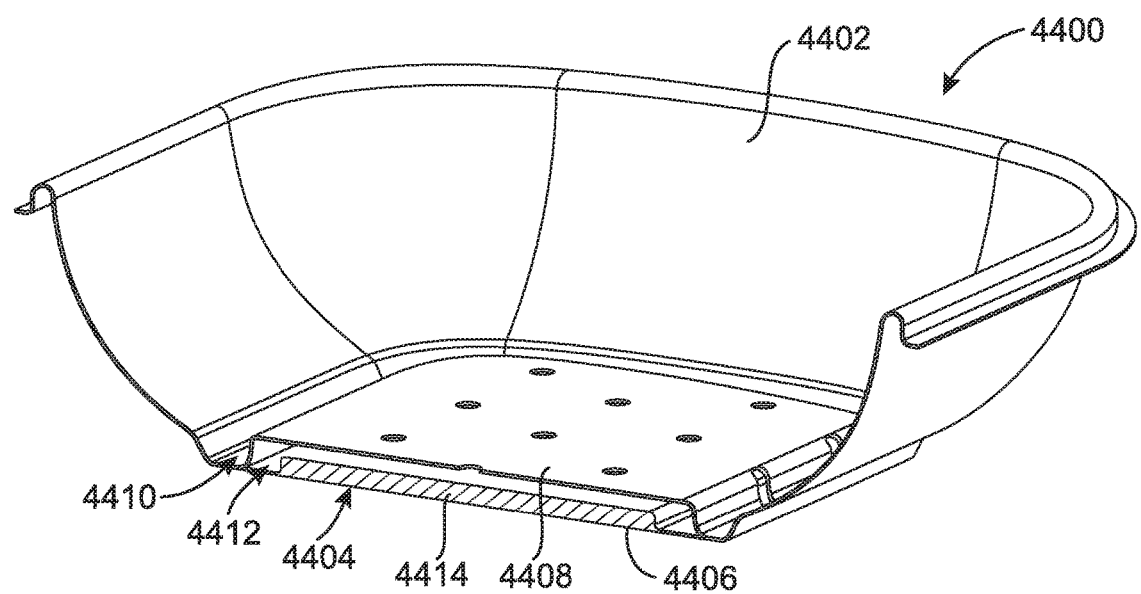
FIG. 53 is a cross-sectional isometric view of another exemplary package of the present disclosure that includes a flexible sheet with integrated absorbent portion.

Another example package 4400 is shown in FIG. 53. The package 4400 can include a tray 4402 and a flexible sheet 4404. The tray 4402 can be substantially similar to the tray 4302 previously described. As shown, the tray 4402 can include a platform 4408 that defines a groove 4410 and a recess 4412 as previously described with respect to the tray 4302. Instead of using the film wrap 4306 to cover the recess 4412, however, the package 4400 can include the flexible sheet 4404 that extends across the recess 4412. The flexible sheet can include a film portion 4406 and an absorbent portion 4414. The film portion 4406 can be a thin layer of polymer material. The film portion 4406 can extend across the recess 4412 and prevent juices and/or fluids from leaking out of the tray 4402. The absorbent portion 4414 can be made of absorbent material and can collect the fluids that flow into the recess 4412.

In still other examples contemplated by the present disclosure, the package may include a shelf supported in other manners from that described above. In such other examples, a shelf can be placed in a tray and be supported above the base using other support structures. For example, the shelf and/or the base may include legs or support columns that extend downward from the shelf or extend upward from the base. In such examples, the legs or support columns can support the shelf in a position vertically spaced apart from the base of the tray. Such a configuration can result in a chamber in which the absorbent pad can be positioned to absorb fluids than can flow from a food item placed on the shelf in the package. In still other examples, other support structures can be used.

Figure 54:
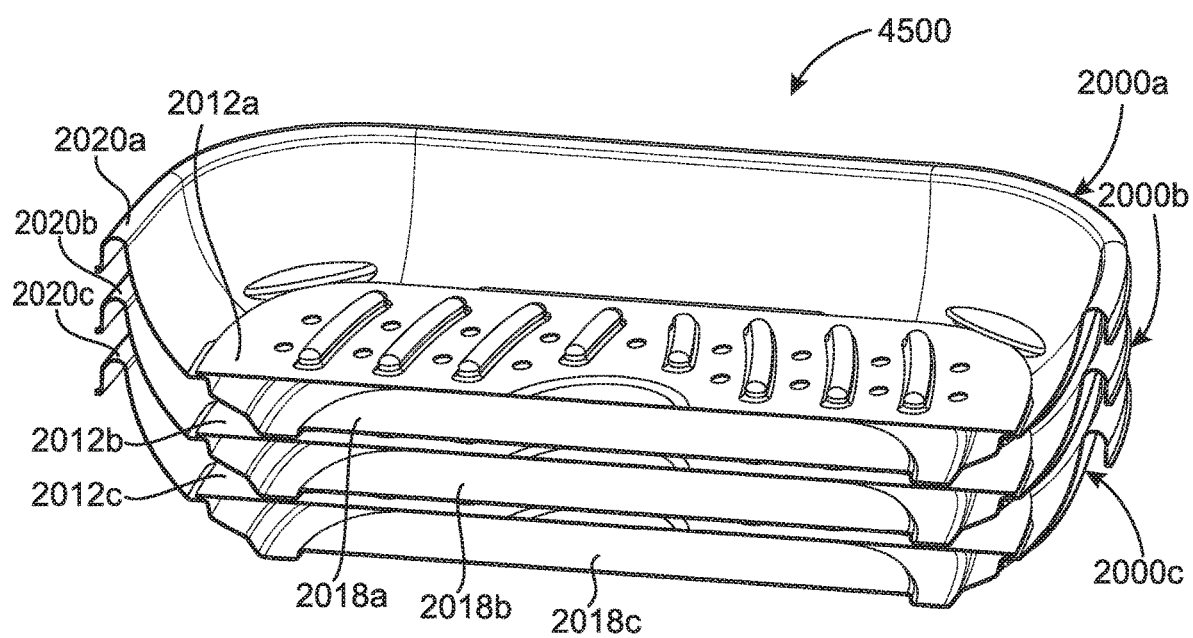
FIG. 54 is a cross-sectional isometric view of an exemplary stack of packages of the present disclosure.

As shown in FIG. 54, one or more packages of the present disclosure can be stacked for transport or processing. The package 2000 can be nested into a stack 4500 of two or more packages 2000. FIG. 54 shows three packages, 2000*a*, 2000*b* and 2000*c* stacked together. Since the respective rims 2020*a*, 2020*b*, 2020*c* of the packages 2000*a*, 2000*b*, 2000*c*, are vertically spaced apart from one another in the stack 4500, the packages can be easily de-nested from each other. Since the base 2018*a*, 2018*b*, 2018*c* is disposed on the shelf 2012*a*, 2012*b*, 2012*c* of the adjacent package, the packages 2000 do not nest so closely that separation of the packages 2000 is difficult.

The packages of the present disclosure and the various components thereof can be disposable, recyclable, compostable and/or reusable. In addition, the package 2000 can be configured in order to permit a consumer to easily dispose of the absorbent pad 2014. It can be desirable to allow a consumer to dispose of the absorbent pad 2014 without the need for the consumer to touch the absorbent pad 2014. The consumer may prefer not to touch the absorbent pad 2014 due to the fact that the absorbent pad 2014 has been exposed to juices and/or fluids from uncooked meat. To prevent exposure to such juices and/or fluids or for personal preference, the absorbent pad 2014 can be easily removed from the package 2000.

To accomplish the disposal and/or removal of the absorbent pad 2014, a consumer can grip the package 2000 and turn the package upside down such that the shelf 2012 that is positioned in the inner chamber 2022 faces downward over a trash container. The consumer can twist the tray 2010 such that the opposite transverse ends of the tray 2010 are rotated in opposite rotational directions. As such twist is induced in the tray 2010, the shelf 2012 can disengage from the retention grips 2038, 2040, 2042, 2044. When such disengagement occurs, the shelf 2012 and the absorbent pad 2014 can freely fall in a downward direction into the trash container. The consumer has thusly disposed of the absorbent pad 2014 while only gripping and twisting the tray 2010. The other packages of the present disclosure, for example packages 2200 and 2300, can also be utilized by consumer in a similar manner to easily disengage the shelf 2212, 2312 from the tray 2210, 2310 to access and/or dispose of the absorbent pad. This easily access and disposal of the absorbent pad can make the packages of the present disclosure suitable for recycling, washing and/or re-use by the consumer.

The trays, shelves and other elements described in the foregoing disclosure can be made of any suitable rigid or semi-rigid materials including rigid or semi-rigid plastics. In addition, other examples include use of stamped metals, bio-polymers, pulp, paper, paperboard or other suitable materials.

As previously described, the implementation of the packages, elements thereof and related methods can have many benefits and advantages. Among such advantages are increased customer satisfaction, reduction of materials, reduction in packaging costs, increased run rates, increased packing density, and others.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results, so long as the result is consistent with the description provided above.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof

We claim:

1. A package for retaining a food item comprising:
    a tray including a base connected to at least one sidewall which extends away from the base to a rim to define an inner chamber, the tray comprising a fluid impermeable material to retain fluids therein;
    a shelf comprising the fluid impermeable material removably supported in the inner chamber such that the shelf is spaced apart from the base of the tray to permit an absorbent pad to be positioned therebetween, the shelf configured to support the food item in the inner chamber separated from the absorbent pad;

a lid comprising a frame defining a central aperture therein, the frame having a profile complimentary to the rim of the tray to removably engage to the rim; and a sealing film comprising a first film surface and an opposing second film surface, the first film surface being permanently affixed to the lid to cover the central aperture, the second film surface being releasably sealed to the tray such that when a user draws the lid away from the tray, the first film surface remains affixed to the lid and disengages from the tray.

2. The package of claim 1, wherein the tray includes at least one support projecting into the inner chamber from the at least one side wall, the at least one support configured to support the shelf in the tray.

3. The package of claim 2, wherein the at least one support comprises a first support, a second support, a third support and a fourth support, the first and third supports positioned opposite to each other longitudinally along the sidewall and the second and fourth supports positioned opposite to each other transversely along the sidewall.

4. The package of claim 2, wherein the tray further includes at least one retention grip positioned at a corner of the tray, the shelf vertically positioned between the at least one support and the at least one retention grip to retain the shelf in position relative to the tray.

5. The package of claim 1, wherein the shelf includes a support surface defining a plurality of drain holes, the drain holes configured to allow fluids to flow through the shelf toward the base.

6. The package of claim 1, wherein the shelf includes a plurality of ridges projecting away from the base, the plurality of ridges configured to limit the movement of the food item relative to the shelf when the package is manipulated into a position in which the base is skewed relative to a horizontal plane.

7. The package of claim 1, wherein:

the absorbent pad comprises an absorbent material that is configured to expand when the absorbent pad absorbs fluid, the absorbent pad having a dry height measured as the height of the absorbent pad prior to absorption of fluid; and the shelf is spaced apart from the base by a second height, the second height being at least two times the dry height of the absorbent pad.

8. The package of claim 1, wherein the sealing film comprises a flexible fluid impermeable material, the sealing film positioned across the rim to seal the inner chamber of the tray from leakage of fluids.

9. The package of claim 1, wherein the lid is configured to sealingly re-engage the tray after the lid is removed from the tray, the lid and the sealing film preventing leakage of fluids from the inner chamber of the tray when the lid is re-engaged to the tray.

10. The package of claim 9, wherein:

the tray comprises a first release tab projecting outward from the rim; and the lid comprises a second release tab projecting outward from the frame at a position adjacent to the first release tab; the first release tab and the second release tab configured to assist a user in disengaging the lid from the tray.

11. The package of claim 10, further comprising a tamper evident sticker positioned across at least a portion of the first release tab and the second release tab, the sticker indicating when the lid has been separated from the tray.

12. The package of claim 1, wherein the tray has a rectangular outer profile.

13. The package of claim 1, wherein the tray has a cross-shape with rounded concave corners.

14. The package of claim 1, wherein the tray includes a plurality of longitudinally extending ribs.

15. The package of claim 1, wherein the tray includes a plurality of transversely extending ribs.

16. The package of claim 1, wherein the shelf comprises a flexible sheet and the base comprises a plurality of support braces projecting toward the flexible sheet from the base, the plurality of support braces supporting a food item on the flexible sheet spaced apart from the base.

17. The package of claim 16, wherein the absorbent pad is integrally attached to the flexible sheet of the shelf.

18. The package of claim 17, wherein the absorbent pad comprises a plurality of sections of absorbent material positioned between the plurality of support braces.

19. The package of claim 1, wherein includes a platform that is offset from the base in a common direction as the side wall, the platform defining a recess; and the absorbent pad is positioned in the recess.

* * * * *